US012596891B2

(12) United States Patent
Jain et al.

(10) Patent No.: US 12,596,891 B2
(45) Date of Patent: Apr. 7, 2026

(54) CROSS-LINGUAL NATURAL LANGUAGE UNDERSTANDING MODEL FOR MULTI-LANGUAGE NATURAL LANGUAGE UNDERSTANDING (mNLU)

(71) Applicant: ServiceNow, Inc., Santa Clara, CA (US)

(72) Inventors: Mayank Jain, Bangalore (IN); Murali B. Subbarao, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 728 days.

(21) Appl. No.: 18/070,128

(22) Filed: Nov. 28, 2022

(65) Prior Publication Data

US 2024/0176962 A1 May 30, 2024

(51) Int. Cl.
| | |
|---|---|
| *G06F 17/28* | (2006.01) |
| *G06F 40/279* | (2020.01) |
| *G06F 40/30* | (2020.01) |
| *G06F 40/55* | (2020.01) |
| *G06F 40/58* | (2020.01) |
| *G06N 5/04* | (2023.01) |

(52) U.S. Cl.
CPC ............ *G06F 40/58* (2020.01); *G06F 40/279* (2020.01); *G06F 40/30* (2020.01); *G06F 40/55* (2020.01); *G06N 5/04* (2013.01)

(58) Field of Classification Search
CPC ........ G06F 40/279; G06F 40/30; G06F 40/55; G06F 40/58; G06F 16/638
USPC .......................................................... 704/2
See application file for complete search history.

(56) References Cited

U.S. PATENT DOCUMENTS

| | | | |
|---|---|---|---|
| 6,609,122 | B1 | 8/2003 | Ensor |
| 7,020,706 | B2 | 3/2006 | Cates |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,610,512 | B2 | 10/2009 | Gerber |
| 7,617,073 | B2 | 11/2009 | Trinon |
| 7,689,628 | B2 | 3/2010 | Garg |
| 7,716,353 | B2 | 5/2010 | Golovinsky |
| 7,769,718 | B2 | 8/2010 | Murley |
| 7,783,744 | B2 | 8/2010 | Garg |
| 7,890,802 | B2 | 2/2011 | Gerber |
| 7,925,981 | B2 | 4/2011 | Pourheidari |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |

(Continued)

*Primary Examiner* — Md S Elahee
(74) *Attorney, Agent, or Firm* — FLETCHER YODER PC

(57) ABSTRACT

A cross-lingual Natural Language Understanding (NLU) framework includes a cross-lingual NLU model that can be trained and tuned on a base language and one or more target languages, and subsequently be used to infer utterances in any of the supported languages. The present technique enables minimal, targeted fine-tuning of the cross-lingual NLU model in each language to be supported without negatively impacting prediction performance in other languages. Accordingly, the present technique reduces the resource costs in developing and maintaining a multi-language NLU (mNLU) framework and improves the scalability of the mNLU framework to support different languages.

20 Claims, 32 Drawing Sheets

(56) References Cited

U.S. PATENT DOCUMENTS

| | | | |
|---|---|---|---|
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Meuller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,478,569 B2 | 10/2016 | Uesaka | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 11,423,451 B1 * | 8/2022 | Chaudhari | G06F 16/638 |
| 2004/0039563 A1 * | 2/2004 | Suzuki | G06F 40/55 |
| | | | 704/2 |
| 2024/0135116 A1 * | 4/2024 | Vu | G06F 40/58 |

* cited by examiner

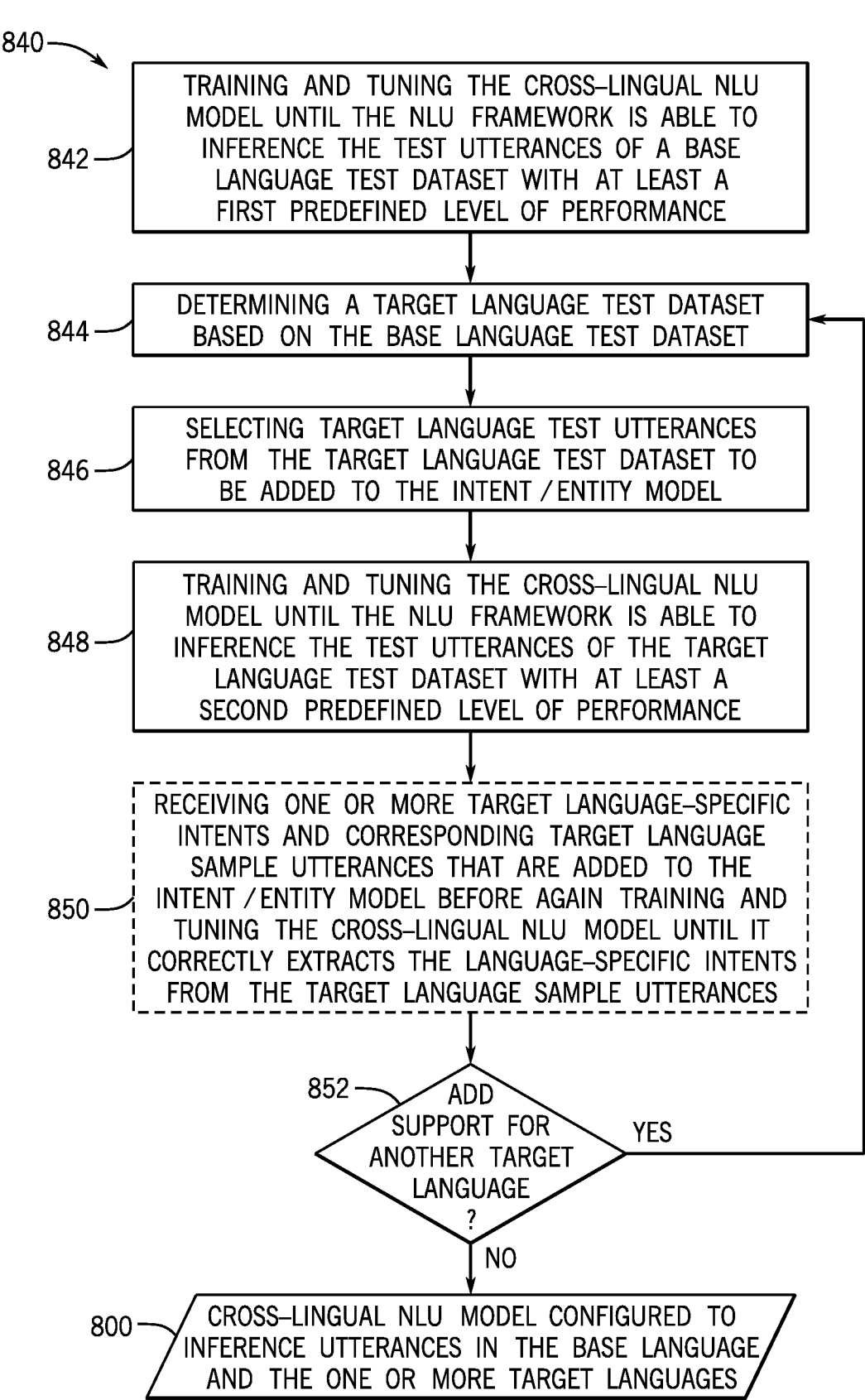

840

842 — TRAINING AND TUNING THE CROSS-LINGUAL NLU MODEL UNTIL THE NLU FRAMEWORK IS ABLE TO INFERENCE THE TEST UTTERANCES OF A BASE LANGUAGE TEST DATASET WITH AT LEAST A FIRST PREDEFINED LEVEL OF PERFORMANCE

844 — DETERMINING A TARGET LANGUAGE TEST DATASET BASED ON THE BASE LANGUAGE TEST DATASET

846 — SELECTING TARGET LANGUAGE TEST UTTERANCES FROM THE TARGET LANGUAGE TEST DATASET TO BE ADDED TO THE INTENT/ENTITY MODEL

848 — TRAINING AND TUNING THE CROSS-LINGUAL NLU MODEL UNTIL THE NLU FRAMEWORK IS ABLE TO INFERENCE THE TEST UTTERANCES OF THE TARGET LANGUAGE TEST DATASET WITH AT LEAST A SECOND PREDEFINED LEVEL OF PERFORMANCE

850 — RECEIVING ONE OR MORE TARGET LANGUAGE-SPECIFIC INTENTS AND CORRESPONDING TARGET LANGUAGE SAMPLE UTTERANCES THAT ARE ADDED TO THE INTENT/ENTITY MODEL BEFORE AGAIN TRAINING AND TUNING THE CROSS-LINGUAL NLU MODEL UNTIL IT CORRECTLY EXTRACTS THE LANGUAGE-SPECIFIC INTENTS FROM THE TARGET LANGUAGE SAMPLE UTTERANCES

852 — ADD SUPPORT FOR ANOTHER TARGET LANGUAGE ?     YES

NO

800 — CROSS-LINGUAL NLU MODEL CONFIGURED TO INFERENCE UTTERANCES IN THE BASE LANGUAGE AND THE ONE OR MORE TARGET LANGUAGES

FIG. 29

CROSS-LINGUAL NATURAL LANGUAGE UNDERSTANDING MODEL FOR MULTI-LANGUAGE NATURAL LANGUAGE UNDERSTANDING (mNLU)

BACKGROUND

The present disclosure relates generally to the fields of natural language understanding (NLU) and artificial intelligence (AI), and more specifically, to multi-language NLU (mNLU).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain NLU systems, it may be desirable to enable multi-language natural language understanding (mNLU). For example, the intended users of a virtual agent may prefer to interact with a virtual agent in different languages (e.g., English, Chinese, Spanish, French), which may correspond to a native or primary language for a given user. One approach to enabling mNLU involves having a distinct, language-specific NLU model for each supported language. For such an implementation, when an utterance is received, a suitable language-specific model is selected and used to infer the utterance. However, it is presently recognized that there is considerable cost and effort involved in the creation, training, and maintenance of each language-specific model, which has hindered the development of mNLU systems. For example, tens to hundreds of person-weeks of effort may be involved to configure, train, and maintain a given language-specific model, and this process must be repeated to create and maintain a respective language-specific model for each language for which support is desired. Additionally, these efforts often involve developers or designers with specialization in a given language, which can increase costs and introduce development delays due to lack of available developers or designers with the desired skills. As such, current solutions for implementing mNLU are highly resource-intensive and lack scalability.

With the foregoing in mind, present embodiments are directed to a NLU framework that includes a cross-lingual NLU model that can be trained and tuned on a base language and one or more target languages, and then immediately be used to inference utterances in any of the supported languages. As discussed herein, the present approach involves first training and tuning the cross-lingual NLU model to inference utterances in the base language using a base language test dataset. Subsequently, the base language test dataset is translated into a target language test dataset, and the prediction performance of the cross-lingual NLU model in the target language is evaluated using the target language test dataset. Test utterances of the target language test dataset that the NLU framework failed to correctly inference are selected and added as new sample utterances to the NLU model. Subsequently, an incremental fine-tuning is performed on the cross-lingual NLU model in the target language that focuses on a selected small set of data in the target language for which the model performance is to be improved, which enables improvements in prediction performance in the target language without a substantial loss of prediction performance in the base language or other target languages. The process can be repeated to add support for as many target languages as desired. As such, the present technique enables minimal, targeted fine-tuning of the cross-lingual NLU model in each language to be supported without negatively impacting prediction performance in other languages. Accordingly, the present technique reduces the resource costs in developing and maintaining a mNLU framework, and improves the scalability of the mNLU framework to support different languages.

BRIEF DESCRIPTION OF THE DRAWINGS

Various aspects of this disclosure may be better understood upon reading the following detailed description and upon reference to the drawings in which:

FIG. 29 is a flow diagram of an embodiment of a process whereby the NLU framework trains and tunes the cross-lingual NLU model to enable support for inferencing utterances in a base language and one or more target languages, in accordance with aspects of the present technique;

DETAILED DESCRIPTION OF SPECIFIC EMBODIMENTS

Figure 1:
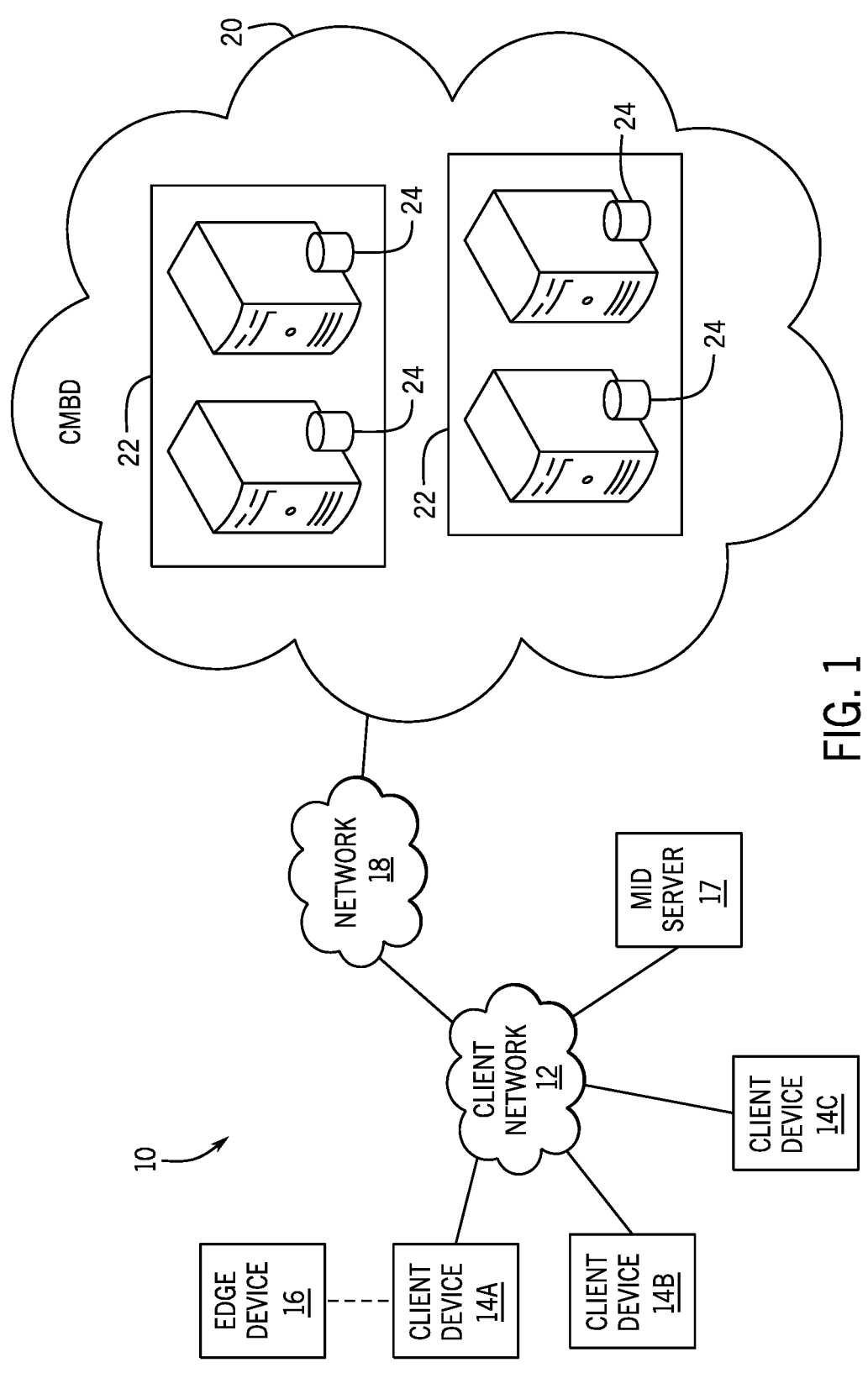
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the terms "application", "engine", "program", or "plugin" refers to one or more sets of computer software instructions (e.g., computer programs and/or scripts) executable by one or more processors of a computing system to provide particular functionality. Computer software instructions can be written in any suitable programming languages, such as C, C++, C #, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTER- PRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities, artifacts) from natural language utterances using one or more machine-learning (ML) components and one or more rule-based components. As used herein, a "behavior engine" or "BE," also known as a reasoning agent or RA/BE, refers to a rule-based agent, such as a virtual agent, designed to interact with users based on a conversation model. For example, a "virtual agent" may refer to a particular example of a BE that is designed to interact with users via natural language requests in a particular conversational or communication channel. With this in mind, the terms "virtual agent" and "BE" are used interchangeably herein. By way of specific examples, a virtual agent may be or include a chat agent that interacts with users via natural language requests and responses in a chat room environment, or that provides recommended answers to requests or queries made in a search text box. Other examples of virtual agents may include an email agent, a forum agent, a ticketing agent, a telephone call agent, a search agent, a genius search result agent, and so forth, which interact with users in the context of email, forum posts, search queries, autoreplies to service tickets, phone calls, and so forth.

As used herein, an "intent" refers to a desire or goal of a user which may relate to an underlying purpose of a communication, such as an utterance. As used herein, an "entity" refers to an object, subject, or some other parameterization of an intent. It is noted that, for present embodiments, certain entities are treated as parameters of a corresponding intent within an intent/entity model. More specifically, certain entities (e.g., time and location) may be globally recognized and extracted for all intents, while other entities are intent-specific (e.g., merchandise entities associated with purchase intents) and are generally extracted only when found within the intents that define them. As used herein, "artifact" collectively refers to both intents and entities of an utterance. As used herein, an "intent/entity model" (also referred to herein as an "intent-entity model") refers to a model that associates particular intents with particular entities and particular sample utterances, wherein entities associated with the intent may be encoded as a parameter of the intent within the sample utterances of the model. As used herein, an "understanding model" or "NLU model" is a collection of models and parameters used by the NLU framework to infer meaning of natural language utterances. An understanding model may include a search space with meaning representations (e.g., utterance trees) compiled from sample utterances of various intents indicated in an intent/entity model, a word vector distribution model that associates certain tokens (e.g., words or phrases) with particular word vectors, an intent/entity model, an intent model, an entity model, a taxonomy model, other models, or a combination thereof.

As used herein, the term "agents" may refer to computer-generated personas (e.g. chat agents or other virtual agents) that interact with human users within a conversational channel. As used herein, a "corpus" may refer to a captured body of source data that can include interactions between various users and virtual agents, wherein the interactions include communications or conversations within one or more suitable types of media (e.g., a help line, a chat room or message string, an email string). As used herein, an "utterance tree" refers to a data structure that stores a representation of the meaning of an utterance. As discussed, an utterance tree has a tree structure (e.g., a dependency parse tree structure) that represents the syntactic structure of the utterance, wherein nodes of the tree structure store vectors (e.g., word vectors, subtree vectors) that encode the semantic meaning of the utterance.

As used herein, an "utterance" refers to a single natural language statement made by a user that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML-based techniques may be implemented using an artificial neural network (ANN) (e.g., a deep neural network (DNN), a recurrent neural network (RNN), a recursive neural network, a feedforward neural network). In contrast, "rules-based" methods and techniques refer to the use of rule-sets and ontologies (e.g., manually-crafted ontologies, statistically-derived ontologies) that enable precise adjudication of linguistic structure and semantic understanding to derive meaning representations from utterances. As used herein, a "vector" (e.g., a word vector, an intent vector, a subject vector, a subtree vector, a vector representation) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity, a token) of an utterance. As used herein, "domain specificity" refers to how attuned a system is to correctly extracting intents and entities expressed in actual conversations in a given domain and/or conversational channel (e.g., a human resources domain, an information technology domain). As used herein, an "understanding" of an utterance refers to an interpretation or a construction of the utterance by the NLU framework. As such, it may be appreciated that different understandings of an utterance may be associated with different meaning representations having different parse structures (e.g., different nodes, different relationships between nodes), different part-of-speech taggings, and so forth.

Agent Automation Framework

Present embodiments are directed to an agent automation framework that is capable of extracting meaning from user utterances, such as requests received by a virtual agent (e.g., a chat agent), and suitably responding to these user utterances. To do this, the agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. The meaning extraction subsystem includes a vocabulary subsystem, a structure subsystem, and a prosody subsystem that cooperate to parse utterances into the annotated utterance trees based on combinations of rule-based methods and machine learning (ML)-based (e.g., statistical) methods. Using one or more tree substructure vectorization algorithms and focus/attention/magnification (FAM) coefficients defined by a stored compilation model template, the meaning extraction subsystem subsequently generates subtree vectors for the annotated utterance tree structure, yielding the corresponding meaning representation for subsequent searching by the meaning search subsystem.

The disclosed NLU framework is also capable of detecting and addressing errors in an annotated utterance tree before the meaning representation is generated. For example, the meaning extraction subsystem can include a rule-based augmentation error detection subsystem that can cooperate with the vocabulary, structure subsystem, and prosody subsystems to iteratively parse and correct an utterance before meaning representations are generated for improved domain specificity. Additionally, present embodiments support entrenchment, whereby the NLU framework can continue to learn or infer meaning of new syntactic structures in new natural language utterance based on previous examples of similar syntactic structures. For example, components of the NLU framework (e.g., the structure subsystem or the vocabulary subsystem of the meaning extraction subsystem) may be continuously updated based on new utterances, such as exchanges between users and a virtual agent, to enhance the adaptability of the NLU framework to changes in the use of certain terms and phrases over time.

The meaning search subsystem of the disclosed NLU framework is designed to compare a meaning representation generated for a received user utterance to the set of meaning representations generated for the sample utterances of the intent/entity model based on the compilation model template. For example, the compilation model template defines one or more tree model comparison algorithms designed to determine a similarity score for two subtree vectors based on class compatibility rules and class-level scoring coefficients stored in the compilation model template. The class compatibility rules define which classes of subtree vectors can be compared to one another (e.g., verb subtree vectors are compared to one another, subject subtree vectors are compared to one another) to determine vector distances between the subtrees of the meaning representations. The class-level scoring coefficients define different relative weights that determine how much the different classes of subtree vectors contribute to an overall vector generated by the substructure vectorization algorithm for a given subtree (e.g., verb subtree vectors and/or direct object subtree vectors may be weighted higher and contribute more than subject subtree vectors or modifier subtree vectors). Using these algorithms, rules, and coefficients of the compilation model template, the meaning search subsystem determines similarity scores between portions of the meaning representation of the user utterance and portions of the meaning representations of the sample utterances of the intent/entity model. Based on these similarity scores, intents/entities defined within the intent/entity model are extracted from the user utterance and passed to a reasoning agent/behavior engine (RA/BE), such as a virtual agent, to take appropriate action based on the extracted intents/entities of the user utterance.

As mentioned, a computing platform may include a chat agent, or another similar virtual agent, that is designed to automatically respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall other "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to generating suitable meaning representations for utterances, including received user utterances and sample utterances of an intent/entity model. These meaning representations generally have a shape that captures the syntactic structure of an utterance, and include one or more subtree vectors that represent the semantic meanings of portions of the utterance. The meaning representation of the utterance can then be searched against a search space populated with the meaning representations of the sample utterances of the intent/entity model, and one or more matches may be identified. In this manner, present embodiments extract intents/entities from the user utterance, such that a virtual agent can suitably respond to these intent/entities. As such, present embodiments generally address the hard NLU problem by transforming it into a more manageable search problem.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (CMDB) system and/or other suitable systems. In one embodiment, the client network 12 may be a local private network, such as a local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IOT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
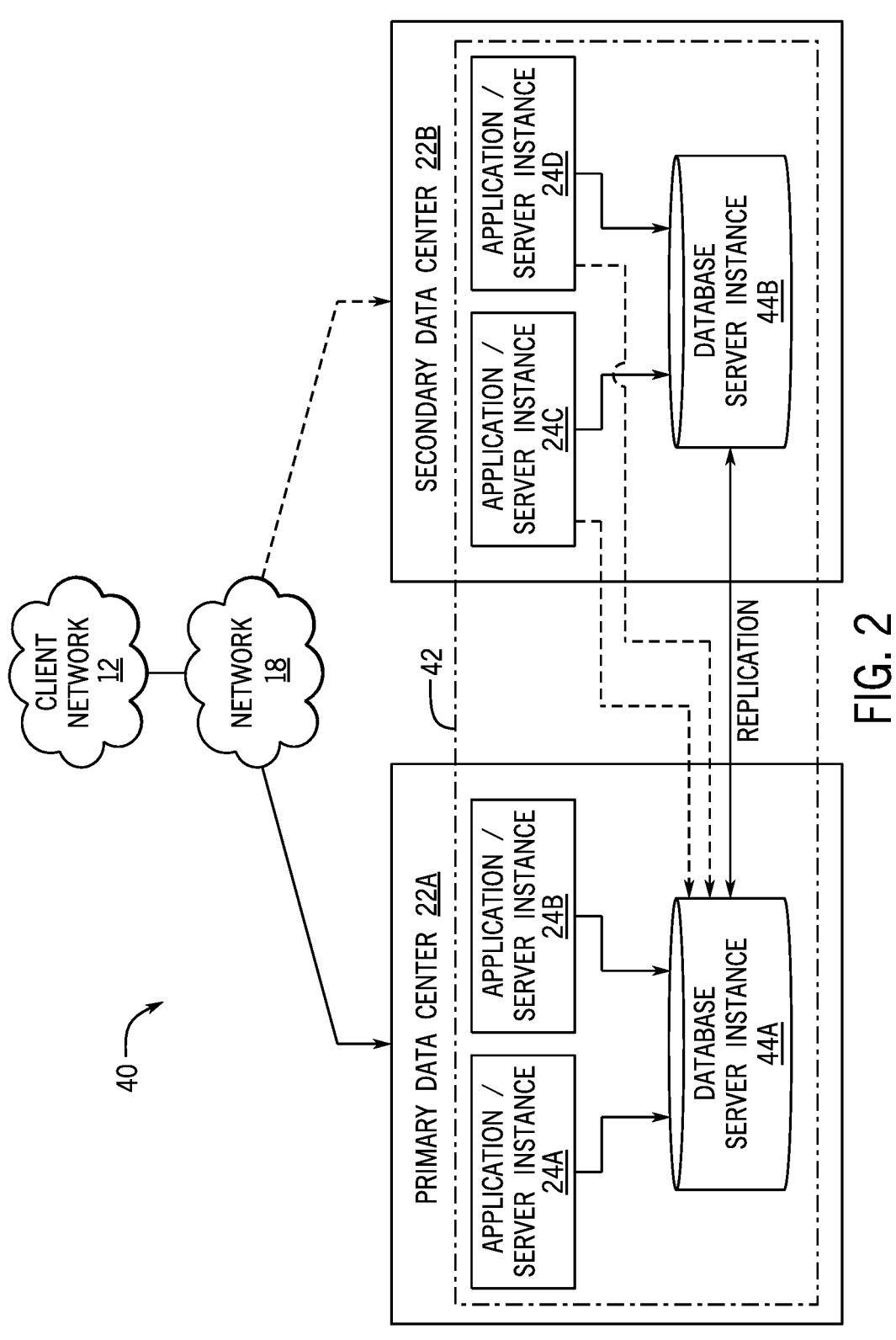
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data centers could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the secondary data center 22B during a failure and/or maintenance scenario. Using FIG. 2 as an example, if the virtual servers 24A and 24B and/or primary virtual database server instance 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
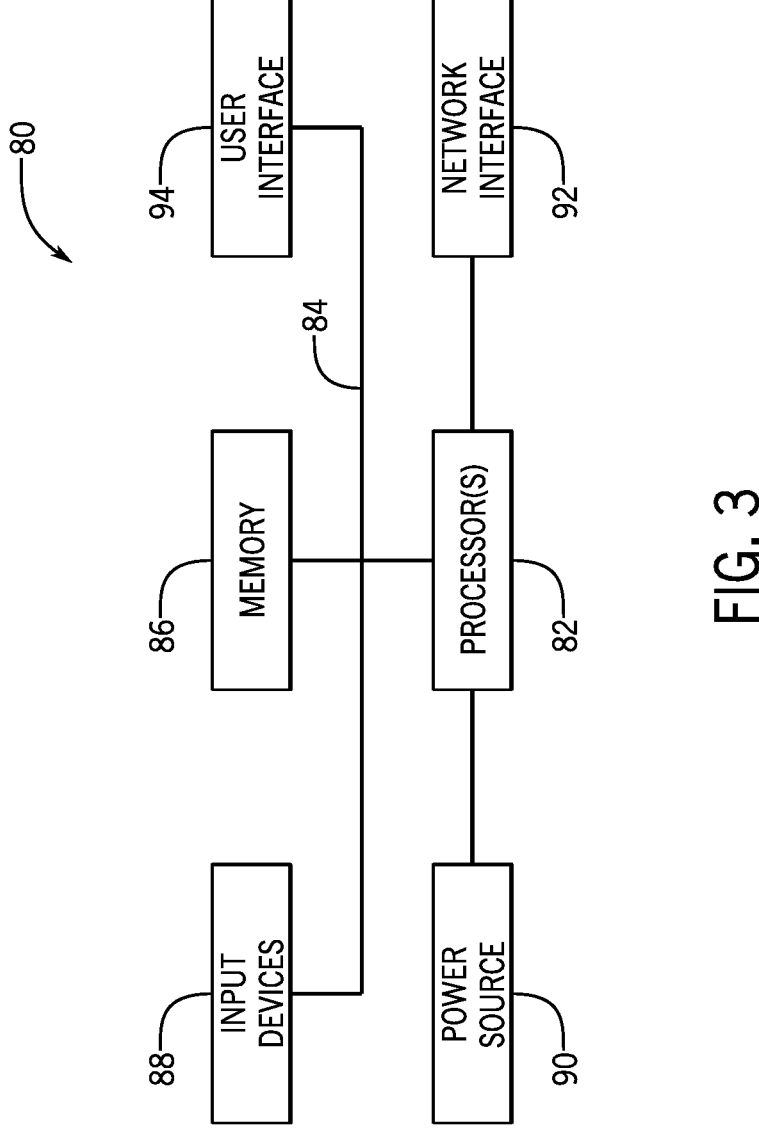
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media.

Although shown as a single block in FIG. 3, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
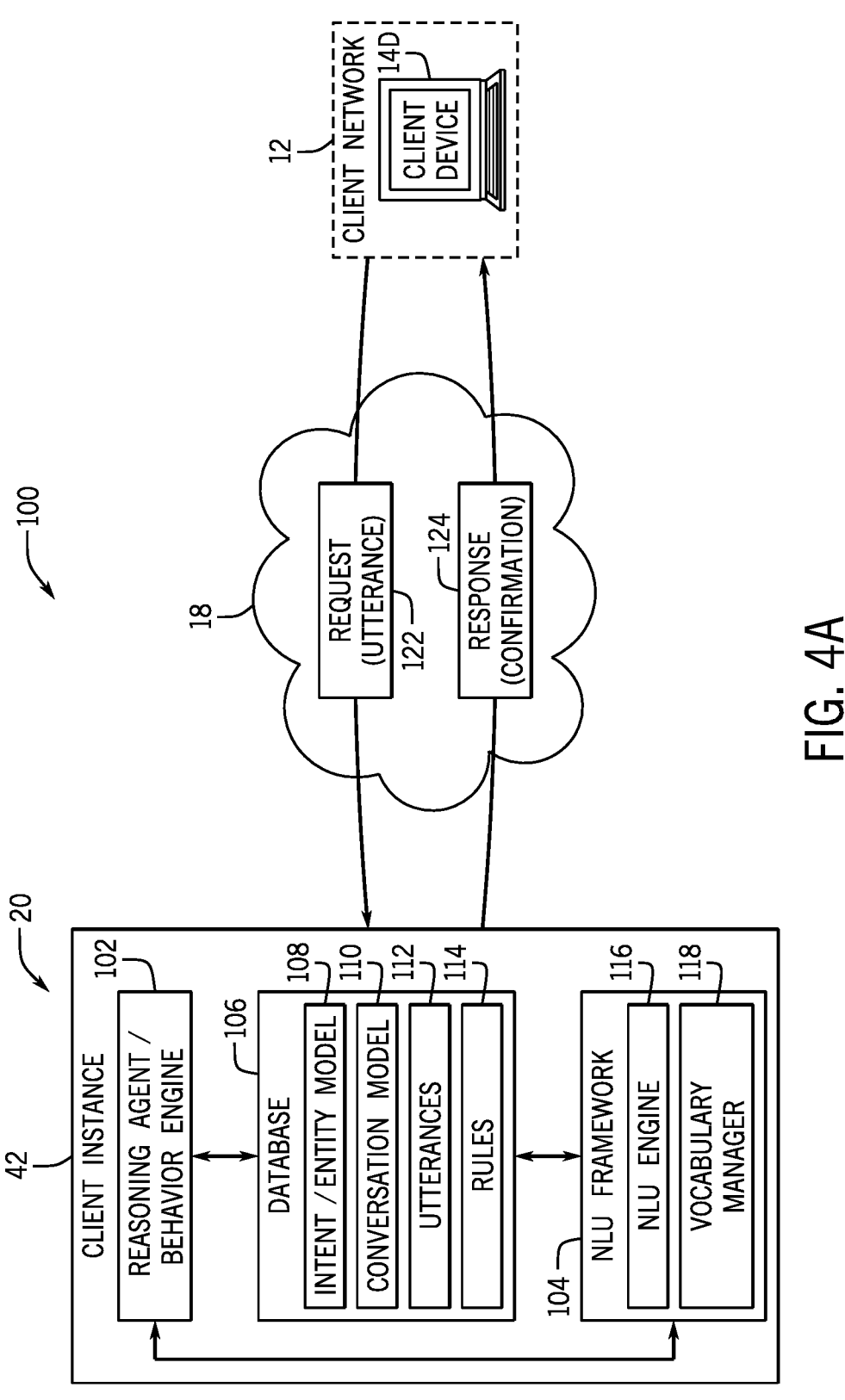
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124 or agent confirmations 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," which is incorporated by reference herein in its entirety for all purposes. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118, which may be part of the vocabulary subsystem discussed below, addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address the request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework 104 discussed below, processes the utterance 122 based on the intent/entity model 108 to derive intents/entities within the utterance 122. Based on the intents/entities derived by the NLU engine 116, as well as the associations within the conversation model 110, the RA/BE 102 performs one or more particular pre-defined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework discussed below may be hosted by a separate instance (e.g., an enterprise instance) that is communicatively coupled to the client instance 42, as well as other client instances, to enable semantic intent mining and generation of the intent/entity model 108.

Figure 4B:
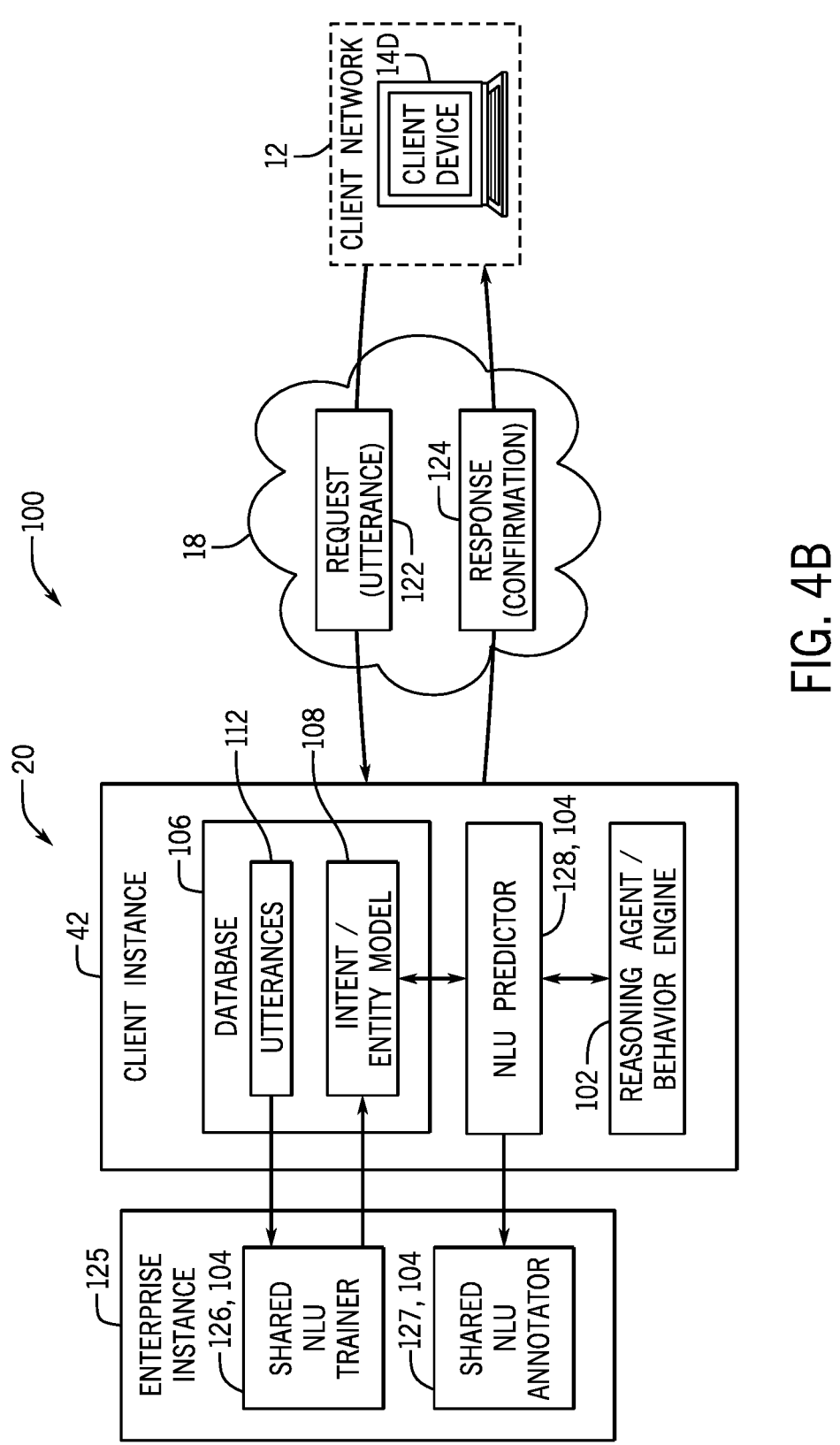
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud-based platform system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework 104 as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent/entity model 108, such that the RA/BE 102 can perform one or more actions based on the identified intents. It may be appreciated that the shared NLU annotator 127 may correspond to the meaning extraction subsystem, and the NLU predictor may correspond to the meaning search subsystem, of the NLU framework 104, as discussed below.

Figure 5:
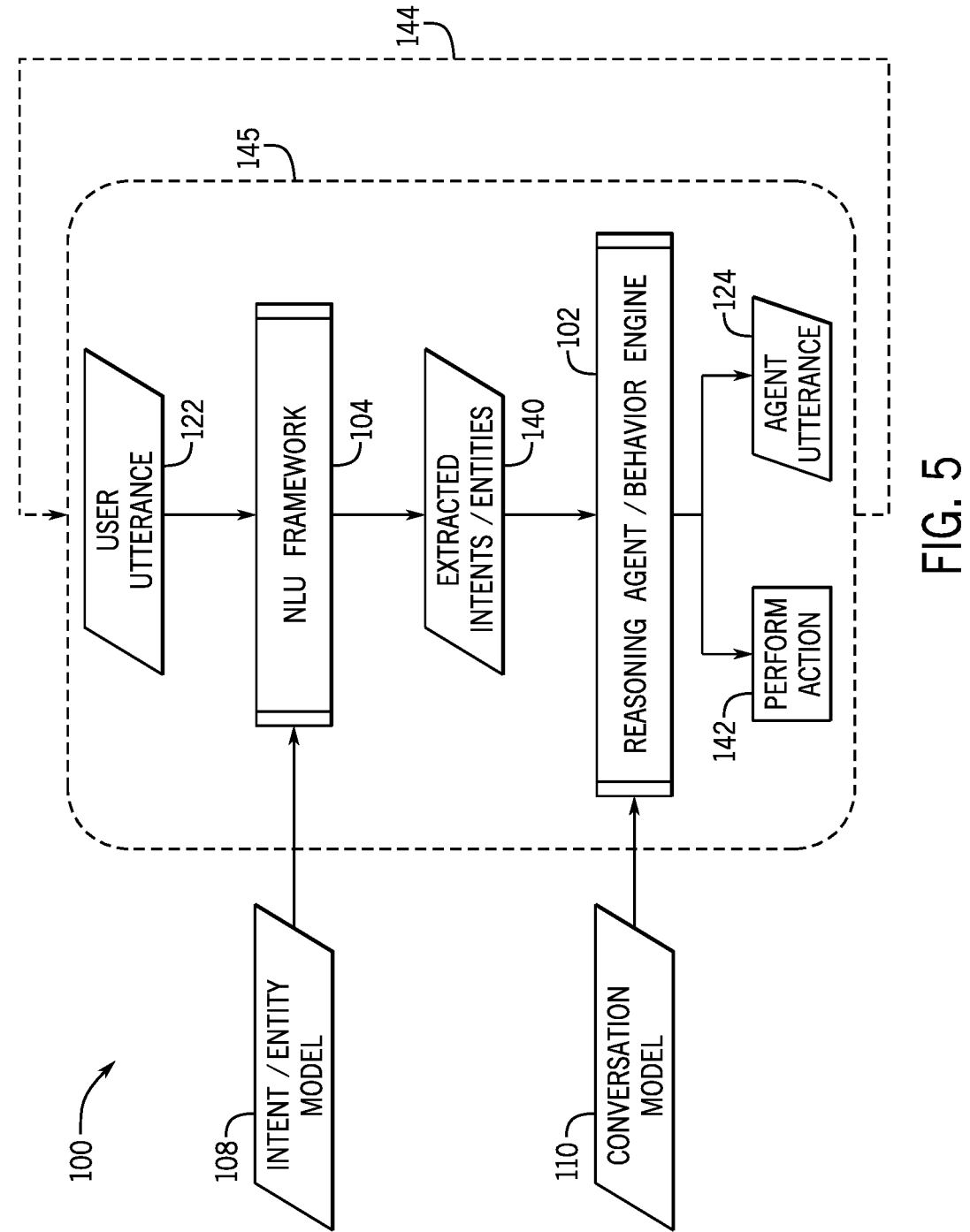
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
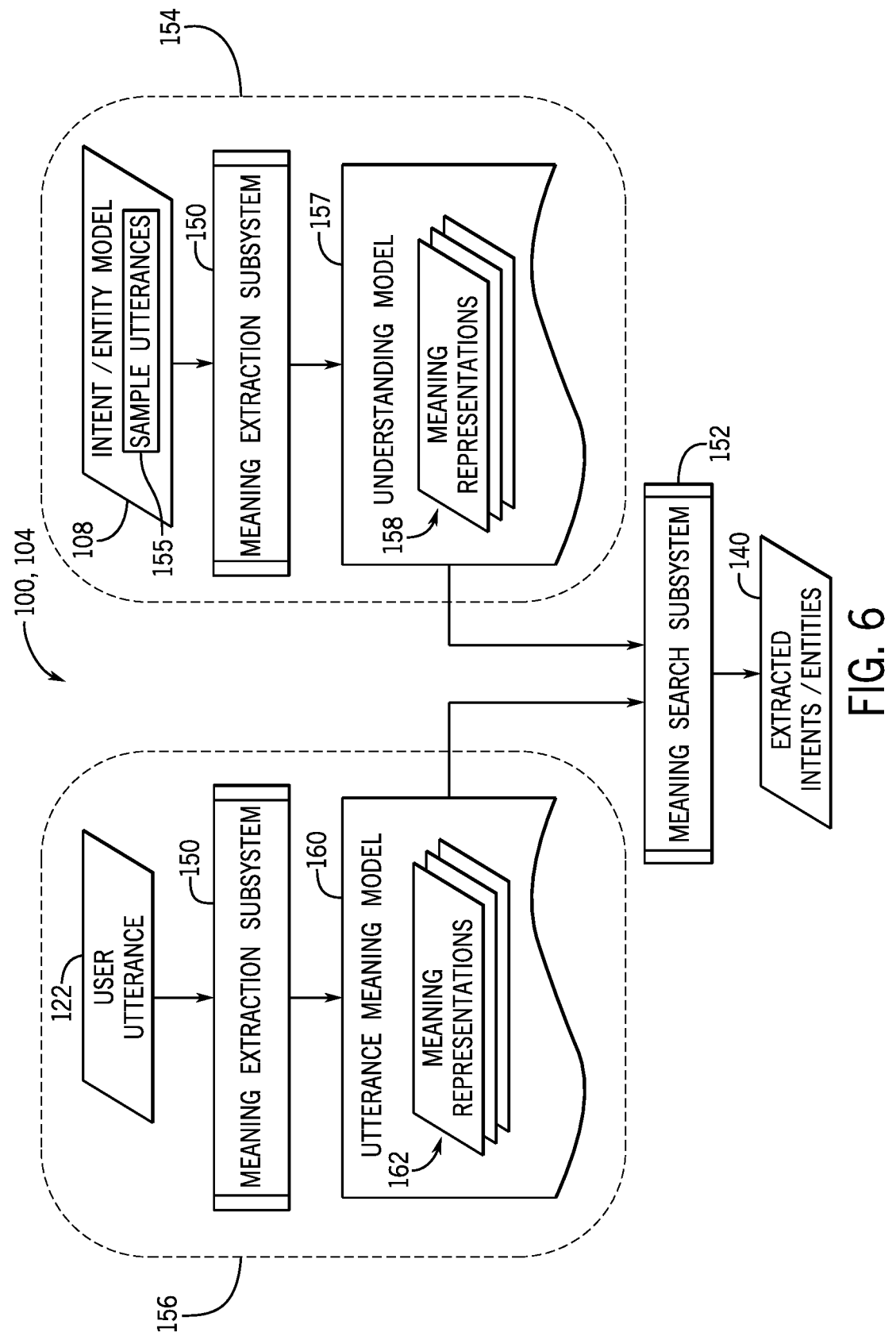
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an intent/entity model to yield a search space of an understanding model, and wherein the meaning search subsystem compares meaning representations of the utterance meaning model to meaning representations of the understanding model search space to extract intents and entities from the received user utterance, in accordance with aspects of the present technique.

As mentioned, the NLU framework 104 includes two primary subsystems that cooperate to convert the hard problem of NLU into a manageable search problem—namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, the right-hand portion 154 of FIG. 6 illustrates the meaning extraction subsystem 150 of the NLU framework 104 receiving the intent/entity model 108, which includes sample utterances 155 for each of the various intents/entities of the model. The meaning extraction subsystem 150 generates a search space of an understanding model 157 that includes meaning representations 158 of the sample utterances 155 of the intent/entity model 108. In other words, the search space of the understanding model 157 is a translated or augmented version of the intent/entity model 108 that includes meaning representations 158 to enable searching (e.g., comparison and matching) by the meaning search subsystem 152, as discussed below. As such, it may be appreciated that the right-hand portion 154 of FIG. 6 is generally performed in advance of receiving the user utterance 122, such as on a routine, scheduled basis or in response to updates to the intent/entity model 108.

For the embodiment illustrated in FIG. 6, the left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations 158 of the search space of the understanding model 157 define the search space in which the search key can be sought. Accordingly, the meaning search subsystem 152 searches the meaning representations 158 of the search space of the understanding model 157 to locate one or more intents/entities that match the meaning representation 162 of the utterance meaning model 160 as discussed below, thereby generating the extracted intents/entities 140.

Figure 7:
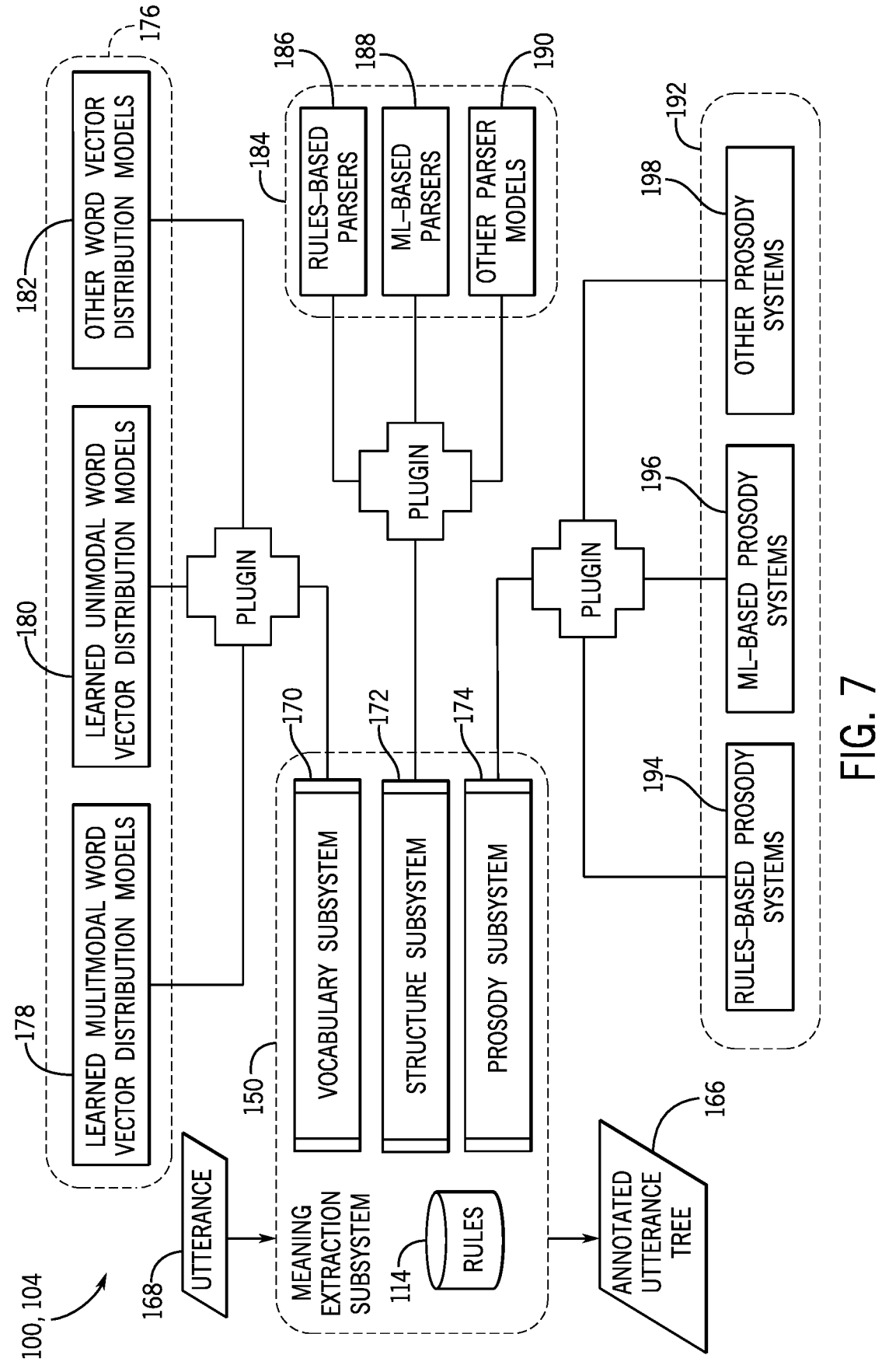
FIG. 7 is a block diagram illustrating an embodiment of the meaning extraction subsystem using a combination of rules-based methods and machine-learning (ML)-based methods within a vocabulary subsystem, a structure subsystem, and a prosody subsystem, to generate an annotated utterance tree for an utterance, in accordance with aspects of the present technique.

The meaning extraction subsystem of FIG. 6 itself includes a number of subsystems that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses rules-based methods interleaved with ML-based methods to generate an annotated utterance tree 166 for an utterance 168, which may be either a user utterance 122 or one of the sample utterances 155 of the intent/entity model 108, as discussed above with respect to FIG. 6. More specifically, FIG. 7 illustrates how embodiments of the meaning extraction subsystem 150 can include a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 includes three plugin-supported subsystems, namely a vocabulary subsystem 170, a structure subsystem 172, and a prosody subsystem 174, and the various outputs of these subsystems are combined according to the stored rules 114 to generate the annotated utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms, as discussed below with respect to FIG. 15. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plugins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based the stored rules 114 to generate word vectors for nodes of the annotated utterance tree 166, as discussed below. Moreover, the word vector distribution models 178, 180, and/or 182 can be continually updated based on unsupervised learning performed on received user utterances 122, as discussed below with respect to FIG. 15.

For the embodiment illustrated in FIG. 7, the structure subsystem 172 of the meaning extraction subsystem 150 analyzes a linguistic shape of the utterance 168 using a combination of rule-based and ML-based structure parsing plugins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the annotated utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plugins 196. The illustrated prosody plug-ins 192 include rule-based prosody systems 194, ML-based prosody systems 196, and other suitable prosody systems 198. Using these plugins, the prosody subsystem 174 analyzes the utterance 168 for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the annotated utterance tree 166, as discussed below.

As such, for the embodiment of the meaning extraction subsystem 150 illustrated in FIG. 7, the vocabulary subsystem 170, the structure subsystem 172, and the prosody subsystem 174 cooperate to generate the annotated utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the annotated utterance tree 166 from the utterance 168. The resulting annotated utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 16:
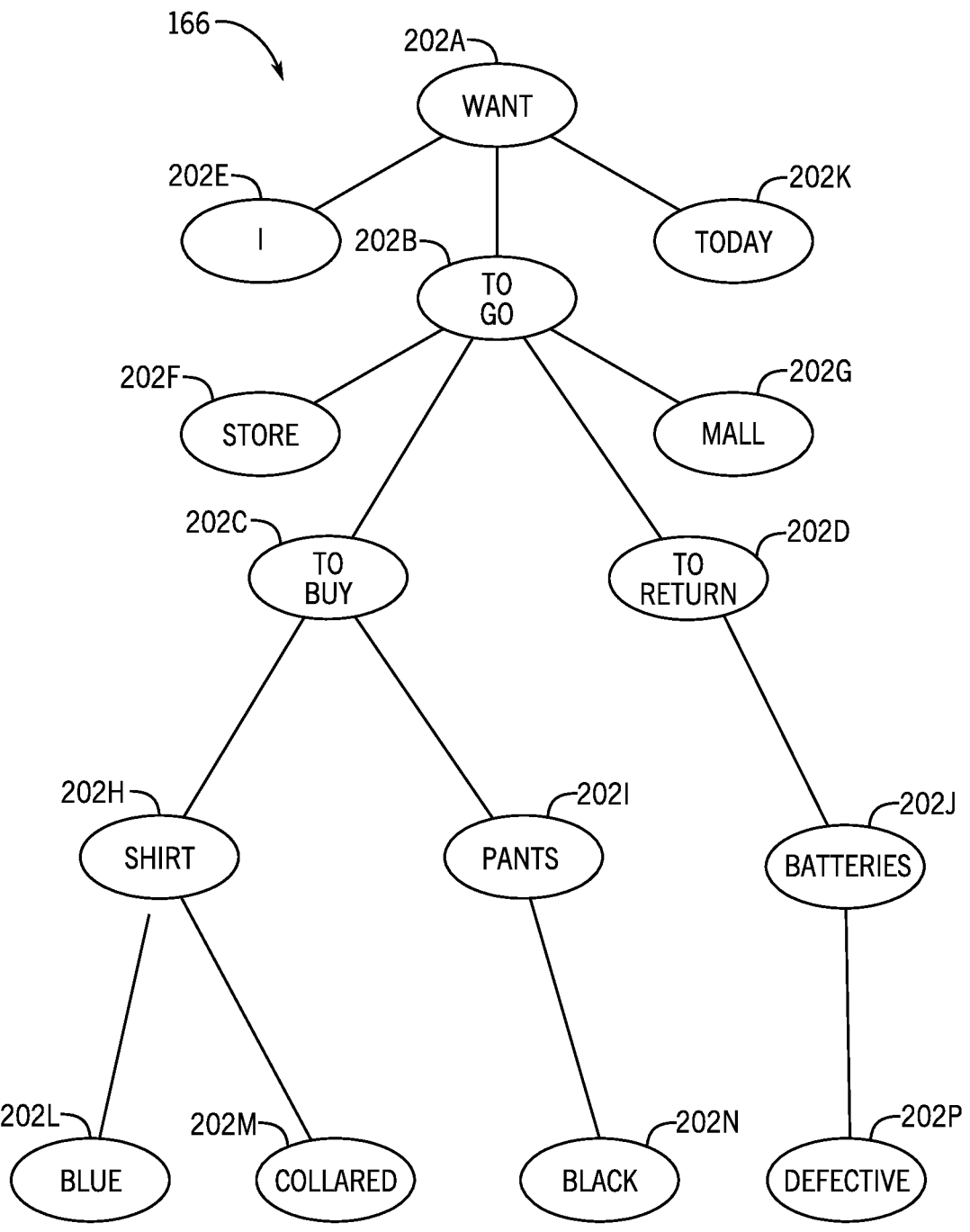
FIG. 16 is a diagram illustrating an embodiment of an annotated utterance tree, in accordance with aspects of the present technique.

For example, FIG. 16 is a diagram illustrating an example of an annotated utterance tree 166 generated for an utterance 168, in accordance with an embodiment of the present approach. As mentioned, the annotated utterance tree 166 is a data structure that is generated by the meaning extraction subsystem 150 based on the utterance 168. For the example illustrated in FIG. 16, the annotated utterance tree 166 is based on an example utterance, "I want to go to the store by the mall today to buy a blue, collared shirt and black pants and also to return some defective batteries." The illustrated annotated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, each node representing a particular word or phrase of the utterance 168. It may be noted that each of the nodes 202 may also be described as representing a particular subtree of the annotated utterance tree 166, wherein a subtree can include one or more nodes 202.

As mentioned, the form or shape of the annotated utterance tree 166 illustrated in FIG. 16 is determined by the prosody subsystem 174 and the structure subsystem 172 and represents the syntactic, grammatical meaning of the example utterance. More specifically, the prosody subsystem 174 segments the utterance, while the structure subsystem 172 constructs the annotated utterance tree 166 from these segments. Each of the nodes 202 store or reference a respective word vector that is determined by the vocabulary subsystem 170 to indicate the semantic meaning of the particular word or phrase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, each of the nodes 202 is annotated by the structure subsystem 172 with additional information about the word or phrase represented by the node. For example, in FIG. 16, each of the nodes 202 has a respective class annotation. In particular, for the example annotated utterance tree illustrated in FIG. 16, certain subtrees or nodes (e.g., nodes 202A, 202B, 202C, and 202D) are annotated to be verb nodes, and certain subtrees or nodes (e.g., nodes 202E, 202F, 202G, 202H, 202I, and 202J) are annotated to be subject or object nodes, and certain subtrees or nodes (e.g., nodes 202K, 202L, 202M, 202N, and 202P) are annotated to be modifier nodes (e.g., subject modifier nodes, object modifier nodes, verb modifier nodes) by the structure subsystem 172. As discussed below, these class annotations are used by the meaning search subsystem 152 when comparing meaning representations that are generated from annotated utterance trees, like the example annotated utterance tree 166 illustrated in FIG. 16. As such, it may be appreciated that the annotated utterance tree 166, from which the meaning representations are generated, serves as a basis (e.g., an initial basis) for intent/entity extraction.

Figure 8:
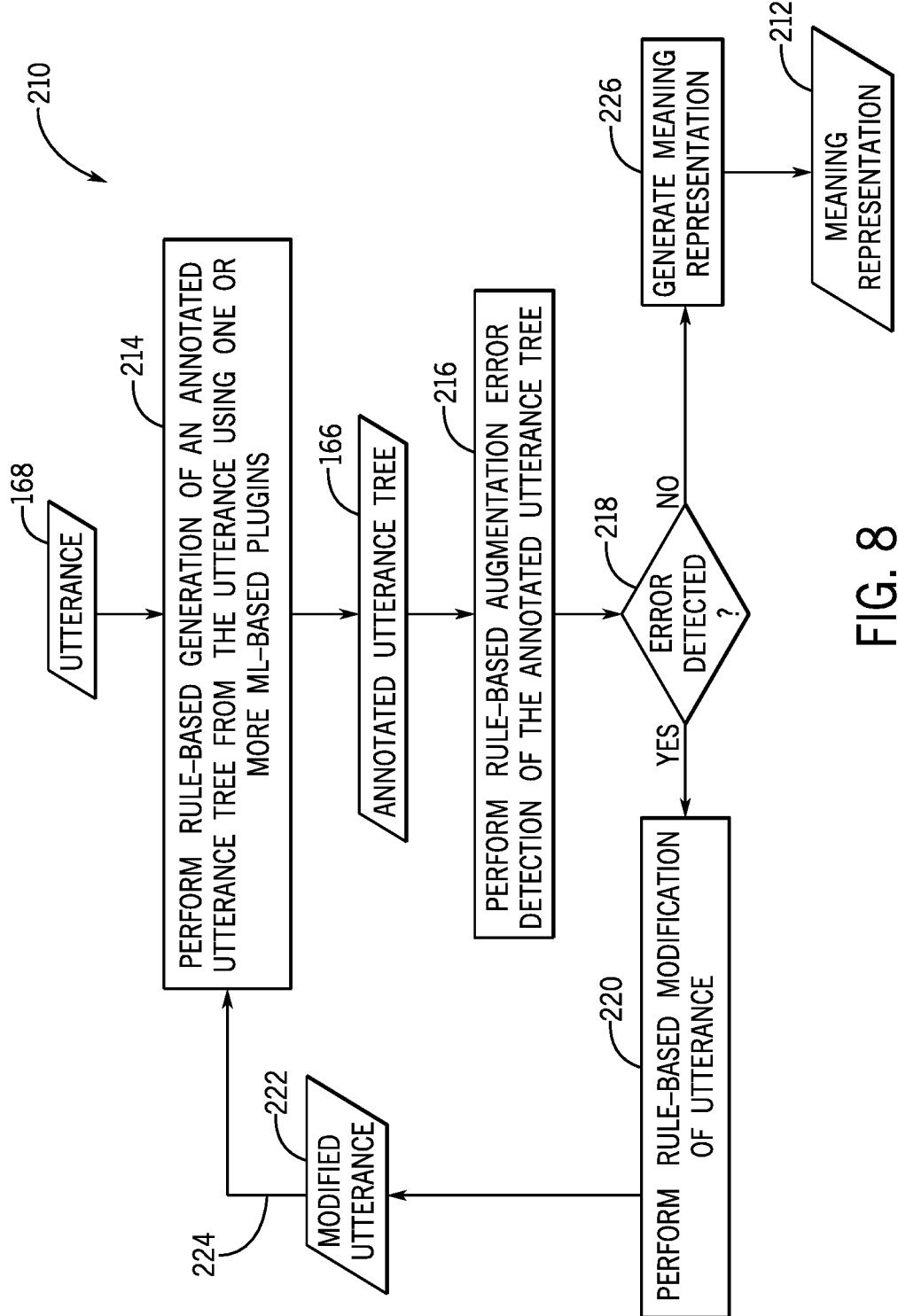
FIG. 8 is a flow diagram illustrating an example process by which the meaning extraction subsystem performs error correction of an annotated utterance tree of an utterance before generating the corresponding meaning representation of the utterance, in accordance with aspects of the present technique.

It may also be noted that, in certain embodiments, the meaning extraction subsystem 150 includes rule-based error detection and correction mechanisms for improved domain specificity. For example, FIG. 8 is a flow diagram illustrating an embodiment of a process 210 whereby the meaning extraction subsystem 150 can iteratively generate and then analyze the annotated utterance tree 166 for errors before a corresponding meaning representation 212 is generated for searching. In other words, to accommodate inaccuracies and unexpected output from ML-based models of the vocabulary subsystem 170, the structure subsystem 172, and/or the prosody subsystem 174, the meaning extraction subsystem 150 is capable of performing a rule-based automated error detection process before the corresponding meaning representation 212 is generated. It may be appreciated that, when the utterance 168 is a user utterance 122, the corresponding meaning representation 212 becomes part of the meaning representations 162 of the utterance meaning model 160, and when the utterance is one of the sample utterances 155 of the intent/entity model 108, the corresponding meaning representation 212 becomes part of the meaning representations 158 of the search space of the understanding model 157, as discussed above with respect to FIG. 6.

For the embodiment illustrated in FIG. 8, the process 210 begins with the meaning extraction subsystem 150 of the NLU framework 104 generating (block 214) the annotated utterance tree 166 from the utterance 168 using one or more ML-based plugins (e.g., ML-based parsers 188 or ML-based prosody systems 196), as discussed above. In certain embodiments, this step may include a preliminary cleansing and augmentation step performed before the annotated utterance tree 166 is generated. For example, in certain embodiments, this preliminary cleansing and augmentation step may involve the vocabulary subsystem 170, the structure subsystem 172, and/or the prosody subsystem 174 modifying the utterance 168 based on the stored rules 114. By way of specific example, during this step, the utterance 168 may be processed by the vocabulary subsystem 170 to modify words of the utterance (e.g., substitute synonyms, correct misspellings, remove punctuation, address domain-specific syntax and terminology, combine words, separate compounds words and contractions) based on the rules 114. Then, the vocabulary subsystem 170, the structure subsystem 172, and the prosody subsystem 174 of the meaning extraction subsystem 150 can cooperate to generate the annotated utterance tree 166 from the utterance 168 based on the stored rules 114.

Additionally, for the embodiment illustrated in FIG. 8, the process 210 includes a rule-based augmentation error and detection step (block 216) in which the generated annotated utterance tree 166 is analyzed for errors based on the stored rules 114. These errors may include, for example, misclassification, misparses, and so forth, by one or more ML-based plugins of the meaning extraction subsystem 150. When, during the rule-based augmentation error and detection step of block 216, the meaning extraction subsystem 150 detects an error (decision block 218), then the meaning extraction subsystem 150 performs a rule-based correction (block 220) to generate a modified utterance 222 from the original or previous utterance 168 based on the stored rules 114.

In situations in which errors are detected in block 218, once the correction has been applied in block 220, the annotated utterance tree 166 is regenerated in block 214 from the modified utterance 222 based on the rules 114, as indicated by the arrow 224. In certain embodiments, this cycle may repeat any suitable number of times, until errors are no longer detected at decision block 218. At that point, the meaning extraction subsystem 150 generates (block 226) the corresponding meaning representation 212 to be processed by the meaning search subsystem 152, as discussed below. In certain embodiments, information regarding the corrections performed in block 220 and the resulting annotated utterance tree 166 that is converted to the meaning representation 212 may be provided as input to train one or more ML-based plugins of the meaning extraction subsystem 150 (e.g., ML-based parsers 188 or ML-based prosody systems 196), such that the erroneous annotated utterance trees can be avoided when processing future utterances.

Figure 9:
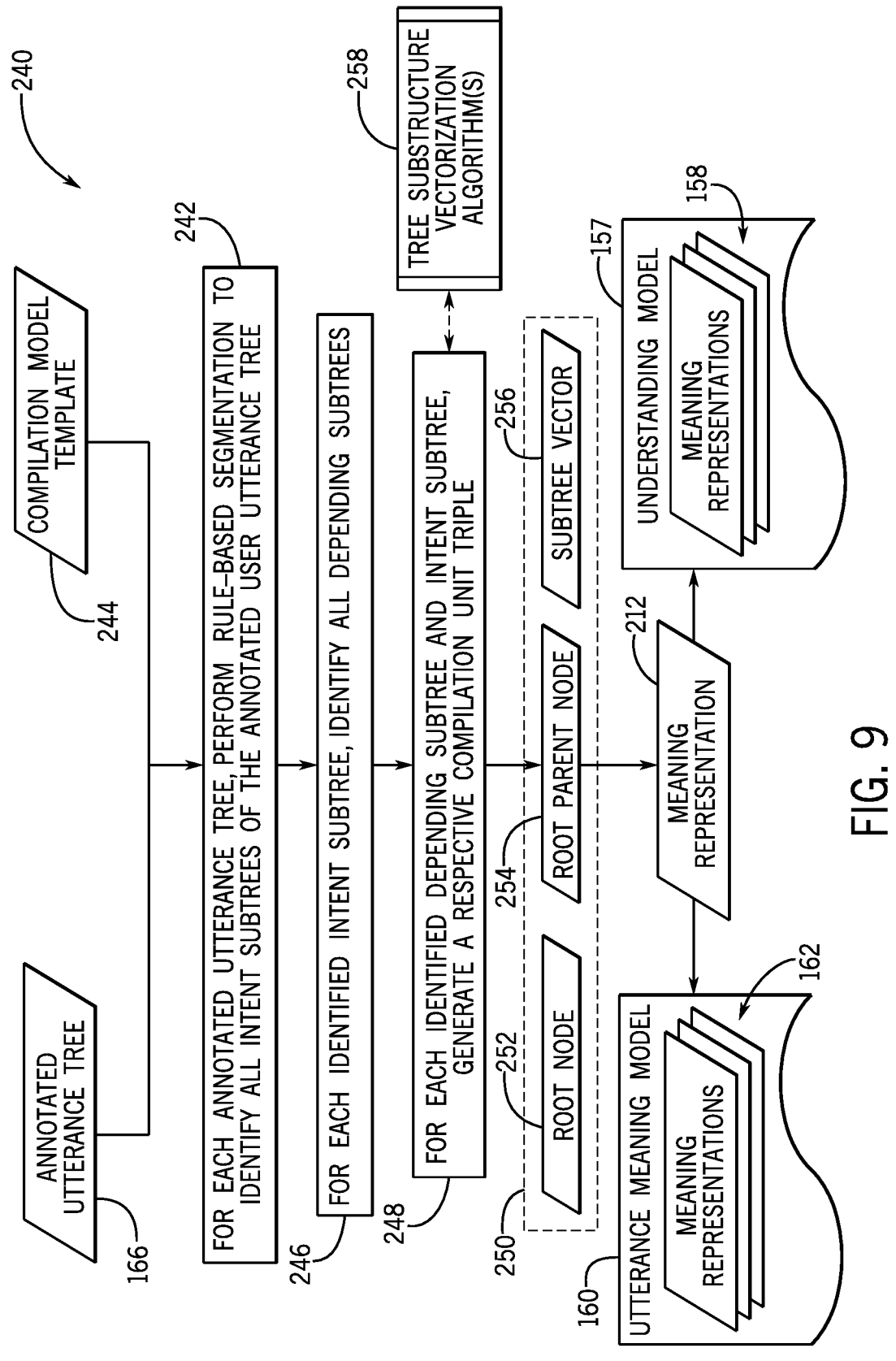
FIG. 9 is a flow diagram illustrating an example process by which the meaning extraction subsystem generates a meaning representation of the understanding model search space or the utterance meaning model based on the annotated utterance trees and a compilation model template, in accordance with aspects of the present technique.

In certain embodiments, generating the corresponding meaning representation 212 for the annotated utterance tree 166 (block 226) may include determining compilation unit information (e.g., root nodes, parent root nodes, and subtree vectors) and optimizing the meaning representations for search. For example, FIG. 9 is a flow diagram illustrating an embodiment of a process 240 whereby the meaning extraction subsystem 150 generates the corresponding meaning representation 212 from the annotated utterance tree 166. To do this, the prosody subsystem 174 of the meaning extraction subsystem 150 takes the annotated utterance tree 166 and performs a segmentation step (block 242) based on one or more stored rules 114 (e.g., intent segmentation rules). During this segmentation step, the annotated utterance tree 166 is segmented or divided into individual intent subtrees, each representing an atomic intent of the annotated utterance tree 166. This intent segmentation step may also involve information from a compilation model template 244, which may be part of a compilation model template table or database (e.g., associated with the database 106 of FIGS. 4A and 4B). The compilation model template 244 stores data indicating how meaning representations 162 and 158 are to be generated by the meaning extraction subsystem 150 and compared to one another by the meaning search subsystem 152, as is discussed below in greater detail.

For the embodiment illustrated in FIG. 9, for each intent subtree identified in block 242, the meaning extraction subsystem 150 identifies (block 246) all corresponding subtrees that depend from each particular intent subtree. Then, for each of these intent trees and corresponding subtrees, the meaning extraction subsystem 150 generates (block 248) a respective compilation unit triple 250. In particular, the illustrated compilation unit triple 250 includes: a reference 252 to a root node of a subtree, a reference 254 to a parent of the root node of the subtree, and a subtree vector 256 that is representative of the semantic meaning of the subtree. The aforementioned compilation model template 244 defines one or more tree substructure vectorization algorithms 258 that produce vectors for each of the corresponding subtrees, as discussed in greater detail below.

Once the compilation unit triples 250 have been generated for the annotated utterance tree 166, the annotated utterance tree 166 is converted into the meaning representation 212. In certain embodiments, certain information that is not relevant to the meaning search subsystem 152 (e.g., certain classes of nodes, certain annotation data) may be removed during this step to minimize the size of the meaning representation 212 for enhanced efficiency when searching. The generated meaning representation 212 subsequently becomes one of the meaning representations 162 of the utterance meaning model 160 or one of the meaning representations 158 of the search space of the understanding model 157, depending on the origin of the utterance 168 represented by the annotated utterance tree 166, as discussed above.

Figure 17:
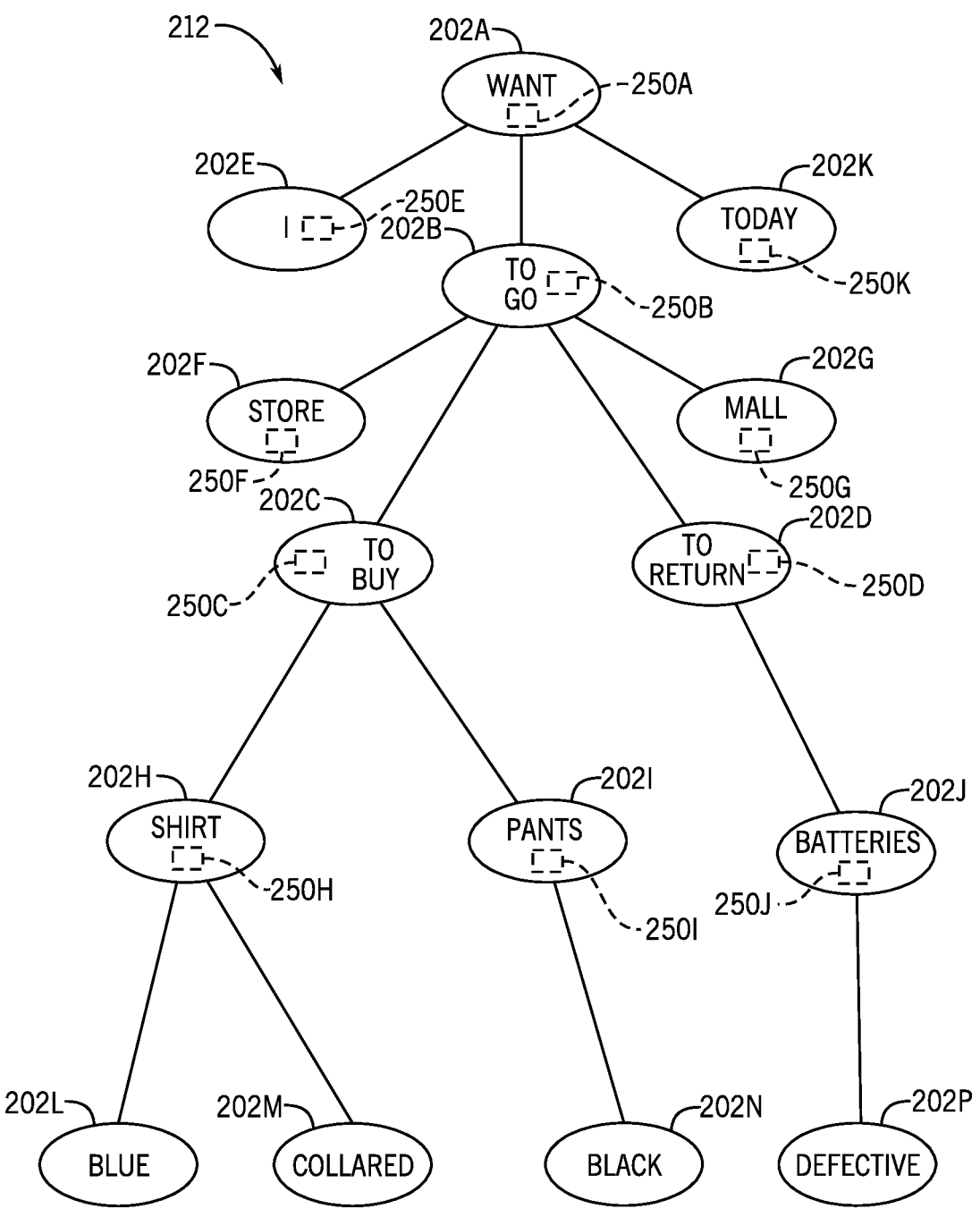
FIG. 17 is a diagram illustrating an embodiment of a meaning representation, in accordance with aspects of the present technique.

To more clearly illustrate, FIG. 17 is a diagram presenting an example of a meaning representation 212 generated for the example annotated utterance tree 166 of FIG. 16, in accordance with an embodiment of the present approach. As mentioned, the meaning representation 212 is a data structure generated from the annotated utterance tree 166 by the meaning extraction subsystem 150. As such, certain nodes of the meaning representation 212 include compilation unit triples 250 that were generated using the process 240 of FIG. 9. In particular, all of the intent subtrees (e.g., subtrees from nodes 202A, 202B, 202C, and 202D), and all of the subtrees that depend from these intent subtrees (e.g., subtrees 202E, 202F, 202G, 202H, 202I, 202J), include a respective compilation unit triple 250 (e.g., compilation unit triples 250A, 250B, 250C, 250D, 250E, 250F, 250G, 250H, 250I, and 250J). Further, as discussed above, each of these compilation unit triples 250 includes a respective subtree vector that is generated based the vectors (e.g., word vectors and/or subtree vectors) of depending nodes and/or subtrees.

Figure 10:
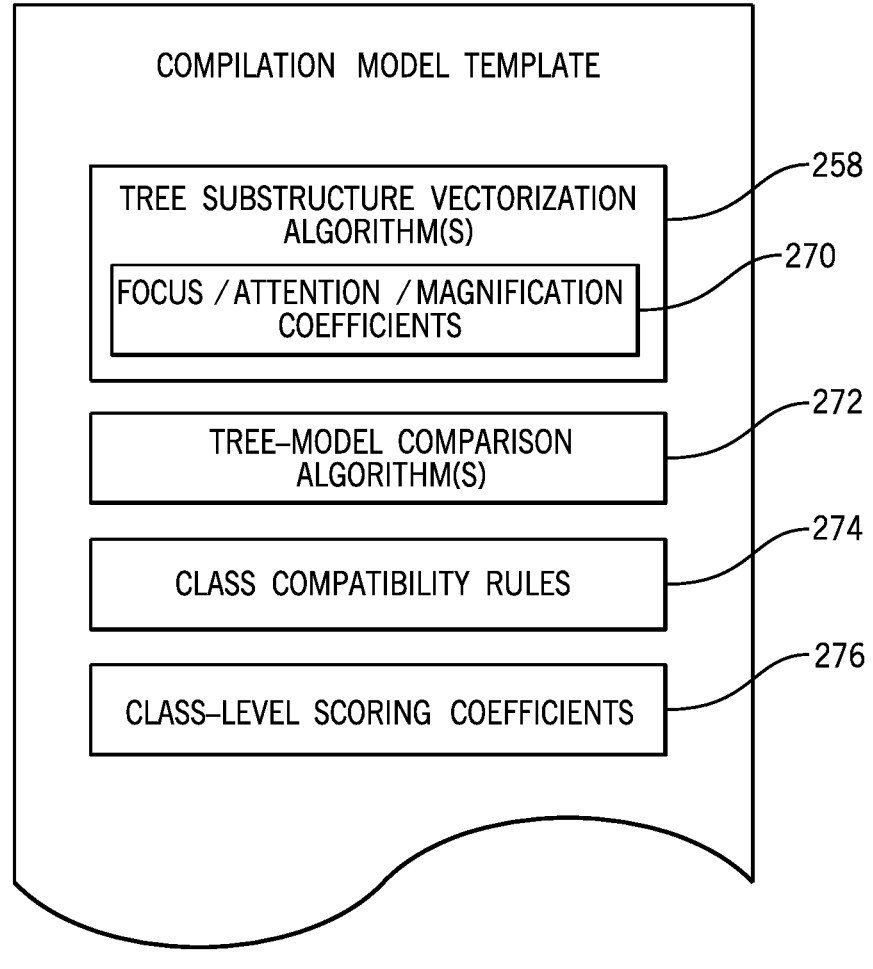
FIG. 10 is a block diagram illustrating an embodiment of the compilation model template, in accordance with aspects of the present technique.

FIG. 10 is a diagram that illustrates an example embodiment of the compilation model template 244 mentioned above. Data stored within the compilation model template 244 generally defines how the meaning extraction subsystem 150 generates subtree vectors for the annotated utterance trees 166 as part of the compilation unit triple 250 determined in block 248 of FIG. 9. Further, data stored within the compilation model template 244 generally defines how the meaning search subsystem 152 compares and scores similarity between the meaning representations 162 of the utterance meaning model 160 and the meaning representations 158 of the search space of the understanding model 157, as illustrated in FIG. 6. In certain embodiments, the compilation model template 244 may be stored as one or more tables of the database 106 illustrated in FIGS. 4A and 4B, or within another suitable data structure, in accordance with the present disclosure.

As mentioned with respect to FIG. 9, the compilation model template 244 illustrated in FIG. 10 includes one or more tables identifying or storing one or more pluggable tree substructure vectorization algorithms 258 that generate the subtree vectors 256 of the compilation unit triples 250. As illustrated, the tree substructure vectorization algorithms 258 may be associated with focus/attention/magnification (FAM) coefficients 270. For such embodiments, these FAM coefficients 270 are used to tune how much relative focus or attention (e.g., signal magnification) should be granted to each portion of a subtree when generating a subtree vector. The tree-model comparison algorithms 272, the class compatibility rules 274, and the class-level scoring coefficients 276 of the compilation model template 244 illustrated in the compilation model template 244 of FIG. 10 are discussed below.

Figure 11:
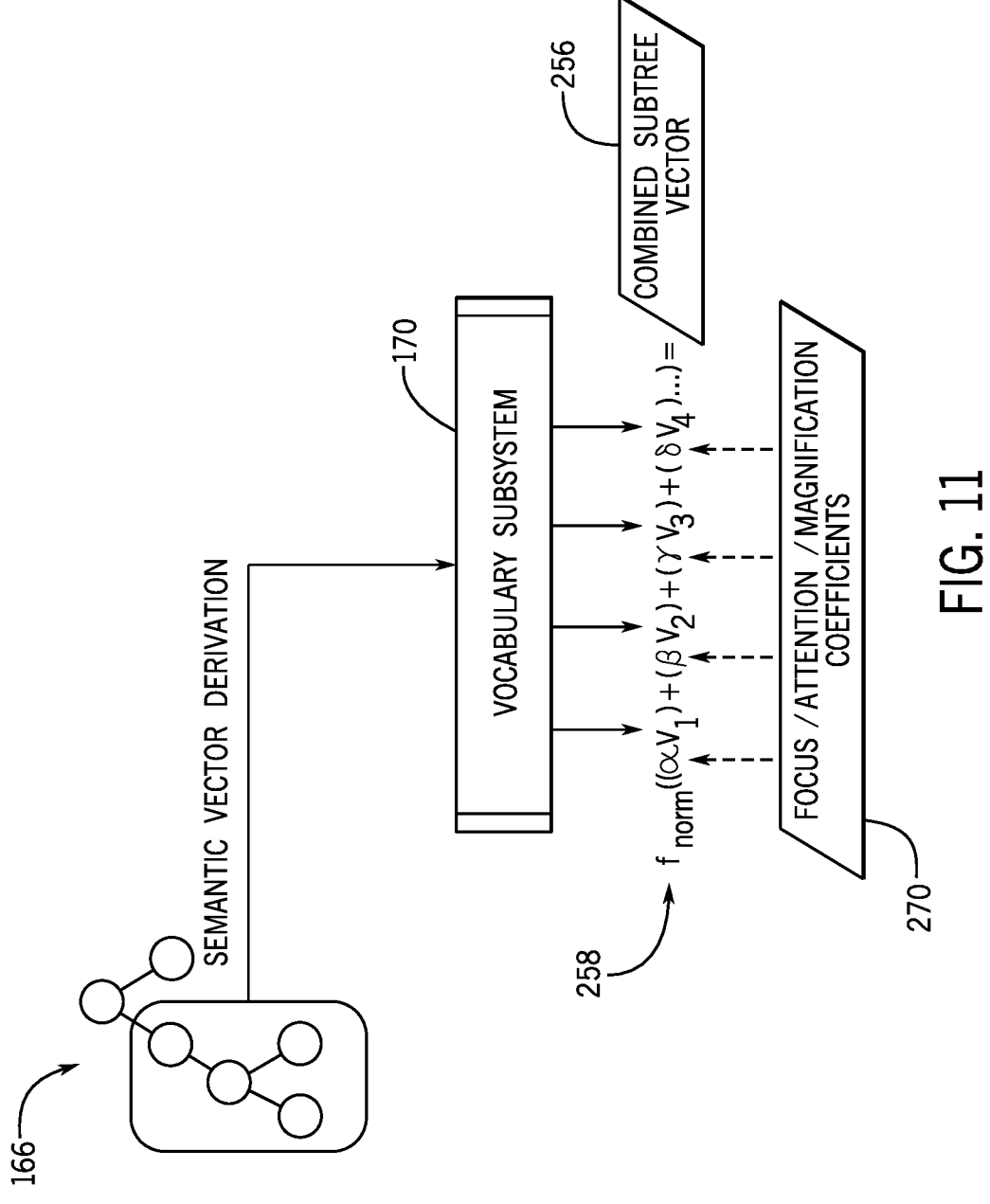
FIG. 11 is a block diagram illustrating example operation of an embodiment of a tree substructure vectorization algorithm to generate a combined subtree vector for a subtree of an annotated utterance tree, in accordance with aspects of the present technique.

FIG. 11 is a block diagram illustrating example operation of an embodiment of a tree substructure vectorization algorithm 258 to generate a subtree vector 256, which is part of the compilation unit triple 250 determined for subtrees of the annotated utterance tree 166, as discussed with respect to FIG. 9. As mentioned above, the vocabulary subsystem 170 provides word vectors for each node 202 of an annotated utterance tree 166. For the illustrated embodiment, the vocabulary subsystem 170 generated four or more word vectors, represented as $V_1$, $V_2$, $V_3$, and $V_4$, which are respectively associated with four nodes of the annotated utterance tree 166. That is, in certain embodiments, the NLU framework 104 may modify the annotated utterance tree 166 (e.g., the vocabulary subsystem 170 may replace individual words with phrasal equivalents, the structure subsystem 172 may expand contractions, and so forth), as discussed with respect to FIG. 8. As such, it is appreciated that, at one or more stages of intent/entity extraction, the number of nodes/subtrees of the annotated utterance tree 166 may be increased or decreased, along with the number of word vectors combined to calculate the subtree vector 256, relative to an original utterance or an initially generated annotated utterance tree 166.

As such, for the example illustrated in FIG. 11, the tree substructure vectorization algorithm 258 generates the subtree vector 256, by first multiplying each of the word vectors by a respective one (e.g., α, β, γ, δ) of the FAM coefficients 270, which increases or decreases the contribution of each word vector to the combined subtree vector 256. After applying the FAM coefficients 270 to the word vectors $V_{1-4}$, the results are combined using vector addition, as indicated by the "+" notation in FIG. 11. Additionally, for the illustrated embodiment, the resulting subtree vector 256 is subsequently normalized to ensure that the dimensions of the combined subtree vector are each within a suitable range after the multiplication and addition operations. It may be noted that the tree substructure vectorization algorithm 258 illustrated in FIG. 11 is merely provided as an example, and in other embodiments, other suitable tree substructure vectorization algorithms may be used, in accordance with the present disclosure.

By way of example, in certain embodiments, verb words or subtrees may be associated with one of the FAM coefficients 270 (e.g., a) that is greater in value than another FAM coefficient (e.g., B) associated with a subject or direct object word or subtree vector. In certain embodiments, root node word vectors may be associated with a relatively higher FAM coefficient 270 than word vectors associated with other nodes. In certain embodiments, the combined subtree vector 256 is a centroid that is calculated as the weighted average of the word vectors associated with all nodes of the subtree. In other embodiments, the meaning extraction subsystem 150 may recursively perform subtree vectorization to a predefined depth or until a particular node class is identified (e.g., a subject node, a modifier node). In certain embodiments, one or more of the vectors (e.g., $V_1$, $V_2$, $V_3$, and $V_4$) that are used to generate the combined subtree vector may itself be a combined subtree vector that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 12:
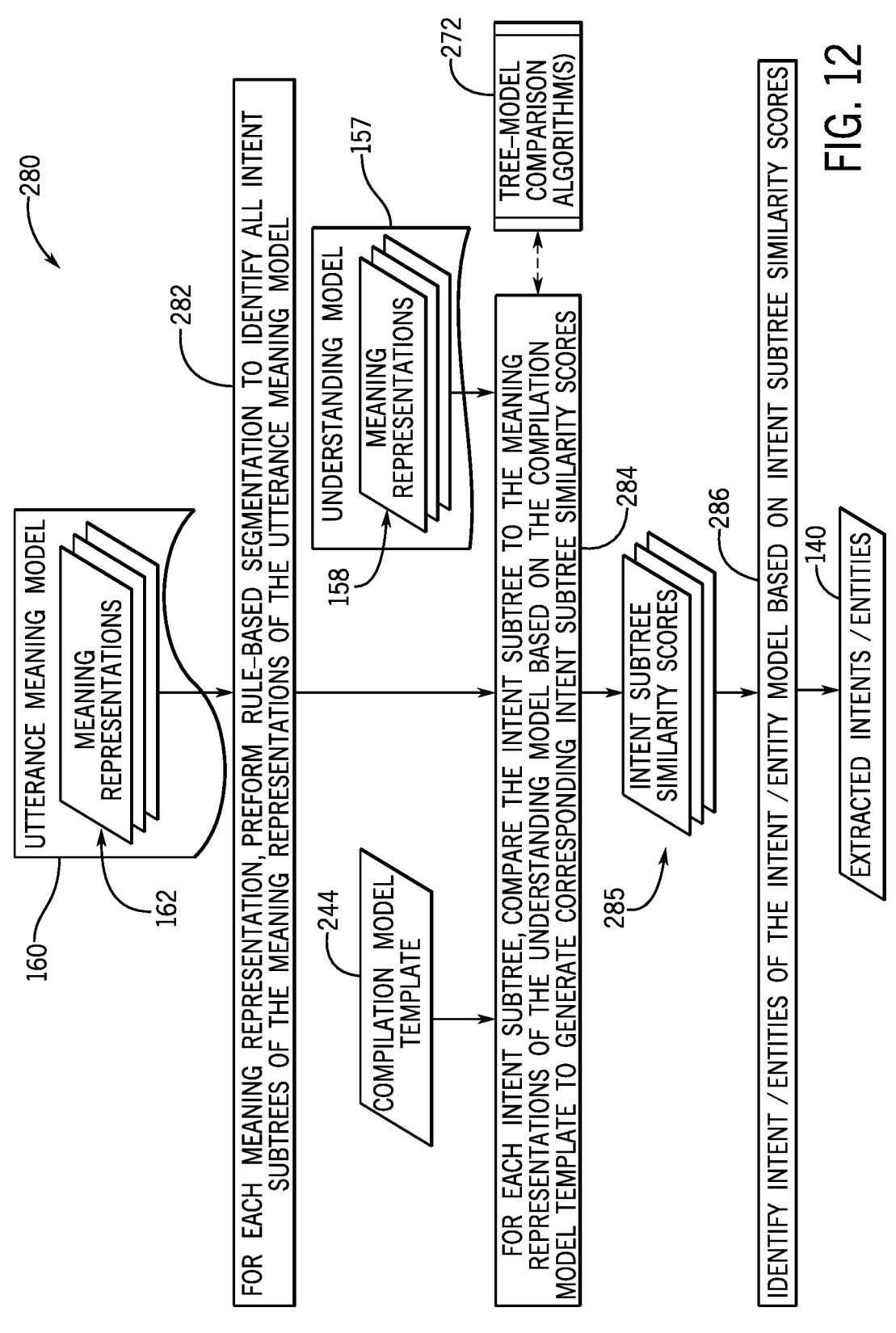
FIG. 12 is a flow diagram illustrating an example process by which the meaning search subsystem searches the meaning representations of the understanding model search space for matches to the meaning representation of the user utterance, in accordance with aspects of the present technique.

Once the meaning representations 158 and 162 have been generated, as illustrated in FIG. 6, the meaning search subsystem 152 can compare these meaning representations to extract intent/entities from the user utterance 122. FIG. 12 is a flow diagram illustrating an example embodiment of a process 280 whereby the meaning search subsystem 152 searches the meaning representations 158 of the search space of the understanding model 157 for matches to the meaning representation 162 of the user utterance 122 based on information stored in the compilation model template 244. For the embodiment illustrated in FIG. 12, the meaning search subsystem 152 receives the at least one meaning representation 162 of the utterance meaning model 160 generated in FIG. 9, as discussed above. Using the prosody subsystem 174 discussed above, the meaning search subsystem 152 first segments (block 282) the meaning representations 162 into intent subtrees, each representing an atomic intent, based on one or more stored rules 114 (e.g., intent-segmentation rules).

For the embodiment illustrated in FIG. 12, for each intent subtree of the meaning representation 162 identified in block 282, the meaning search system 152 compares (block 284) the subtree of the meaning representation 162 to the meaning representations 158 of the search space of the understanding model 157, based on the contents of the compilation model template 244, to generate corresponding intent-subtree similarity scores 285 using the tree-model comparison algorithm 272. For the embodiment illustrated in FIG. 12, the meaning search system 152 then adds (block 286) the similarity scores calculated in block 284 to the utterance meaning model 160, which may serve as the extracted intent/entities 140 that are passed to the RA/BE 102, as illustrated in FIG. 5. In other embodiments, the meaning search system 152 may generate a different data structure (e.g., a simpler, smaller data structure) to represent the extracted intents/entities 140 that includes only the identified intents/entities from the user utterance 122 (or references to these intent/entities in the intent/entity model 108) along with the intent-subtree similarity scores 285 as a measure of confidence in the intent/entity extraction. In still other embodiments, the extracted intents/entities 140 may only include intents/entities associated with intent subtree similarity scores greater than a predetermined threshold value, which may be stored as part of the compilation model template 244.

Returning briefly to FIG. 10, the illustrated compilation model template 244 includes one or more tables identifying or storing one or more tree model comparison algorithms 272 that are used to compare and score similarity between the meaning representations 162 of the utterance meaning model 160 and the meaning representations 158 of the search space of the understanding model 157, as illustrated in FIG. 6. As discussed in greater detail, the tree model comparison algorithms 272 are pluggable modules defined or identified in the compilation model template 244 that are designed to determine a similarity score between two subtree vectors generated by the substructure vectorization algorithms 258, based on class compatibility rules 274 that are also stored as part of the compilation model template 244. The class compatibility rules 274 define which classes of subtree vectors can be compared to one another (e.g., verb word and subtree vectors are compared to one another, subject or object word and subtree vectors are compared to one another) to determine vector distances that provide measures of meaning similarity therebetween.

Figure 13:
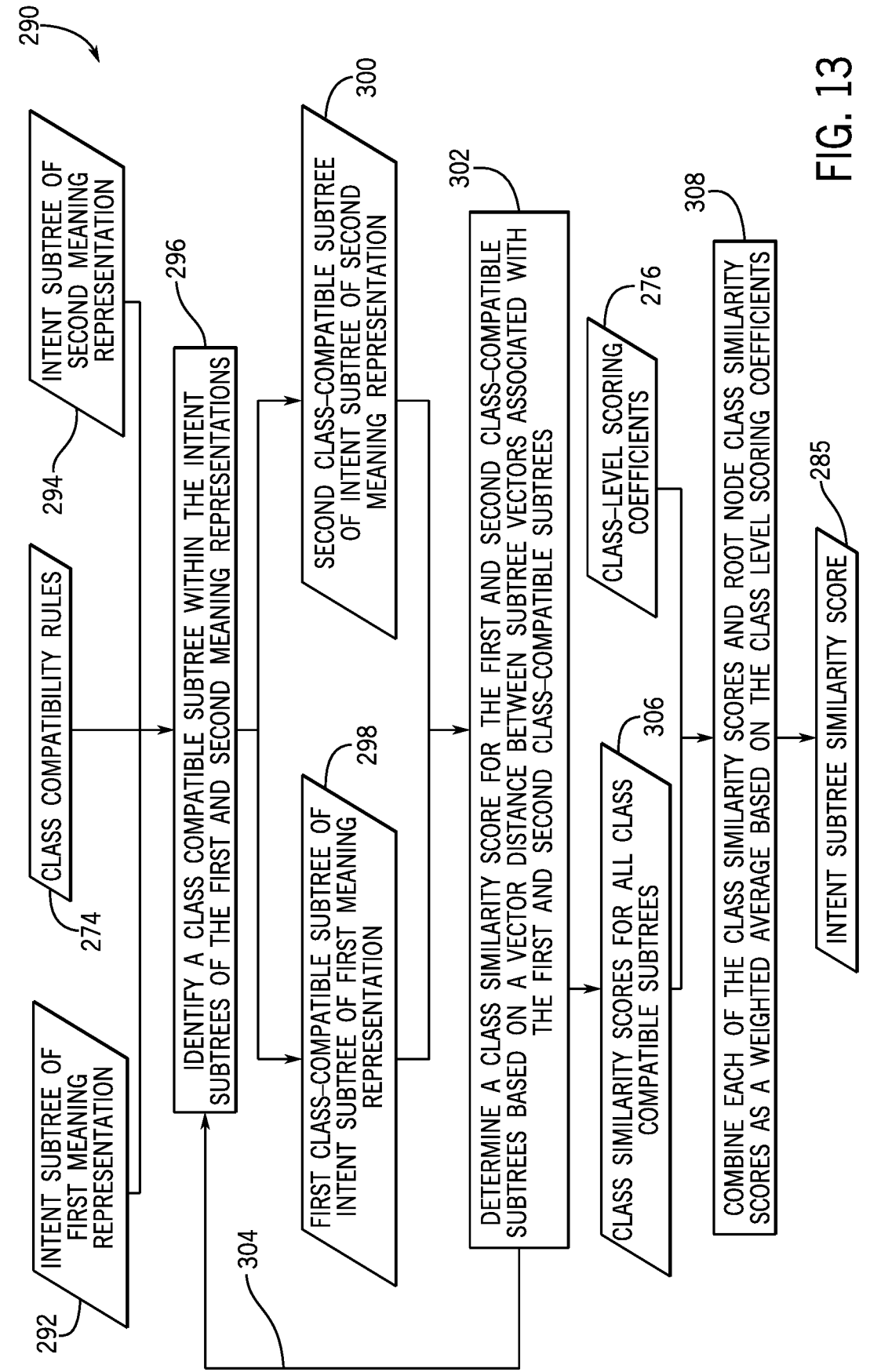
FIG. 13 is a flow diagram illustrating an embodiment of a process by which a tree-model comparison algorithm compares an intent subtree of a first meaning representation to an intent subtree of a second meaning representation, based on the compilation model template, to generate an intent subtree similarity score, in accordance with aspects of the present technique.

The illustrated embodiment of the compilation model template 244 also includes class-level scoring coefficients 276 that define different relative weights in which different classes of word/subtree vectors contribute to an overall similarity score between two subtrees, as discussed with respect to FIG. 13. For example, in certain embodiments, a verb subtree similarity score may be weighted higher and contribute more than a subject subtree similarity score. This sort of weighting may be useful for embodiments in which the agent automation system 100 tends to receive specific natural language instructions. Additionally, in certain embodiments, both the action being requested and the object upon which this action should be applied may be considered more important or influential to the meaning of an utterance than the subject, especially when the subject is the agent automation system 100. For such embodiments, a verb subtree similarity score and a direct object subtree similarity score may be weighted higher and contribute more to the overall similarity score than a subject subtree similarity score. In certain embodiments, the class-level scoring coefficients 276 may be predefined, derived or updated using a ML-based approach, derived or updated using a rule-based approach, or a combination thereof.

As such, in certain embodiments, subtrees are considered a match (e.g., are afforded a higher similarity score) when they resolve to prescribed syntactic patterns found within a larger form. For instance, for an utterance determined to be in an active form (e.g., a subject-verb-any form, as detected by a rules-based parser 186 of the structure subsystem 172 using pre-defined pattern rules), a direct subject subtree (which could be a single word or a complete clause) of the verb may be treated as the subject argument to the verb-led form. Likewise, for an utterance determined to be in a passive form (e.g., a form with passive auxiliaries to the verb), then a prepositional object attached to a specific form of preposition attached to the verb may be treated as the subject equivalent. For example, certain subject (e.g., direct subject) or object (e.g., direct object, indirect object, prepositional object) subtrees are compatible with other subject or object subtrees and can be compared. As a specific example, a first utterance, "Bob ate cheese," is in the active form and, therefore, "Bob" is the direct subject of a form of the verb "to eat." In a second example utterance, "Cheese was eaten by Bob," "was" is a passive auxiliary that indicates, along with the verb form, that the second utterance is in the passive form. For the second example utterance, "by Bob" is the prepositional phrase, with "Bob" being the prepositional object. Accordingly, "Bob" in the first utterance (e.g., as a direct subject in the active form) is compatible with "Bob" in the second utterance (e.g., as a prepositional object in the passive form) and can be compared as described.

FIG. 13 illustrates an embodiment of a process 290 in which an example tree-model comparison algorithm 272 of the meaning search subsystem 152 compares an intent subtree 292 of the meaning representations 162 (representing at least a portion of the user utterance 122) to an intent subtree 294 of the meaning representations 158 (representing at least a portion of one of the sample utterances 155 of the intent/entity model 108) to calculate an intent subtree similarity score 285. As mentioned, the tree-model comparison algorithm 272 uses the class compatibility rules 274 and the class-level scoring coefficients 276 of the compilation model template 244 to calculate this intent subtree similarity score 285. It may be noted that, in other embodiments, the process 290 may include fewer steps, additional steps, repeated steps, and so forth, in accordance with the present disclosure.

For the illustrated embodiment, the process 290 involves identifying (block 296) class compatible sub-trees 298 and 300 from the intent subtrees 292 and 294, respectively, as defined by the class compatibility rules 274. For the illustrated example, the first class compatible subtree 298 (of the first intent subtree 292) and the second class compatible subtree 300 (of the second intent subtree 294) are then compared to determine a respective class similarity score. More specifically, a respective class similarity score is calculated (block 302) for each node or subtree depending from the class compatible subtrees identified in block 296. In particular, the class similarity score may be determined based on the vector distance between the subtree vectors 256 of the first and second class-compatible subtrees 298 and 300.

As indicated by the arrow 304, blocks 296 and 302 may be repeated until all class compatible subtrees have been identified and the class similarity scores 306 for all class compatible subtrees have been calculated. In an example, the class similarity score for a given class (e.g., a verb class, a subject class, a modifier class) is calculated to be the weighted average of all class-compatible similarity contributions by the constituent subtrees of the intent trees being compared. In other embodiments, the class similarity score for a given class may be calculated as an average similarity score (e.g., an average vector distance) of all nodes or subtrees of the class that are directly coupled to the root nodes of the class compatible subtrees 298 and 300. In certain embodiments, each class similarity score value may be between 0 and 1, inclusively. For example, when comparing the intent subtrees 292 and 294, a set (e.g., an array or matrix) of class similarity scores may include a first class similarity score corresponding to nodes and subtrees of a first class (e.g., verbs), a second class similarity score corresponding to nodes and subtrees of a second class (e.g., direct objects), a third class similarity score corresponding to nodes and subtrees of a third class (e.g., verb modifiers), and so forth.

Continuing through the process illustrated in FIG. 13, the class similarity scores 306 are subsequently combined (block 308) to yield an overall intent-subtree similarity score 285 between the first and second intent subtrees 292 and 294. That is, in block 308, the meaning search subsystem 152 uses the class-level scoring coefficients 276 of the compilation model template 244 to suitably weight each class similarity score generated in block 302 to generate the overall intent subtree similarity score 285. For example, a first class similarity score corresponding to nodes and subtrees of a first class (e.g., modifiers) is multiplied by a class-level scoring coefficient associated with the first class, a second class similarity score corresponding to nodes and subtrees of a second class (e.g., verbs) is multiplied by a class-level scoring coefficient associated with the second class, a third class similarity score corresponding to nodes and subtrees of a third class (e.g., subjects), is multiplied by a class-level scoring coefficient associated with the third class, and so forth. Additionally, in certain embodiments, one class similarity score corresponds to the vector distance between the respective subtree vectors 256 associated with the root node of the first intent subtree 292 and the root node of the second intent subtree 294, and this class similarity score is similarly multiplied by a respective class-level scoring coefficient (e.g., root node scoring coefficient). In certain embodiments, these products are summed and the result is divided by the number of class similarity scores. As such, for the illustrated example, the overall intent subtree similarity score 285 may be described as a weighted average of the class similarity scores 306 of the class compatible subtrees and the class similarity score of the root nodes. In certain embodiments, the intent subtree similarity score 285 may be normalized to have a value between 0 and 1, inclusive.

Additionally, it may be appreciated that present embodiments enable entrenchment, which is a process whereby the agent automation system 100 can continue to learn or infer meaning of new syntactic structures in new natural language utterances based on previous examples of similar syntactic structures to improve the domain specificity of the NLU framework 104 and the agent automation system 100. As used herein, "domain specificity" refers to how attuned the system is to correctly extracting intents and entities expressed in actual conversations in a given domain and/or conversational channel. For example, in an embodiment, certain models (e.g., NN structure or prosody models, word vector distribution models) are initially trained or generated using generic domain data (e.g., such as a journal, news, or encyclopedic data source). Since this generic domain data may not be representative of actual conversations (e.g., actual grammatical structure, prosody, and vocabulary) of a particular domain or conversational channel, the disclosed NLU framework 104 is capable of analyzing conversations within a given domain and/or conversational channel, such that these models can be conditioned to be more accurate or appropriate for the given domain.

It is presently recognized that this can enable the agent automation system 100 to have a continuously learning grammar structure model capable of accommodating changes in syntactic structure, such as new grammatical structures and changes in the use of existing grammatical structures. For example, FIG. 14 is a flow diagram illustrating an embodiment of a process 320 whereby the agent automation system 100 continuously improves a ML-based parser 188, which may be plugged into the structure subsystem 172 of the meaning extraction subsystem 150, as discussed with respect to FIG. 7.

Figure 14:
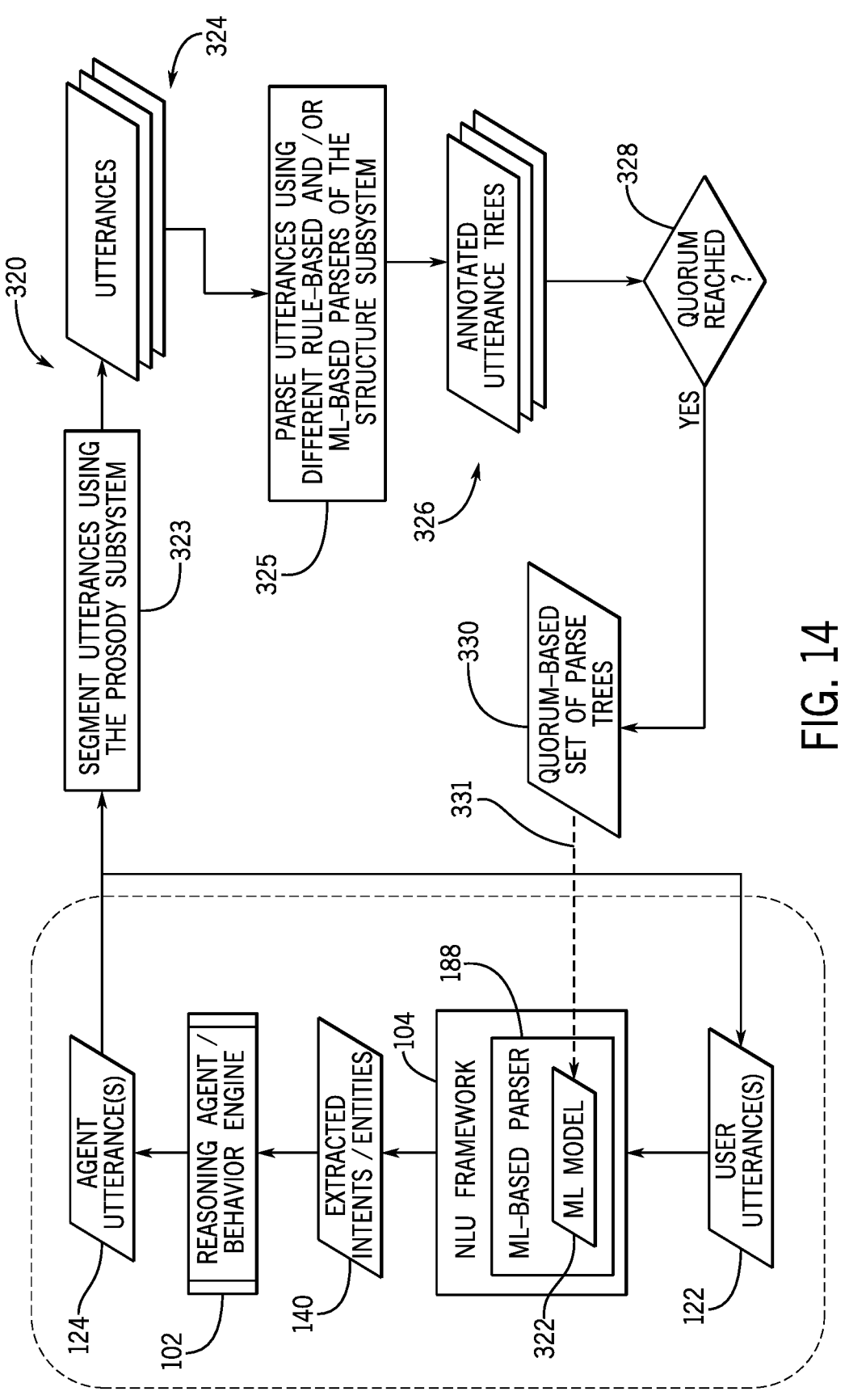
FIG. 14 is a block diagram illustrating an embodiment of a process by which the agent automation system continuously improves a structure learning model, such as a recurrent neural network associated with a ML-based parser of the NLU framework, for improved domain specificity, based on a collection of utterances, in accordance with aspects of the present technique.

For the example illustrated in FIG. 14, the ML-based parser 188 is specifically a recurrent neural network (RNN)-based parser that operates based on a RNN model 322. As such, it is appreciated that, by adjusting signal weighting within the RNN model 322, the ML-based parser 188 can continue to be trained throughout operation of the agent automation system 100 using training data generated from a continually growing corpus of utterances 112 of the database 106 illustrated in FIG. 4A. For the example illustrated in FIG. 14, the corpus of utterances 112 may be a continually growing collection of stored user utterances 122 and agent utterances 124, such as a chat log.

For the embodiment illustrated in FIG. 14, prior to operation of the agent automation system 100, the RNN-based model 322 may initially have a set of weights (e.g., a matrix of values) that are set by training. For this example, the ML-based parser 188 may be trained using a first corpus of utterances having a particular grammatical style, such as a set of books, newspapers, periodicals, and so forth, having a formal or proper grammatical structure. However, it is appreciated that many utterances exchanges in different conversational channels (e.g., chat rooms, forums, and emails) may demonstrate different grammatical structures, such as less formal or more relaxed grammatical structures. With this in mind, the continual learning loop illustrated in FIG. 14 enables the RNN-model 322 associated with the ML-based parser 188 to be continually updated and adjusted, such that the ML-based parser 188 can become more adept at parsing different (e.g., less-formal or less-proper) grammatical structures in newly received user utterances 122.

The continual leaning process 320 illustrated in FIG. 14 includes receiving and responding to the user utterance 122, as discussed above with respect to the process 145 of FIG. 5. As mentioned, in certain embodiments, the user utterances 122 and the agent utterances 124 are collected to populate the corpus of utterance 112 stored in the database 106, as illustrated in FIG. 4A. As some point, such as during regularly scheduled maintenance, the prosody subsystem 174 of the meaning extraction subsystem 150 segments (block 323) the collection of stored user utterances 122 and agent utterances 124 into distinct utterances 324 ready for parsing. Then, different rule-based parsers 186 and/or ML-based parsers 188 of the structure subsystem 172 of the meaning extraction subsystem 150 parse (block 325) each of the utterances 324 to generate a multiple annotated utterance tree structures 326 for each of the utterances 324. The meaning extraction subsystem 150 then determines (in decision block 328) whether a quorum (e.g., a simple majority consensus) has been reached by the different parsers.

For the example illustrated in FIG. 14, when the meaning extraction subsystem 150 determines in block 328 that a sufficient number (e.g., a majority, greater than a predetermined threshold value) of annotated utterance trees 326 for a particular utterance are substantially the same for a quorum to be reached, then the meaning extraction subsystem 150 may use the quorum-based set of annotated utterance trees 330 to train and improve a ML-model 322 associated with the ML-based parser 188, as indicated by the arrow 331. For example, the weights within the ML-model 322 may be repeatedly adjusted until the ML-based parser 188 generates the appropriate structure from the quorum-based set of annotated utterance trees 330 for each of the utterances 324. After this training, upon receiving a new user utterance 122 having a grammatical structure similar to a structure from the quorum-based set of annotated utterance trees 330, the operation of the ML-based parser 188, the NLU framework 104, and the agent automation system 100 is improved to more correctly parse the grammatical structure of the user utterance 122 and extract the intents/entities 140 therefrom.

Additionally, in certain embodiments, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 15 is a flow diagram illustrating an embodiment of a process 340 whereby the agent automation system 100 continuously improves a word vector distribution model 342, which may be plugged into the structure subsystem 172 of the meaning extraction subsystem 150, such as the learned multimodal word vector distribution model 178 or the learned unimodal word vector distribution model 180 discussed above with respect to FIG. 7. As such, it is appreciated that, by expanding or modifying the word vector distribution model 342, operation of the vocabulary subsystem 170, the NLU framework 104, and the agent automation system 100 can be improved to handle words with new or changing meanings using only training data that can be generated from a continually growing corpus of utterances 112 of the database 106 illustrated in FIG. 4A. For the example illustrated in FIG. 15, the corpus of utterances 112 may be, for example, a collection of chat logs storing user utterances 122 and agent utterances 124 from various chat room exchanges, or other suitable source data.

Figure 15:
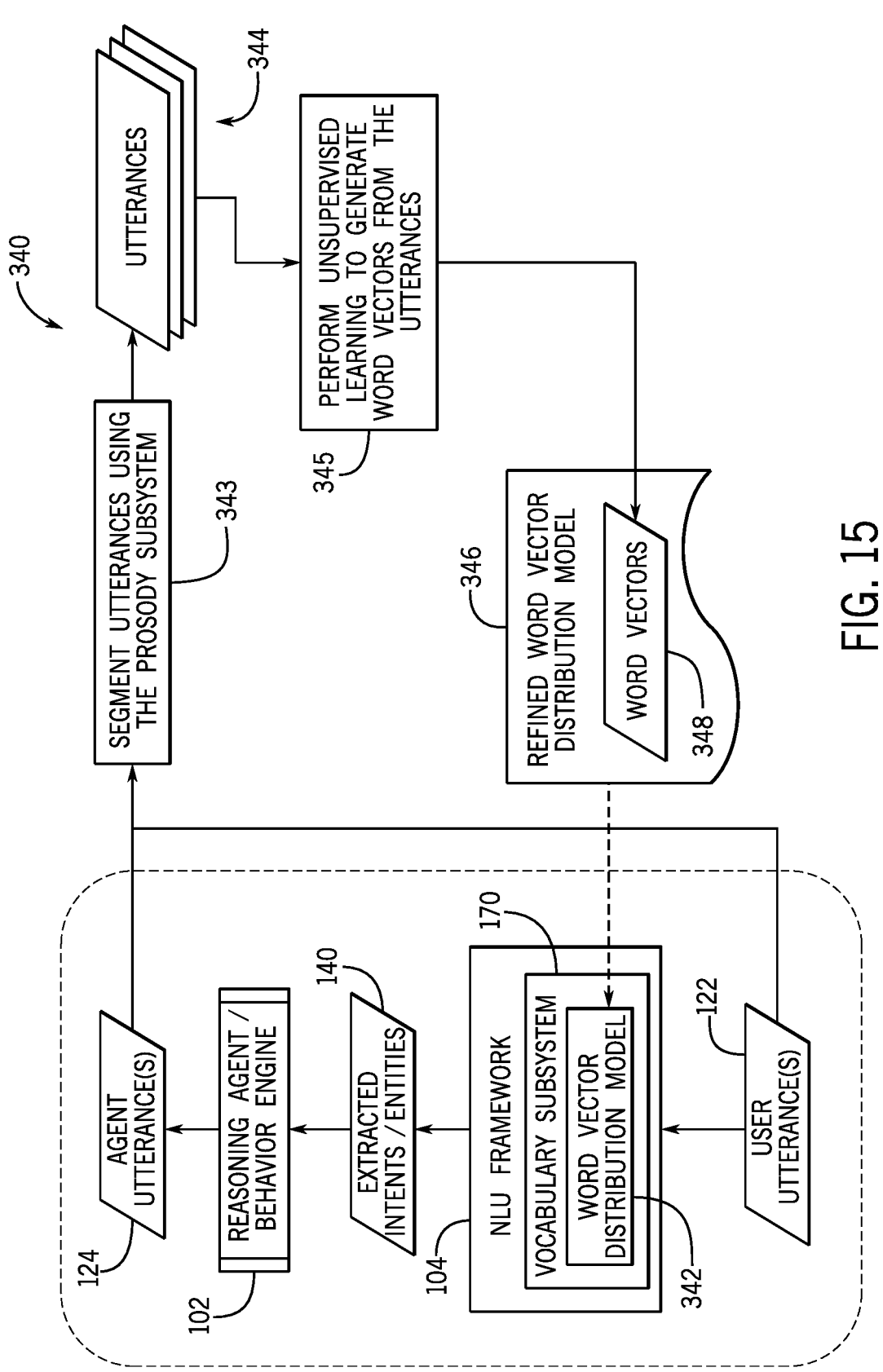
FIG. 15 is a block diagram illustrating an embodiment of a process by which the agent automation system continuously learns new words and/or refines word understanding for improved domain specificity based on a collection of utterances, in accordance with aspects of the present technique.

For the embodiment illustrated in FIG. 15, prior to operation of the agent automation system 100, the word vector distribution model 342 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 15 enables the word vector distribution model 342 to be modified to include new word vectors, and to change values of existing word vectors, based on source data gleaned from the growing collections of user and agent utterances 122 and 124, to become more adept at generating annotated utterance trees 166 that include these new or changing terms.

Like FIG. 14, the process 340 illustrated in FIG. 15 includes receiving and responding to the user utterance 122, as discussed above with respect to FIG. 5. As mentioned, the user utterances 122 and the agent utterances 124 can be collected to populate the corpus of utterance 112 stored in the database 106, as illustrated in FIG. 4A. As some point, such as during regularly scheduled maintenance, the prosody subsystem 174 of the meaning extraction subsystem 150 segments (block 343) the corpus of utterances 112 into distinct utterances 344 that are ready for analysis. Then, in block 345, the meaning extraction subsystem 150 performs rule-augmented unsupervised learning to generate a refined word vector distribution model 346 containing new or different word vectors 348 generated from the segmented utterances 344.

For example, as discussed above, the meaning extraction subsystem 150 may analyze the set of segmented utterances 344 and determine word vectors 348 for the words of these utterances based on how certain words tend to be used together. For such embodiments, two words that are frequently used in similar contexts within these utterances 344 are considered closely related and, therefore, are assigned a similar vector value (e.g., relatively closer in terms of Euclidean distance) in one or more dimensions of the word vectors 348. In this manner, the meaning extraction subsystem 150 may adapt to changes in the meaning of a previously understood term based on new context in which the term is used.

As illustrated in FIG. 15, the refined word vector distribution model 346 is used to replace the existing word vector distribution model 342, such that the vocabulary subsystem 170 can use this refined model to provide word vectors for the words and phrases of new user utterances 122 received by the agent automation system 100. For example, an initial word vector distribution model 342 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 345, a new word vector would be generated for the term "Everest" that would be relatively close in one or more dimensions to word vectors for terms such as "conference", "meeting", "presentation", and so forth. After updating the word vector distribution model, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140.

Technical effects of this section of the present disclosure include providing an agent automation framework that is capable of extracting meaning from user utterances, such as requests received by a virtual agent (e.g., a chat agent), and suitably responding to these user utterances. The NLU framework includes a meaning extraction subsystem that is designed to generate meaning representations for the sample utterances of the intent/entity model, as well as a meaning representation for a received user utterance. To generate these meaning representations, the meaning extraction subsystem includes a vocabulary subsystem, a structure subsystem, and a prosody subsystem that cooperate to parse utterances based on combinations of rule-based methods and ML-based methods. Further, for improved accuracy, the meaning extraction subsystem includes a rule-based augmentation error detection subsystem that can cooperate with the vocabulary, structure subsystem, and prosody subsystems to iteratively parse and correct an utterance before meaning representations are generated. The meaning representations are a data structure having a form or shape that captures the grammatical structure of the utterance, while subtrees of the data structure capture the semantic meaning of the words and phrases of the utterance as vectors that are annotated with additional information (e.g., class information).

Additionally, the disclosed NLU framework includes a meaning search subsystem that is designed to search the meaning representations associated with the intent/entity model to locate matches for a meaning representation of a received user utterance. Conceptually, the meaning representation of the received user utterance is used like a search key to locate matching meaning representations in the search space defined by the collection of meaning representations generated from the intent/entity model. The meaning search subsystem is designed to determine a similarity score for portions of different meaning representations based on stored particular stored rules and weighting coefficients (e.g., class compatibility rules and class-level scoring coefficients). Additionally, the NLU framework can continue to learn or infer meaning of new syntactic structures in new natural language utterance based on previous examples of similar syntactic structures, and learn or modify its vocabulary based on a usage of a new term or an existing term in a new context. As such, components of the NLU framework (e.g., a neural network models, the word vector distributions) may be continuously updated based on new utterances, such as natural language exchanges between users and a virtual agent, to enhance the adaptability of the NLU framework to changes in the use and meaning of certain terms and phrases over time.

Vocabulary Management

Virtual agents may be implemented in a wide range of applications for a wide range of customers or clients. For example, virtual agents may be utilized by organizations in retail, manufacturing, accounting, consumer product development and/or sales, software development, information technology services, social media, consulting, engineering, banking, oil and gas, insurance, real estate, commercial equipment sales, media, healthcare, construction, legal services, transportation, pharmaceuticals, marketing, etc. Further, these virtual agents may engage with users within these organizations in a wide variety of roles, such as executives, information technology (IT) professionals, assistants, engineers, attorneys, doctors, nurses, technicians, accountants, human resources professionals, analysts, software developers, janitors, etc. Dependent upon the particular application and the particular users, a given instantiation of the virtual agent may utilize vocabulary terms that may be specific to that application and/or the specific users of the virtual agent. As such, it is presently recognized that there is a need to customize the vocabulary of virtual agents to the particular industries and users they will serve. Present embodiments are directed to an agent automation framework that is capable of extracting meaning from user utterances, such as requests received by a virtual agent (e.g., a chat agent), suitably responding to these user utterances, and learning new vocabulary words, or new meanings for known words, as time passes and exchanges between the chat agent and the user occur.

The agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. The meaning extraction subsystem includes a vocabulary subsystem, a structure subsystem, and a prosody subsystem that cooperate to parse utterances into the annotated utterance trees based on combinations of rule-based methods and machine learning (ML)-based (e.g., statistical) methods. Using one or more tree substructure vectorization algorithms and focus/attention/magnification (FAM) coefficients defined by a stored compilation model template, the meaning extraction subsystem subsequently generates subtree vectors for the annotated utterance tree structure, yielding the corresponding meaning representation for subsequent searching by the meaning search subsystem.

In present embodiments, the virtual agent is capable of learning new words, or new meanings for known words, based on exchanges between the virtual agent and the user in order to customize the vocabulary of the virtual agent to the needs of the user or users. Specifically, the agent automation framework may have access to a corpus of previous exchanges between the virtual agent and the user, such as one or more chat logs. The agent automation framework may segment the chat logs into utterances using the prosody subsystem. The utterances may then be further segmented into words and/or phrases. The agent automation framework may then recognize new words and/or new meanings for known words. New word vectors may then be generated for these new words and/or new meanings for known words. The new word vectors may then be added to an existing word vector distribution model of the vocabulary subsystem to generate a refined word vector distribution model. The new word vector may be generated, for example, based on the context in which the new word or meaning was used over one or more uses in the chat logs, input from a user, or some other source. The NLU framework may then utilize the refined word vector distribution model to interpret and analyze user utterances and generate responses.

In interpreting and analyzing user utterances, the user utterance may include a word or phrase for which there are multiple word vectors corresponding to multiple respective known meanings for the word. In order to identify the intended meaning, the agent automation framework segments the utterance into words and/or phrases. The words and/or phrases may then be pre-processed by, for example, applying directives and/or instructions from the vocabulary model. Pre-processing may include checking spelling, correcting formatting issues, expanding contractions, expanding abbreviations, replacing acronyms with associated words, as well as other data-cleansing processes. If word usage context is available, the agent automation framework may determine which meaning was intended by performing context-based disambiguation via an ontology service and/or the structure service. If no context is available, the agent automation framework may extract word vectors matching the surface form or form derivatives. If no word vectors are found, the agent automation framework derives semantic word vectors according to null-word rules. The vectors are then post-processed before being output. Post-processing may include, for example, extracting a representative vector or vector set given one or more synonymic vector lists. As time passes and the virtual agent exchanges utterances with the user, the virtual agent learns new words, or new meanings for known words, and thus customizes its vocabulary to its specific application and users.

A computing platform may include a chat agent, or another similar virtual agent, that is designed to respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from)

data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to generating suitable meaning representations for utterances, including received user utterances and sample utterances of an intent/ entity model. These meaning representations generally have a shape that captures the syntactic structure of an utterance, and include one or more subtree vectors that represent the semantic meanings of portions of the utterance. The meaning representation of the utterance can then be searched against a search space populated with the meaning representations of the sample utterances of the intent/entity model, and one or more matches may be identified. As the chat agent of the agent automation framework exchanges utterances with one or more users, a chat log or other corpus of utterances may be populated. The agent automation framework may then analyze the chat log to identify new words or new meanings for known words, and generate word vectors for these new words and/or meanings. The new word vectors can be used to better analyze user utterances and can also be used in agent utterances responding to user utterances. Accordingly, as time passes and utterances are exchanged with the user, the chat agent may learn new words and/or new meanings for known words, thus customizing the chat agent's vocabulary to the chat agent's specific application and users.

Figure 18:
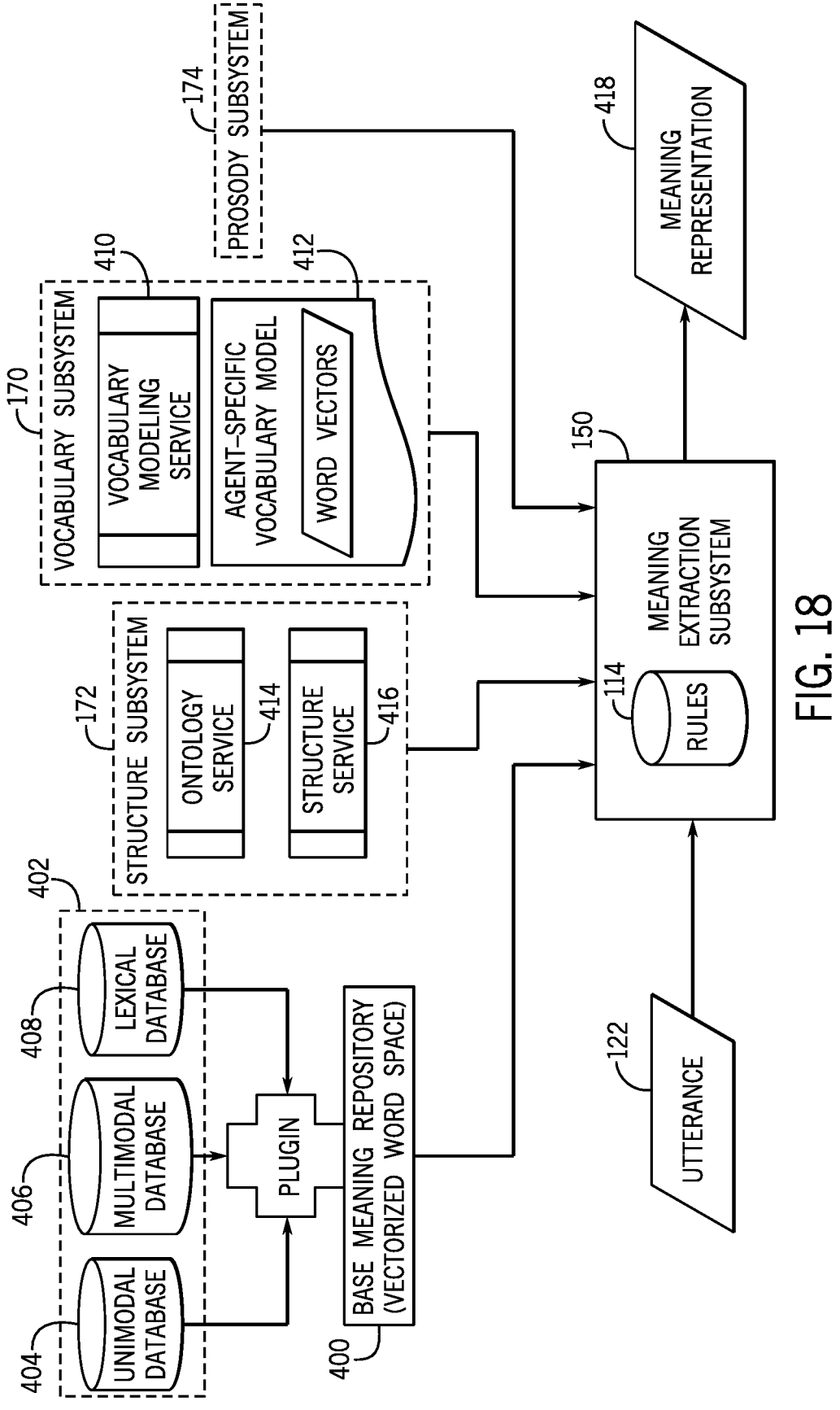
FIG. 18 is a block diagram illustrating how the vocabulary subsystem of FIG. 7 operates within the NLU framework, in accordance with aspects of the present techniques.

FIG. 18 is a block diagram illustrating how the vocabulary subsystem 170 of FIG. 7 operates within the NLU framework 104. As shown, the rule based meaning and extraction system 150 has access to a base meaning repository 400. The base meaning repository 400 may be a vectorized word space. That is, the base meaning repository 400 may include a collection of word vectors for known vocabulary words. As shown, the base meaning repository 400 may have access to a number of word distribution databases 402. In the illustrated embodiment, the word distribution databases 402 include a unimodal database 404, a multimodal database 406, and a lexical database 408. As described above with regard to FIG. 7, unimodal refers to word vector distributions having a single vector for each word. Accordingly, the unimodal database 404 may include a single word vector for each word listed in the database 404. Correspondingly, multimodal refers to having word vector distributions supporting multiple vectors for particular words (e.g., homonyms, polysemes) that can have different meanings in different contexts (e.g., a "bank" may refer to a place to store money, money itself, a maneuver of an aircraft, or a location near a river). As such, the multimodal database 406 may include multiple word vectors for each word listed in the database 406 based on the different possible meanings for the word. The lexical database 408 may be used to for disambiguation purposes to help select the correct word vector for a given word from the multimodal database 406. In some embodiments, this determination may be made based on context with help from the structure subsystem 172. In some embodiments, as is discussed in more detail below, the lexical database 408 may also be used to generate word vectors for new words that were previously unknown, or for new meanings for known words. It should be understood, however, that the word distribution databases 402 shown in FIG. 18 are merely examples and that embodiments are envisaged that utilize additional databases, fewer databases, or different combinations of databases.

As shown, data from the word distribution databases 402 may be retrieved or plugged into the base meaning repository 400 to provide a repository of known vocabulary words and their meanings to the meaning extraction subsystem 150. As previously described, the meaning extraction subsystem 150 may parse provided utterances and output one or more meaning representations 418. Occasionally, the meaning extraction subsystem 150 may come across a new word that is not in the base meaning repository 400, or use of a word in the base meaning repository 400 that does not comport with any of the meanings of the word stored in the base meaning repository 400. In such instances, the meaning extraction subsystem 150 may alert a vocabulary modeling service 410. In some embodiments, the meaning extraction subsystem 150 may provide the vocabulary modeling service 410 with both the new word and/or meaning, as well as the context in which the new word and/or meaning was used. The vocabulary modeling service 410 generates and/or maintains an agent-specific vocabulary model 412. For example, the vocabulary modeling service 410 may store meanings for new vocabulary words and/or alternate meanings for known vocabulary words. For example, a company may have in its office a conference room called "Everest". Accordingly, the vocabulary modeling service 410 may store the meaning of the word "Everest" as being a mountain and/or a conference room. Further, the vocabulary modeling service 410 may notice certain patterns for when different meanings of a word are intended and update meaning/ derivation rules and/or synonym entries accordingly. For example, the character sequence "http" may indicate that the character string is a URL. Accordingly, as new words, or new meanings for existing words, are used, a patterns for what meaning is intended are discovered, the vocabulary modeling service 410 may update the agent-specific vocabulary model 412 to incorporate these changes. In some embodiments, the vocabulary modeling service 410 may update the base meaning repository 400 with new words and/or meanings. Accordingly, over time, as new words, or new meanings for existing words, are used, the agent-specific vocabulary model 412 may evolve such that the agent is more suited to its specific application.

As previously discussed, when the meaning extraction subsystem 150 notices a new word or a new meaning for an existing word, the meaning extraction subsystem 150 notifies the vocabulary modeling service 410 and provides the new word and/or meaning to the vocabulary modeling service 410, as well as the context in which the new word and/or meaning was used. In some embodiments, the structure subsystem 172 may be used to analyze the context in which the new word and/or meaning were used. For example, as shown in FIG. 18, the structure subsystem 172 may include an ontology service 414 and a structure service 416. The ontology service 414 may access the lexical database 408, which may store metadata for words reflecting different possible forms of the word (e.g., noun, verb, adjective, etc.). The structure service 416 performs linguistic structure extraction (e.g., parsing the structure, tagging parts of speech, etc.) and may assist the ontology service 414 in disambiguation by analyzing the context of the new word and/or meaning. Accordingly, the ontology service 414 and the structure service 416 may work in concert, using data from the lexical database 408, to analyze the use of the word, the context of the word's use, and determine what meaning of the word was intended.

As previously described, the prosody subsystem 174 analyzes the prosody of the utterance using a combination of rule-based and ML-based prosody plugins. Specifically, the prosody subsystem 174 analyzes the utterance for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. Accordingly, the prosody subsystem 174 can combine or select from prosody parsed structures output by the various prosody plug-ins to help generate the meaning representations 418.

Figure 19:
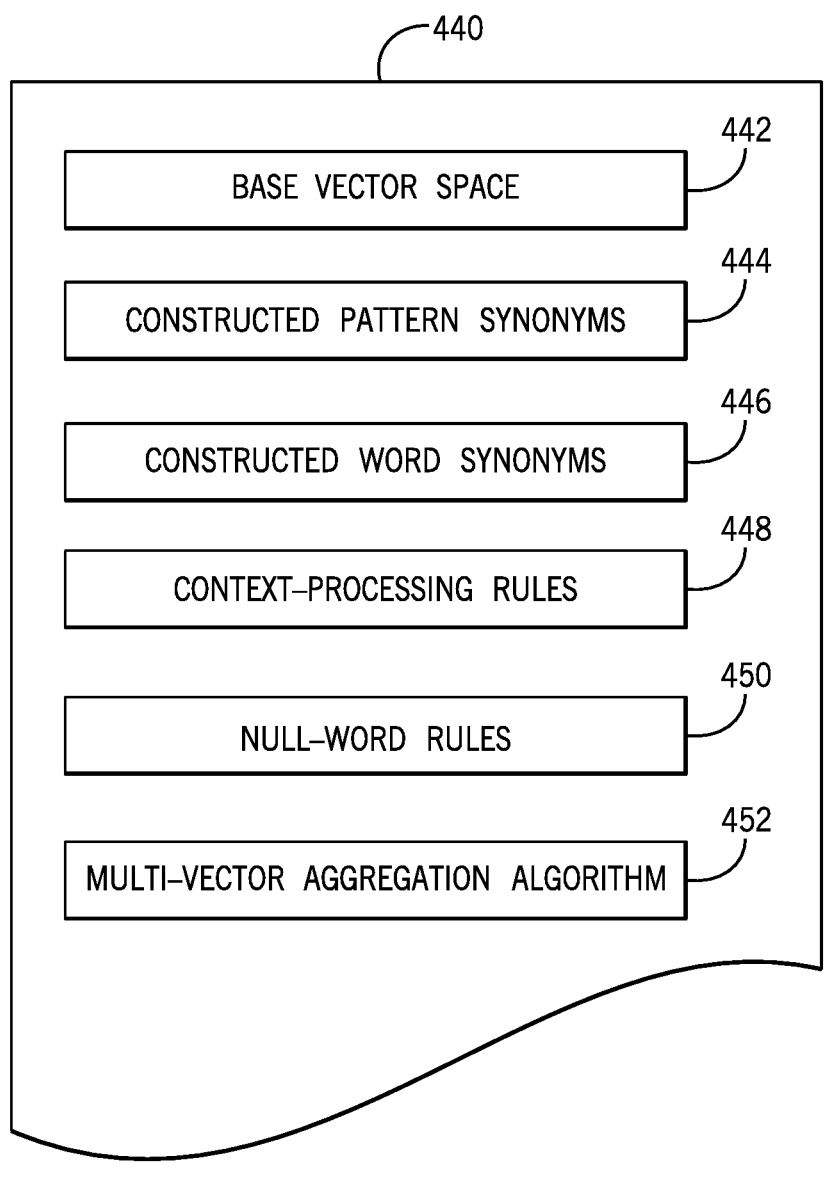
FIG. 19 is a diagram illustrating what may be included in a vocabulary model template, in accordance with aspects of the present techniques.

The agent-specific vocabulary model 412 may be developed using a collection of vocabulary model templates. FIG. 19 is a diagram illustrating what may be included in a vocabulary model template 440. As shown, the vocabulary model template 440 may include fields for base vector space 442, constructed pattern synonyms 444, constructed word synonyms 446, context processing rules 448, null word rules 450, and multi-vector algorithms 452.

The base vector space 442 may include data from the base meaning repository 400 and/or the databases 402. Accordingly, the data may include one or more word vectors (e.g., a vector for each respective meaning), as well as data corresponding to word usage and methods for vector learning and/or derivation. As previously described, the base vector space 442 may be derived from some available corpus of data (e.g., one or more websites, or some other collection of writing) and act as a basis for subsequent modifications to the meanings of the word.

The constructed pattern synonyms 444 include one or more phrases or collections of words that may act as synonyms for the word in question or otherwise have the same or similar meanings as the word in question. Similarly, the constructed word synonyms 446 include words that may act as synonyms for the word in question or otherwise have the same or similar meanings as the word in question. Both the constructed pattern synonyms 444 and the constructed word synonyms 446 may be generated and/or maintained by the vocabulary modeling service 410 over time. In some embodiments, the constructed pattern synonyms 444 and the constructed word synonyms 446 include word vectors for the word synonyms and the pattern synonyms.

The context processing rules 448 include rules generated by the vocabulary modeling service 410 for how to process the context in which the word is used. The context processing rules 448 may be developed by the vocabulary modeling service 410 as new uses and/or meanings for words, or new words, are used in utterances. For example, the vocabulary modeling service may develop rules for determining when the word "return" is intended as a noun (e.g., "I submitted my tax return today") or a verb (e.g., "I would like to return this pair of shoes that I bought"). The context processing rules 448 may be used to determine which of the known meanings for a word is intended, as well as how to determine an intended meaning for a word that does not comport with one of the known meanings for a word. Further, the context processing rules 448 may be used to determine an intended meaning for a new word based on context. In addition to generating new rules or modifying existing rules, the context processing rules 448 may also include combining multiple rules to process context of word usage.

The null word rules 450 include rules for determining meanings for words that cannot otherwise be determined via disambiguation and/or other word vector techniques based on data in the base meaning repository 400, context, etc. For example, the null word rules 450 may include rules for deriving a word vector for a word based on the surrounding words. For example, if the base word vector database was learned via contextual approaches (i.e., learning a new word or a new meaning for an existing word based on the words that frequently surround it or predicting what words typically surround a word, or any other statistical method measuring co-occurrence of a word and its surrounding context), then the null word placeholder can be generated based on the word vectors of the surrounding words in an utterance. Alternatively, a model can be trained to directly generate word vectors given known word-surface-form-as-an-ordered-collection-of-characters to vector mappings (e.g., use a pre-existing word vector database as training data to derive an ML model that can be consulted to generate word vectors given an ordered collection of characters).

Figure 20:
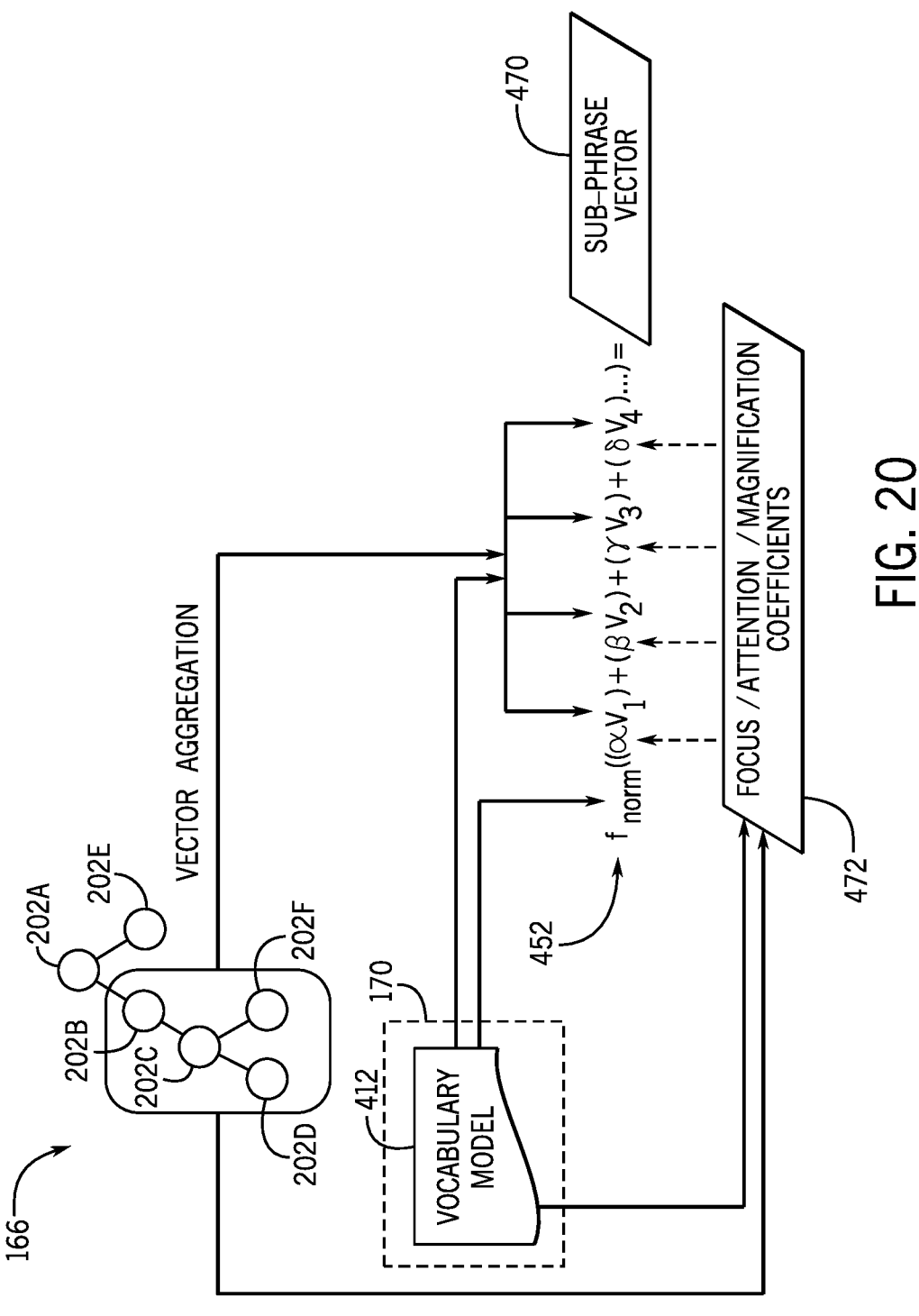
FIG. 20 is a block diagram illustrating example operation of an embodiment of a multi-vector aggregation algorithm to generate a combined sub-phrase vector for a subtree of an annotated utterance tree, in accordance with aspects of the present techniques.

The multi-vector aggregation algorithms 452 include one or more algorithms for deriving a single word vector from a collection of word vectors. For example, FIG. 20 illustrates how a multi-vector aggregation algorithm 452 combines multiple word vectors into a single sub-phrase vector 470. As shown in FIG. 20, the vocabulary model 412 of the vocabulary subsystem 170 provides word vectors for each node 202 of an annotated utterance tree 166. For the illustrated embodiment, the vocabulary subsystem 170 generated four or more word vectors, represented as $V_1, V_2, V_3$, and $V_4$, which are respectively associated with four nodes of the annotated utterance tree 166. That is, in certain embodiments, the NLU framework 104 may modify the annotated utterance tree 166 (e.g., the vocabulary subsystem 170 may replace phrases including multiple word vectors with individual words or sub-phrases having single word vectors). As such, it is appreciated that, at one or more stages of intent/entity extraction, the number of nodes/subtrees of the annotated utterance tree 166 may be increased or decreased, along with the number of word vectors combined to calculate the sub-phrase vector 470, relative to an original utterance or an initially generated annotated utterance tree 166. In other embodiments, the multi-vector aggregation algorithm 452 may be used to generate a single word vector 470 from a group of synonyms by using weighted average.

As shown in FIG. 20, the multi-vector aggregation algorithm 452 generates the sub-phrase vector 470 by multiplying each of the word vectors by a respective focus/attention/magnification (FAM) coefficient 472 (e.g., $\alpha, \beta, \gamma, \delta$) associated with the word vector. The FAM coefficients 472 are used to tune how much relative focus or attention (e.g., signal magnification) should be granted to each portion (e.g., node) of a subtree when generating a sub-phrase vector 470.

Accordingly, the FAM coefficients 472 increase or decrease the contribution of each word vector to the combined sub-phrase vector 470. After applying the FAM coefficients 472 to the word vectors $V_{1-4}$, the results are combined using vector addition, as indicated by the "+" notation in FIG. 20. Additionally, for the illustrated embodiment, the resulting sub-phrase vector 470 is subsequently normalized to ensure that the dimensions of the combined sub-phrase vector 470 are each within a suitable range after the multiplication and addition operations. It may be noted that the tree substructure vectorization algorithm 452 illustrated in FIG. 20 is merely provided as an example, and in other embodiments, other suitable tree substructure vectorization algorithms may be used, in accordance with the present disclosure. In some embodiments, the vector aggregation may be performed iteratively (e.g., via class-level component comparisons). In other embodiments, a general signal for all nodes in the tree or sub-tree may be requested and used for vector aggregation.

By way of example, in certain embodiments, verb words or subtrees may be associated with one of the FAM coefficients 472 (e.g., $\alpha$) that is greater in value than another FAM coefficient (e.g., $\beta$) associated with a subject or direct object word or subtree vector. In certain embodiments, root node word vectors may be associated with a relatively higher FAM coefficient 472 than word vectors associated with other nodes. In certain embodiments, the combined sub-phrase vector 470 is a centroid that is calculated as the weighted average of the word vectors associated with all nodes of the subtree. In other embodiments, the meaning extraction subsystem 150 may recursively perform vector aggregation. In certain embodiments, one or more of the vectors (e.g., $V_1$, $V_2$, $V_3$, and $V_4$) that are used to generate the combined sub-phrase vector 470 may itself be a combined sub-phrase vector 470 that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 21:
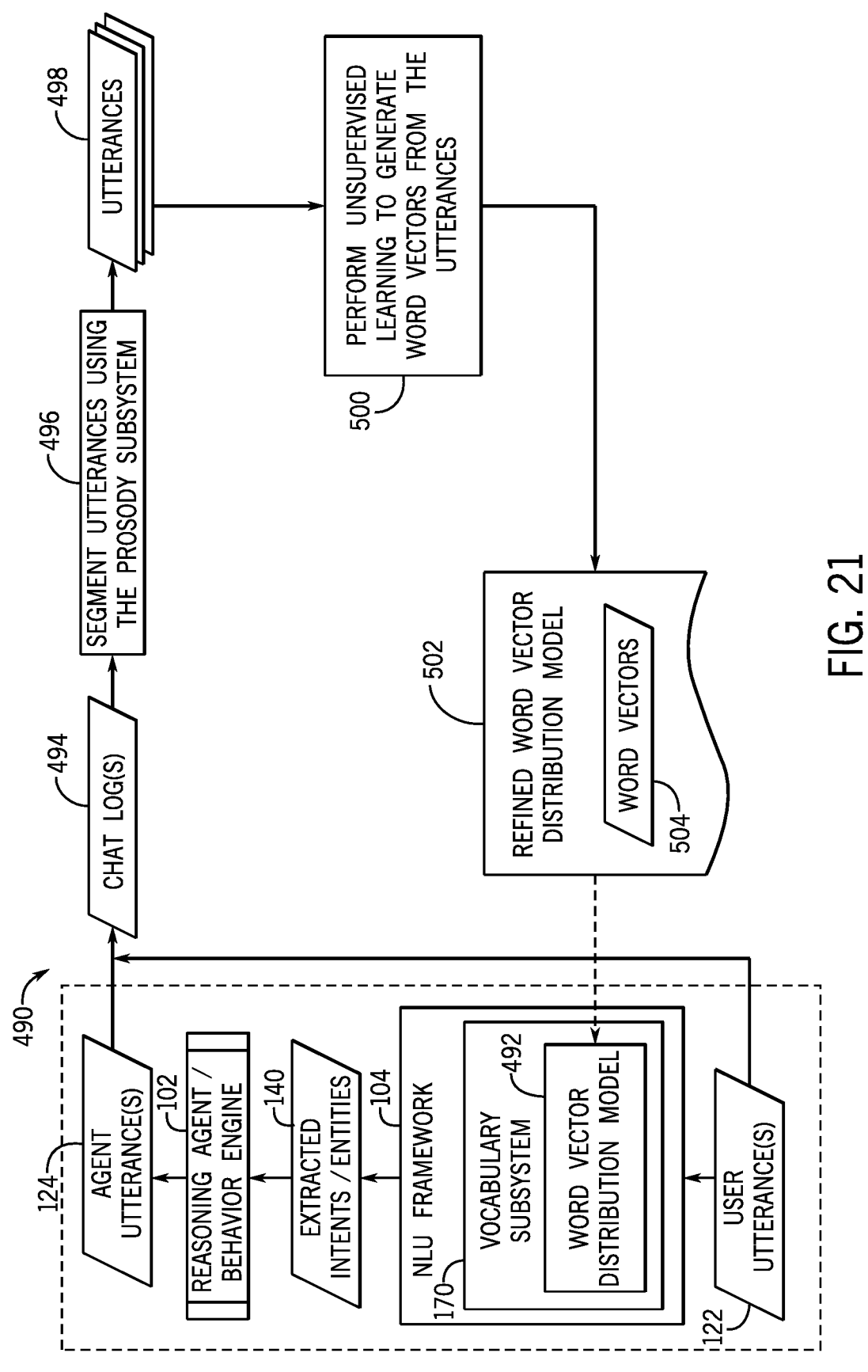
FIG. 21 is a flow diagram illustrating how the agent automation framework continuously improves a word vector distribution model, which may be plugged into the vocabulary subsystem of the meaning extraction subsystem shown in FIG. 7, in accordance with aspects of the present techniques.

Returning to FIG. 7, as the virtual agent communicates with users (e.g., receives, processes, and responds to utterances), data may be generated and collected to further train the system to learn new words and/or refine word understandings. For example, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 21 is a flow diagram illustrating an embodiment of a process 490 whereby the agent automation system 100 continuously improves a word vector distribution model 492, which may be plugged into the vocabulary subsystem 170 of the meaning extraction subsystem 150, such as the learned multimodal word vector distribution model 178 or the learned unimodal word vector distribution model 180 discussed above with respect to FIG. 7. As such, it is appreciated that, by expanding or modifying the word vector distribution model 492, operation of the vocabulary subsystem 170, the NLU framework 104, and the agent automation system 100 can be improved to handle words with new or changing meanings using only training data that can be generated from a continually growing corpus of utterances 112 of the database 106 illustrated in FIG. 4A. For the embodiment illustrated in FIG. 21, the corpus of utterances 112 may be, for example, a collection of chat logs 494 storing user utterances 122 and agent utterances 124 from various chat room exchanges, or other suitable source data.

For the embodiment illustrated in FIG. 21, prior to operation of the agent automation system 100, the word vector distribution model 492 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 21 enables the word vector distribution model 492 to be modified to include new word vectors, and to change values of existing word vectors, based on source data gleaned from the growing collections of user and agent utterances 122 and 124, to become more adept at generating annotated utterance trees 166 that include these new or changing terms.

The process 490 illustrated in FIG. 21 includes receiving and responding to the user utterance 122, as discussed above with respect to FIG. 5. As mentioned, the user utterances 122 and the agent utterances 124 can be collected to populate the corpus of utterances 112 (e.g., chat logs 494) stored in the database 106, as illustrated in FIG. 4A. As some point, such as during regularly scheduled maintenance, the prosody subsystem 174 of the meaning extraction subsystem 150 segments (block 496) the chat logs 494 into distinct utterances 498 that are ready for analysis. Then, in block 500, the meaning extraction subsystem 150 performs rule-augmented unsupervised learning to generate a refined word vector distribution model 502 containing new or different word vectors 504 generated from the segmented utterances 498.

For example, as discussed above, the meaning extraction subsystem 150 may analyze the set of segmented utterances 498 and determine word vectors 504 for the words of these utterances based on how certain words tend to be used together. For such embodiments, two words that are frequently used in similar contexts within these utterances 498 are considered closely related and, therefore, are assigned a similar vector value (e.g., relatively closer in terms of Euclidean distance) in one or more dimensions of the word vectors 504. In this manner, the meaning extraction subsystem 150 may adapt to changes in the meaning of a previously understood term based on new context in which the term is used. Accordingly, the agent automation system 100 may parse the chat logs 494 to evaluate how a word or phrase is used in the chat logs 494 and determine whether the usage is represented by one or more associated word vectors 504 of the word vector distribution model 502. This may include, for example, considering the context in which the word or phrase is used to determine the intended meaning of the word, as described below with regard to FIG. 22. If not, the word vector distribution model 502 may be updated to add one or more new word vectors 504 representative of the new meaning, or replace one or more existing vectors 504 to match the new meaning.

As illustrated in FIG. 21, the refined word vector distribution model 502 is used to replace the existing word vector distribution model 492, such that the vocabulary subsystem 170 can use this refined model to provide word vectors for the words and phrases of new user utterances 122 received by the agent automation system 100. For example, an initial word vector distribution model 492 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 500, a new word vector would be generated for the term "Everest" that would be relatively close in one or more dimensions to word vectors for terms such as "conference", "meeting", "presentation", and so forth. After updating the word vector distribution model 502, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140.

Figure 22:
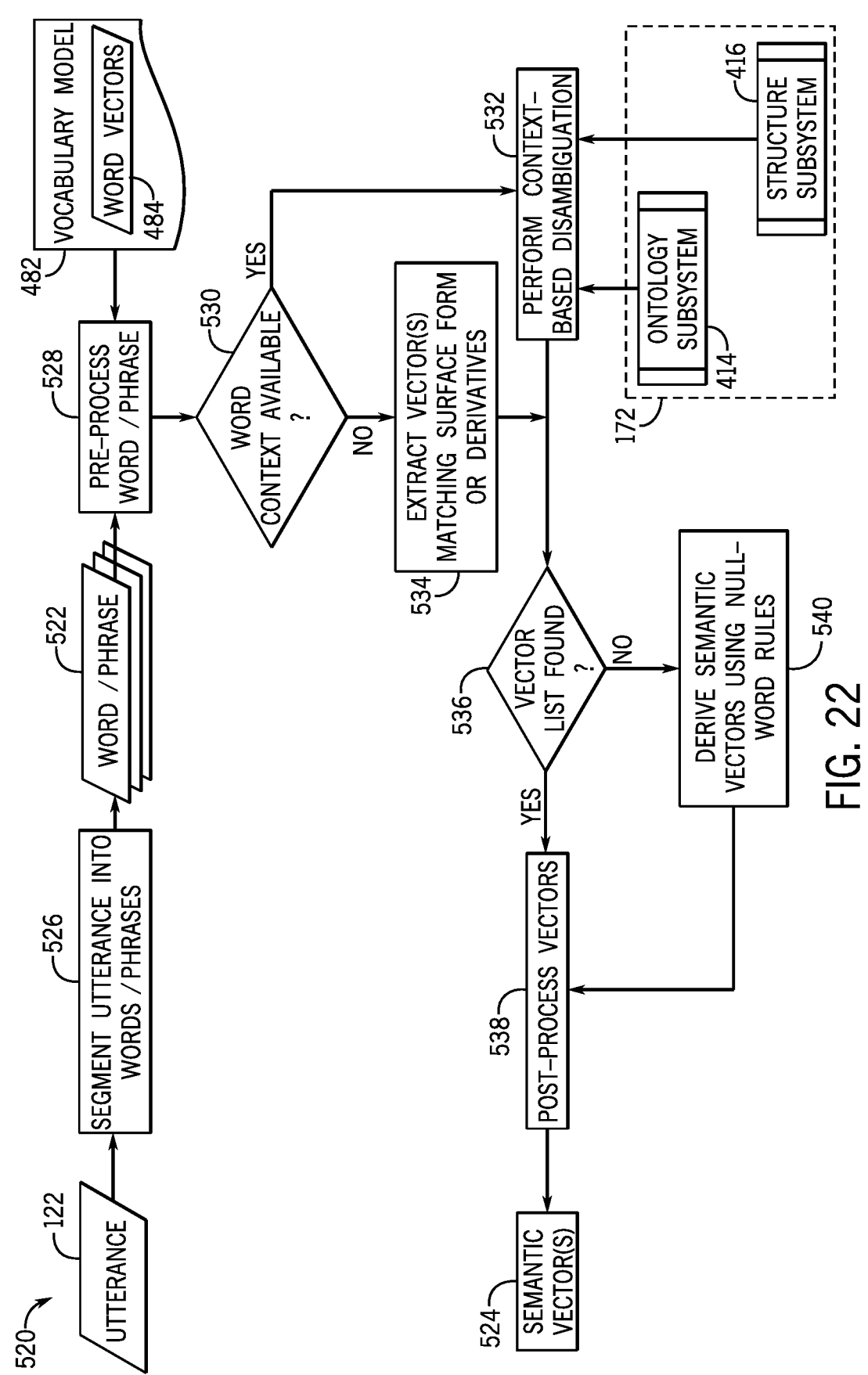
FIG. 22 is a flow diagram illustrating a process for receiving the user utterance, determining which meanings of one or more words or phrases appearing in the utterance were intended, and outputting one or more associated semantic word vectors, in accordance with aspects of the present technique.

As previously described, a word or phrase may be associated with multiple word vectors 504 associated with different meanings of the word. Using the "Everest" example from above, when the term "Everest" is used in a user utterance 122, the user could have intended Mount Everest, the conference room named Everest, or some other meaning. Accordingly, the NLU framework 104 may analyze user utterances 122 to determine which word vectors 504 were intended when a word or phrase appears in an utterance 122. FIG. 22 is a flow chart illustrating a process 520 for receiving a user utterance 122, determining which meanings of one or more words or phrases 522 appearing in the utterance 122 were intended, and outputting one or more associated semantic word vectors 524. At block 526, the utterance 122 is parsed and segmented into words and/or phrases 522. This may include, for example, parsing the utterance 122 and generating an annotated utterance tree as shown and described above with regard to FIGS. 8 and 9, wherein each word or phrase 522 is represented by a node.

At block 528, each word/phrase 522 is pre-processed. Pre-processing may include, for example, applying preprocessing directives or instructions from the vocabulary model 482. These directives or instructions may provide guidance for checking spelling, correcting formatting issues, expanding contractions, expanding abbreviations, replacing acronyms with associated words, as well as other data-cleansing processes.

At decision 530, the system determines whether there is any word context available. If word context is available, the process 520 proceeds to block 532 and performs context-based disambiguation. The surrounding words and/or phrases 522 in the utterance 122 may provide context for determining what meaning of the word or phrase 522 in question was intended. In some embodiments, the ontology service 414 and/or the structure service 416 may be utilized to perform the context-based disambiguation. Returning to the "Everest" example, if the utterance 122 is "I'm not sure, but we have a meeting scheduled in Everest at 2:30 pm this afternoon to discuss what to do", the other words 522 in the utterance 122 may be used to determine that the use of the word "Everest" in the utterance 122 was referring to the conference room. For example, the words "meeting" and reference to a time just a couple of hours in the future, with Mount Everest being thousands of miles away, may signal that Everest the conference room was intended, instead of Mount Everest. However, if the utterance had been "we're just going to Santa Cruz for the weekend, it's not like we're traveling to go climb Everest", the other words 522 in the utterance 122 may be used to determine that the use of the word "Everest" in the utterance 122 was referring to Mount Everest and not the conference room. For example, the words "climb", "traveling" and reference to various destinations, may signal that Mount Everest was intended, instead of Everest the conference room. Once the context-based disambiguation has been performed, word vectors are selected based on the context and extracted.

However, if the utterance 122 in question only includes a single word or phrase 522, the system may determine that there is no context available and proceed to extract one or more vectors matching the surface form or form derivatives (block 534). For example, word vectors 484 for the word or phrase 522 may be selected from the vocabulary model 482 based solely on the surface form used in the utterance 122, or form derivatives. Alternatively, if the utterance 122 in question only includes a single word or phrase 522, the system may refer to other utterances that precede or proceed the utterance in question to determine whether any context is available. For example, the single word or phrase 522 of the utterance 122 may be a single word or phrase answer to a question. As such, considering the question may provide context as to what was meant by the single word or phrase 522 of the utterance 122.

If there are no word vectors associated with the word or phrase 522, then no word vectors are extracted. At decision 536, the process 520 determines whether a vector list has been found (i.e., were any word vectors extracted?). If vectors were extracted in blocks 532 and/or 534, then the process 520 proceeds to block 538 and post-processes the extracted vectors, resulting in the output semantic word vectors 524. For example, the post-processing may include extracting a representative vector or vector set given one or more synonymic vector lists generated during blocks 532 and 534.

However, if no vector word lists have been extracted in blocks 532 and 534, the process 520 proceeds to block 540 and uses null-word rules (e.g., as described with regard to FIG. 19) received from the vocabulary model 482 to generate word vectors 524 for the word or phrase 522. In some embodiments, when null word rules are used to derive semantic vectors for a word or phrase, the unknown word or phrase may be flagged as an unknown word for future learning, and/or input may be requested from a user to help define the word or phrase. The generated word vectors 524 may then be post-processed (block 538) as described above. The NLU framework 104 may then insert the semantic vectors 524 output by the process 520 shown in FIG. 22 into the annotated utterance tree and use the annotated utterance tree to determine the intent of the utterance 122 and generate a response. In some embodiments, learning may be triggered by one or more conditions. For example, in some embodiments, learning may be triggered by the magnitude of collected data (e.g., when chat logs reach a threshold size). In other embodiments, an unknown word or an unknown meaning for a known word being used a threshold number of times within some window of time may trigger learning. In some embodiments, learning may take place on a scheduled basis (e.g., weekly, monthly, quarterly, annually, etc.). It should be understood, however, that in some embodiments, learning may be triggered by one or more of multiple possible conditions.

Technical effects of this section of the disclosure include a virtual agent that is capable of learning new words, or new meanings for known words, based on exchanges between the virtual agent and the user in order to customize the vocabulary of the virtual agent to the needs of the user or users. The agent automation framework may have access to a corpus of previous exchanges between the virtual agent and the user, such as one or more chat logs. The agent may segment the chat logs into utterances using the prosody subsystem, and then further segment the utterances into words and/or phrases. The agent automation framework may then recognize when new words and/or new meanings for known words appear in user utterances. New word vectors may be generated for these new words and/or new meanings for known words. The new word vectors may then be added to an existing word vector distribution model to generate a refined word vector distribution model. The new word vector may be generated, for example, based on the context in which the new word or meaning was used over one or more uses in the chat logs, input from a user, or some other source. The NLU framework may then utilize the refined word vector distribution model to interpret and analyze user utterances and generate responses.

When determining the intended meaning for a word used in an utterance that has multiple different meanings and multiple different respective word vectors, the agent automation framework segments the utterance into words and/or phrases. If word usage context is available, the agent automation framework may determine which meaning was intended by performing context-based disambiguation via the ontology service and/or the structure service. If no context is available, the agent automation framework may extract word vectors matching the surface form or form derivatives. If no word vectors are found, the agent automation framework derives semantic word vectors according to null-word rules. As time passes and the virtual agent exchanges utterances with the user, the virtual agent learns new words, or new meanings for known words, and thus customizes its vocabulary to its specific application and users.

Templated Rule-Based Data Augmentation for Intent Extraction

It is presently recognized that there is a need to improve the ability of virtual agents to apply NLU techniques to properly derive meaning from complex natural language utterances. For example, it may be advantageous to create a virtual agent capable of comprehending complex language and executing contextually relevant requests, which could afford substantial advantages in terms of reduced operational cost and increased responsiveness to client issues. Additionally, it is recognized that it is advantageous for virtual agents to be customizable and adaptable to various communication channels and styles.

Additionally, in the context of NLU and AI, it is recognized that data augmentation can add value to base data by adding information derived from internal and external sources within an enterprise. For example, data augmentation can help reduce manual intervention involved in developing meaningful information and insight from business data, as well as significantly enhance data quality. There are many approaches to augment data, for instance, adding noise or applying transformations on existing data and simulation of data. However, it is presently recognized that data augmentation can become increasingly challenging as the complexity of data increases. With this in mind, there appears to be a need to improve methods of applying semantic techniques for data augmentation within a NLU framework.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. In particular, the meaning extraction subsystem of the disclosed NLU framework includes a vocabulary subsystem, a structure subsystem, and a prosody subsystem that cooperate to parse utterances (e.g., received user utterances, sample utterances of the intent/ entity model) into the annotated utterance trees based on combinations of rule-based methods and machine learning (ML)-based (e.g., statistical) methods.

The disclosed NLU framework also includes a model augmentation subsystem capable of performing rule-based augmentation to augment a model (e.g., the utterance meaning model and/or the understanding model) by generalizing and/or refining the model. For example, the disclosed NLU framework is capable of expanding a number of meaning representations in the model based on stored generalizing rules, wherein the additional meaning representations are re-expressions of the original meaning representations of the model. The disclosed NLU framework is also capable of refining the meaning representations of these models, for example, to prune substantially similar meaning representations from the model based on stored refining rules. Additionally, refining may also include applying substitution rules that modify meaning representations by replacing one word surface or phrasal form with another that may be more common in a given conversational style, discourse, or channel. As such, the disclosed technique enables the generation of an augmented understanding model and/or augmented utterance meaning model having generalized and/or refined meaning representations. By expanding and/or refining the understanding model and/or the utterance model, the disclosed augmentation techniques enable the NLU framework and the agent automation system to be more robust to variations and idiosyncrasies in discourse styles and to nuances in word surface form and usage. The disclosed techniques can also improve the operation of the NLU framework and agent automation system by reducing or optimizing processing and memory resource usage when deriving meaning from natural language utterances.

Figure 23:
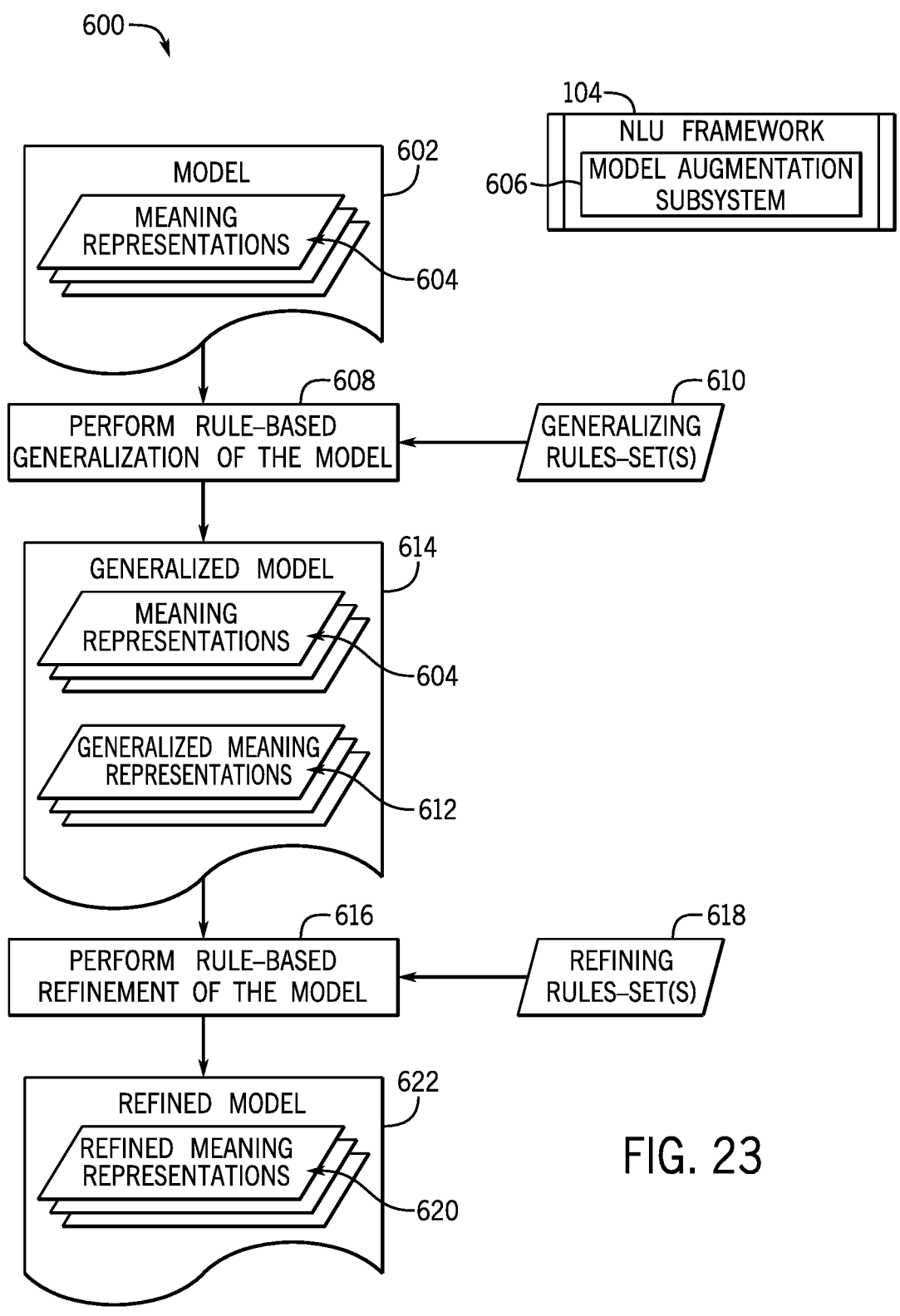
FIG. 23 is a flow diagram illustrating an example process by which a model augmentation subsystem of the NLU framework augments one or more models (e.g., the search key of the utterance meaning model, the search space of the understanding model, or a combination thereof) before performing a meaning search operation, in accordance with aspects of the present technique.

Once the meaning representations 158 and 162 have been generated, as illustrated in FIG. 6, the meaning search subsystem 152 can compare these meaning representations to extract intent/entities from the user utterance 122. However, in certain embodiments, the NLU framework 104 may first augment the utterance meaning model 160 and/or the understanding model 157 to improve the operation of the meaning search subsystem 152 to extract the intents/entities 140. For example, FIG. 23 is a flow diagram illustrating an embodiment of an augmentation process 600 whereby the NLU framework 104 augments a model 602 that includes one or more meaning representations 604. It should be noted that, in certain embodiments, the augmentation process 600 may be separately performed on the meaning representations 162 to augment the utterance meaning model 160, or the meaning representations 158 to augment the understanding model 157, or a combination thereof. For clarity, prior to augmentation, the model 602 may be referred to herein as an "original" model, and the one or more meaning representations 604 may be referred to herein as "original" meaning representations 604. The augmentation process 600 may be executed as part of a model augmentation subsystem 606, or another suitable subsystem, of the NLU framework 104. Additionally, the model augmentation subsystem 606 may cooperate with other subsystems (e.g., the vocabulary subsystem 170, the structure subsystem 172, and/or the prosody subsystem 174) of the NLU framework 104 to perform the augmentation process 600, as discussed below.

The embodiment of the augmentation process 600 illustrated in FIG. 23 begins with model augmentation subsystem 606 performing (block 608) a rule-based generalization of the model 602, which may be generated as discussed above. For example, based on one or more stored generalizing rule-sets 610, model augmentation subsystem 606 generates a plurality of generalized meaning representations 612 for at least a portion of the original meaning representations 604 of the model 602. As such, after the generalization step of block 608, the model 602 is expanded to include the generalized meaning representations 612, and the resulting model may be referred to herein as a generalized model 614 (e.g., a generalized utterance meaning model or a generalized understanding model). The generalized meaning representations 612 may be different structural permutations that are re-expressions of original meaning representations 604 and the underlying utterance. In general, the purpose of generalization is to expand the original model 602 to include additional forms related to the original meaning representations 604 already present in the model. It should be noted that, in certain embodiments, the augmentation process 600 only includes the generalization step of block 608. For such embodiments, the augmentation process 600 concludes at block 608 and the generalized model 614 serves as the augmented model (e.g., an augmented meaning model or an augmented understanding model) that is used for the subsequent meaning search operation.

For the embodiment illustrated in FIG. 23, the augmentation process 600 continues with the model augmentation subsystem 606 performing (block 616) a rule-based refinement of the generalized model 614 generated in block 608. For example, based on one or more stored refining rule-sets 618, the model augmentation subsystem 606 modifies or eliminates certain meaning representations (e.g., original meaning representations 604 and/or generalized meaning representations 612) of the generalized model 614. In general, the purpose of refinement is to adjust and focus the generalized model 614 to improve performance (e.g., improve domain specific performance, and/or reduce resource consumption) of the subsequent search operation by the meaning search subsystem 152. Upon completion of the rule-based refinement step of block 616, meaning representations 604 and/or 612 of the generalized model 614 are refined (e.g., modified and/or pruned) to generate refined meaning representations 620, and the resulting model may be referred to herein as a refined model 622 (e.g., a refined utterance meaning model or a refined understanding model). For the illustrated embodiment, after both the generalization step of block 608 and the refining step of block 616, the resulting refined model 622 may be referred to as the augmented model (e.g., the augmented utterance meaning model or the augmented understanding model) that is used for the subsequent meaning search operation. It may be appreciated that, in certain embodiments, the generalization step of block 608 may be skipped, and augmentation process 600 may include performing the rule-based refinement of block 616 on the original meaning representations 604 of the original model 602 to generate the augmented model. Once the augmentation process 600 is complete, the meaning search subsystem 152 can instead use the augmented model (e.g., a generalized model, a refined model, or a generalized and refined model) as the utterance meaning model 160 or the understanding model 157 when extracting intent/entities from the user utterance 122, as illustrated and discussed with respect to FIG. 6.

Figure 24:
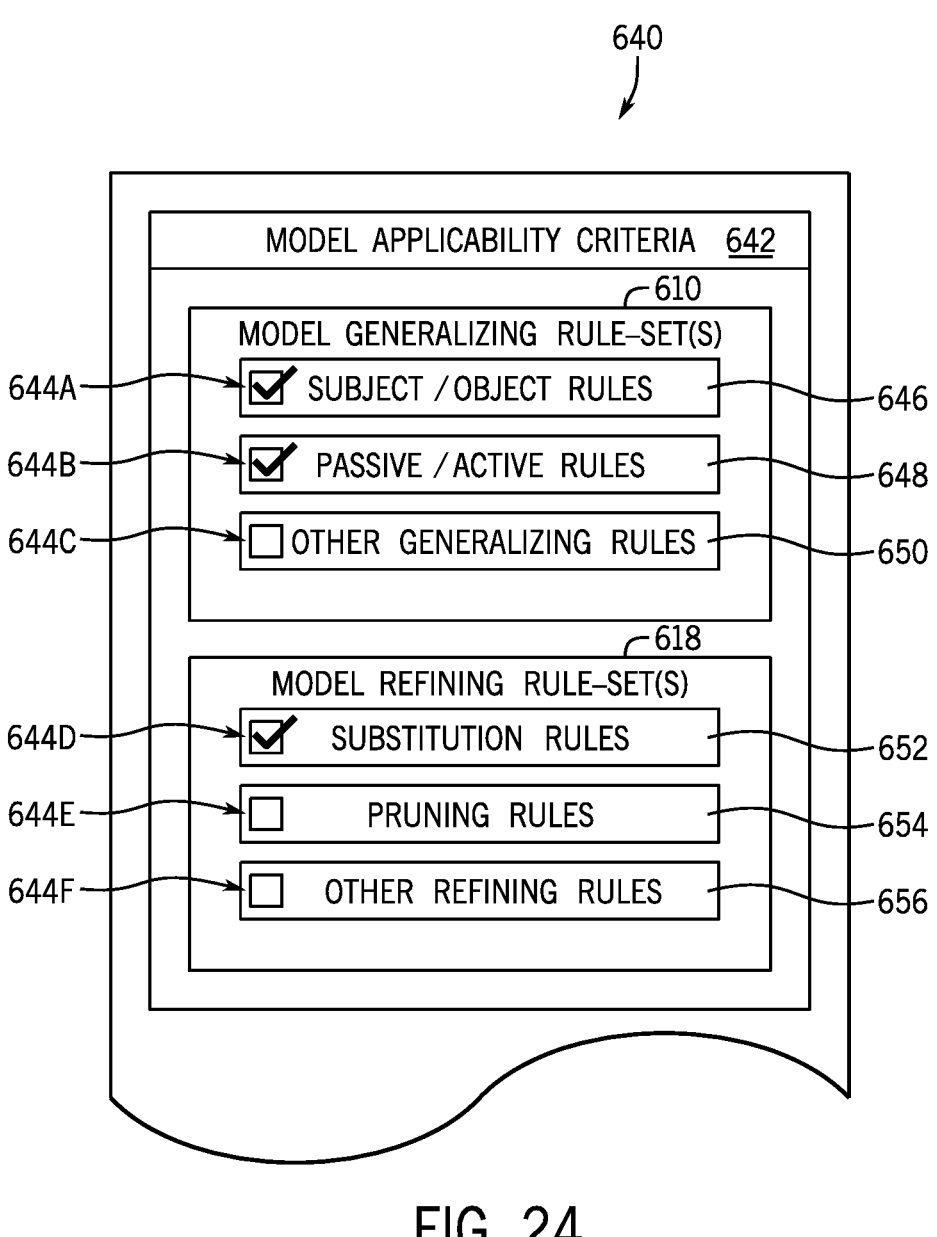
FIG. 24 is a diagram of an embodiment of a model augmentation template storing generalizing rule-sets, refining rule-sets, and model applicability criteria used by the model augmentation subsystem to augment the one or more models, in accordance with aspects of the present technique.

The aforementioned generalizing rule-sets 610 and refining rule-sets 618 generally define how the augmentation process 600 is performed to generate the augmented model. FIG. 24 illustrates an embodiment of a model augmentation template 640 that stores these generalizing rule-sets 610 and refining rule-sets 618, as well as model applicability criteria 642 that defines when and how these rule-sets are to be applied. In certain embodiments, the model augmentation template 640 may be stored as one or more tables of the database 106 illustrated in FIGS. 4A and 4B, or within another suitable data structure, in accordance with the present disclosure.

For the embodiment illustrated in FIG. 24, the model augmentation template 640 defines each rule of the generalizing rule-sets 610 and the refining rule-sets 618 based on particular model applicability criteria 642. That is, for the illustrated embodiment, particular rules of the generalizing rule-sets 610 and the refining rule-sets 618 can be selectively applied to or executed against certain meaning representations having particular characteristics, as defined by particular model applicability criteria 642. For example, the corresponding model applicability criteria 642 can indicate that particular generalizing rule-sets 610 and/or refining rule-sets 618 should only be applied to certain types of models (e.g., the utterance meaning model 160 or the understanding model 157), or to certain meaning representations (e.g., having a particular form or shape, having particular nodes, having particular classes of nodes, having particular word vectors, having particular subtree vectors, and so forth). As such, the model applicability criteria 642 can include language-specific conditions, discourse-style conditions, and so forth, which govern when and how these rule-sets should be applied during the augmentation process 600. For the illustrated example, as indicated by the checkboxes 644 (e.g., checkboxes 644A, 644B, 644C, 644D, 644E, and 644F), only a portion of the generalizing rule-sets 610 and the refining rule-sets 618 have been activated for the augmentation process 600.

For the illustrated embodiment, the generalizing rule-sets 610 include subject/object rules 646, a passive/active rules 648, as well as other suitable generalizing rules 650. For example, the subject/object rules 646 may include a rule that consumes a meaning representation of a model and, from it, generates an alternative form of the meaning representation in which a subject and an object of the meaning representation (and of the underlying utterance) are interchanged. By way of specific example, one of the subject/object rules 646 may generate a meaning representation corresponding to the utterance, "She sent him the item" from a meaning representation corresponding to the utterance, "She sent the item to him." Similarly, the passive/active rules 648 may include a rule that consumes a meaning representation of a model and, from it, generates an alternative form of the meaning representation that has been converted from an active form to a passive form, or from a passive form to an active form. By way of specific example, the passive/active rule 648 may generate a meaning representation corresponding to the utterance, "I sent him the item" from a meaning representation corresponding to the utterance, "The item was sent to him." The other generalizing rules 650 may include any other grammatical rearrangement or transformation that generates a meaning representation having a similar (e.g., the same or closely related) meaning relative to an original meaning representation already present in the model.

For the illustrated embodiment, the refining rule-sets 618 include substitution rules 652, pruning rules 654, and any other suitable refining rules 656. For example, the one of the substitution rules 652 may define how constituent portions (e.g., nodes, subtrees, word vectors, subtree vectors) of a meaning representation of a model should be replaced with other substitute portions prior to performing the search operation. For example, one of the substitution rules 652 may identify two phrases having similar surface forms and different meanings, and substitute a portion (e.g., a subtree) of the original meaning representation representing the first phrase with a different portion (e.g., a replacement subtree) representing the second phrase. For example, the substituted structure may include fewer nodes or more nodes relative to the original meaning representation. As such, using substitution rules 652, certain word surface forms (e.g., words, acronyms, expressions, emojis, and so on) can be replaced with other word surface forms or phrasal forms that are more common in a given conversation style, discourse, and/or domain. As such, it should be appreciated that the substitution rules 652, as well as other refining rules 656 expressed in the model augmentation template 640, can be used to capture local conversation style or subject vertical idiosyncrasies, as well as address nuances in word surface form, for example, in cases involving polysemy or other word-usage nuances.

By way of particular example, individually, the meanings of the words "look" and "up" are substantially different from the resulting meaning when used in combination ("look up"). As such, in an embodiment, a substitution rule 652 may locate every representation of the word "look" that is associated with the word "up" within the meaning representations of a model, and then substitute the corresponding structure with suitable structure (e.g., nodes, subtrees, word vectors, subtree vectors) that instead represent the term "look-up" or "search". For this example it may also be appreciated that, when performing comparisons during the later meaning search operation, "search" may be represented by a single tree node, while "look-up" may be represented by multiple tree nodes. As such, in certain cases, the substitution rule 652 can reduce the number of comparison operations and yield better match scores during the subsequent meaning search operation. However, it may be noted that, in certain embodiments, rather than locate and substitute specific words or phrases represented with the meaning representation, the substitution rule 652, as well as other rules defined in the model augmentation template 640, may instead rely on the shape of the meaning representation (e.g., the grammatical structure of the represented sentence or phrase) when applying generalizing and/or refining linguistic-rule-based manipulation, as set forth herein.

For the refining rule-set 618 illustrated in FIG. 24, the pruning rules 654 generally improve efficiency and reduce redundancy by removing sufficiently similar meaning representations from a model. As such, the pruning rules 654 may include a rule that defines a threshold level of similarity (e.g., in terms of similarity in structure, word vectors, and/or subtree vectors) that is acceptable between two meaning representations of a model, as well as which of the two meaning representations should be culled from the model. By way of particular example, one of the pruning rules 654 may identify two meaning representations (e.g., an original meaning representation and a generalized meaning representation, or two generalized meaning representations) that differ in limited ways (e.g., only in leaf nodes or in modifier nodes). In response, the rule may remove one of the two meaning representations from the model, reducing redundancy in the model and improving performance during the subsequent search operation. That is, by reducing the number of meaning representations of the utterance meaning model 160 and/or the search space of the understanding model 157, the memory footprint and the number of comparison operations of the subsequent meaning search operation can be substantially reduced, improving the performance of the NLU framework 104 and the agent automation system 100.

Figure 25:
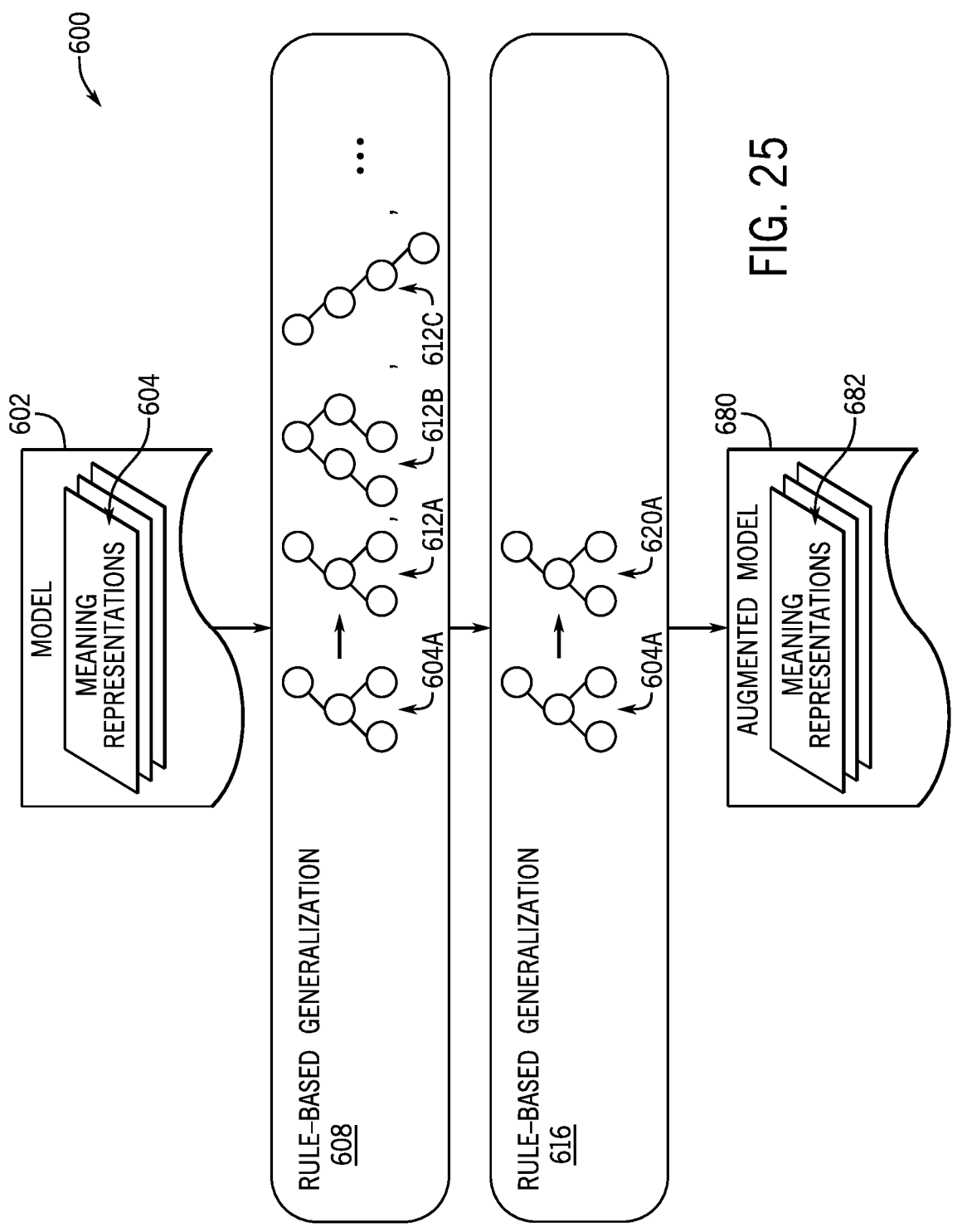
FIG. 25 is a diagram illustrating an embodiment of model augmentation in which meaning representations of the one or more models are generalized and/or refined to yield an augmented model, in accordance with aspects of the present technique.

FIG. 25 provides another depiction of the augmentation process 600 whereby one or more original meaning representations sentations 604 of the original model 602 (e.g., meaning representations 162 of the utterance meaning model 160 or meaning representations 158 of the search space of the understanding model 157) are generalized and/or refined to yield an augmented model 680 having augmented meaning representations 682 (e.g., generalized and/or refined meaning representations). As set forth above, during rule-based generalization (block 608), the model augmentation subsystem 606 of the NLU framework 104 cooperates with the structure subsystem 172 of the NLU framework 104 to generate alternative forms of at least a portion of the meaning representations 604 based on one or more active generalization rule-sets 610. For the illustrated embodiment, the rule-based generalization of block 608 includes selectively applying subject/object rules 646, passive/active rules 648, and/or other suitable generalization rules 650 based on the model applicability criteria 642 that corresponds to these generalization rules. As such, the rule-based generalization of block 608 illustrates a single meaning representation 604A, which meets certain model applicability criteria 642 defined for one or more of the generalizing rule-sets 610, and which is used to generate at least generalized meaning representations 612A, 612B, and 612C based on the corresponding generalizing rule-sets 610.

For the embodiment illustrated in FIG. 25, during rule-based refining (block 616), the model augmentation subsystem 606 of the NLU framework 104 modifies the original meaning representation 604A of the model 602 based on one or more active refining rule-sets 618. In particular, for the illustrated embodiment, the model augmentation subsystem 606 cooperates with the vocabulary subsystem 170 of the NLU framework 104 to replace word vectors and subtree vectors associated with portions of the original meaning representation 604A with alternative word vectors and subtree vectors based on one or more active refining rule-sets 618. For the illustrated embodiment, the rule-based refining of block 616 includes applying substitution rules 652 and/or other suitable refining rules 656 based on the model applicability criteria 642 that corresponds to these refining rules. As such, the rule-based refinement of block 616 illustrates the original meaning representation 604A, which meets certain model applicability criteria 642 defined for one or more of the refining rule-sets 618, being used to generate the refined meaning representation 620A based on the corresponding refining rule-sets 618. In other embodiments, in block 616, the model augmentation subsystem 606 also removes or prunes one or more of the meaning representations of the model 602 (e.g., original meaning representations 604A, generalized meaning representations 612A, 612B, 612C) based on one or more active refining rule-sets 618. As mentioned, in certain embodiments, the actions of block 608 or 616 may be skipped, resulting in the augmented model 680 being only generalized or refined relative to the original model 602.

For embodiment illustrated in FIG. 25, relative to the original model 602, the augmented model 680 generally includes an expanded number of meaning representations 682, a reduction in redundancy within meaning representations 682, and/or an improvement in domain specificity. As such, when the original model 602 is the understanding model 157, then the augmented model 680 enables an expanded and/or refined search space for the subsequent meaning search operation. When the original model 602 is the utterance meaning model 160, then the augmented model 680 may be described as an expanded and/or refined search key for the subsequent meaning search operation. As such, by augmenting the utterance meaning model 160 and/or understanding model 157, the meaning search subsystem 152 is more likely to correctly extract the intents/entities 140 from received user utterances 122, as discussed above with respect to FIG. 6.

Figure 26:
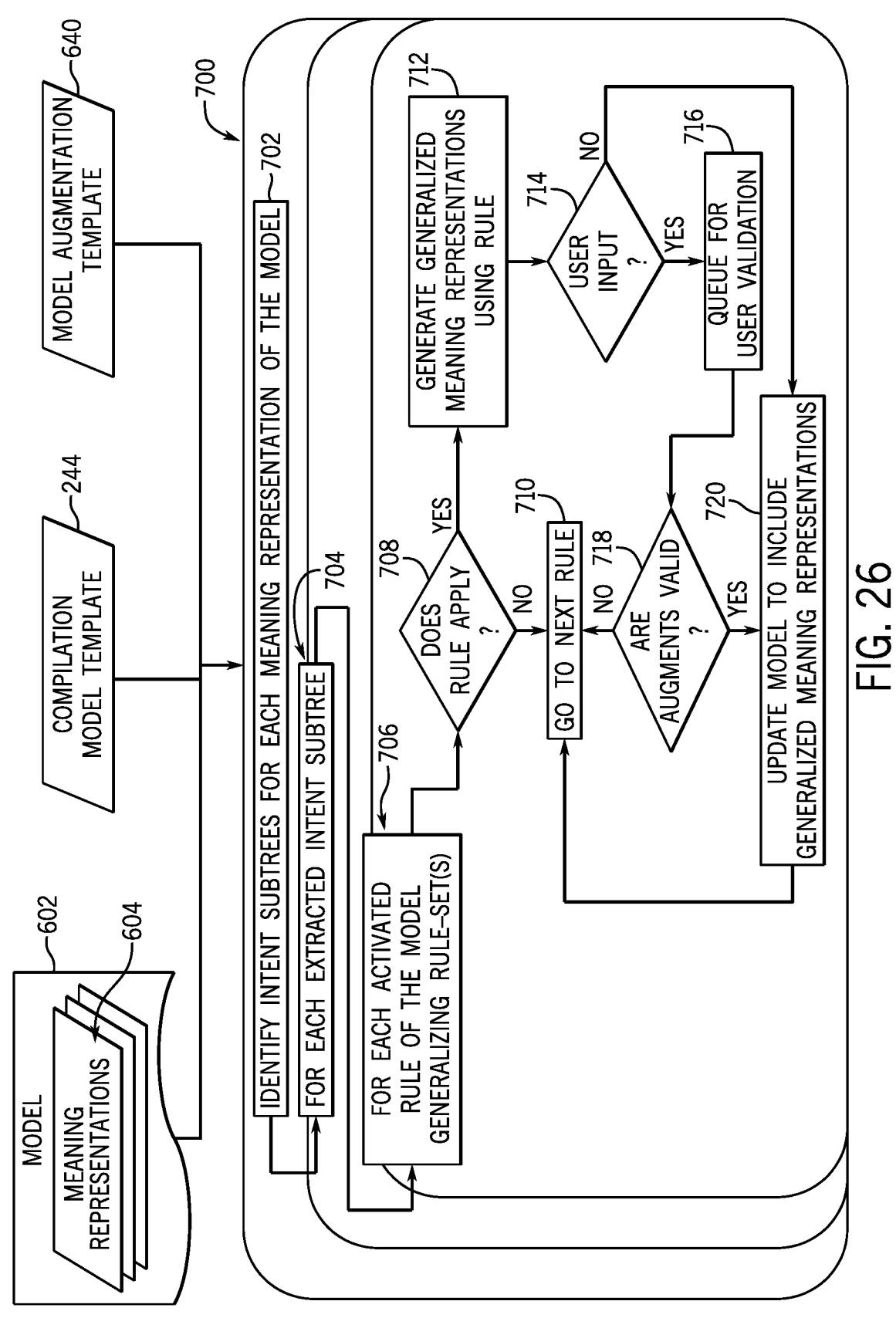
FIG. 26 is a flow diagram illustrating an embodiment of a process whereby the model augmentation subsystem performs rule-based generalization of the meaning representations of the one or more models, in accordance with aspects of the present technique.

FIG. 26 is a flow diagram illustrating an embodiment of a generalization process 700 whereby the model augmentation subsystem 606 of the NLU framework 104 performs rule-based generalization of the original meaning representations 604 of the original model 602. As mentioned, the original model 602 may be the utterance meaning model 160, including meaning representations 162, or the understanding model 157, including meaning representations 158, as illustrated in FIG. 6. The example generalization process 700 of FIG. 26 may be executed by the model augmentation subsystem 606 or another suitable subsystem of the NLU framework 104, and may involve the cooperation of other components (e.g., the structure subsystem 172 and the prosody subsystem 174) of the NLU framework 104. For the illustrated embodiment, the generalization process 700 receives the model 602 as an input, as well as the compilation model template 244 and the model augmentation template 640 discussed above.

The embodiment of the generalization process 700 illustrated in FIG. 26 begins with the model augmentation subsystem 606 identifying (block 702) intent subtrees for each of the meaning representations 604 of the model 602, wherein each intent subtree represents a distinct (e.g., atomic) intent of a particular meaning representation (as well as the underlying utterance). For example, in certain embodiments, the model augmentation subsystem 606 may invoke the prosody subsystem 174 to use one or more stored rules to segment the meaning representations 604 into distinct intent subtrees. Once all of the intent subtrees have been identified, the generalization process 700 includes an outer "for loop" (indicated by block 704) in which each of the intent subtrees are individually, serially processed. Within the outer "for loop" of block 704, there is an inner "for loop" (indicated by block 706) in which each of the activated rules of the generalizing rule-set(s) 610 of the model augmentation template 640 are conditionally or selectively applied, based on the corresponding model applicability criteria 642. In other words, the "for loops" associated with blocks 704 and 706 conditionally applies each activated rule of the generalizing rule-sets 610 to each intent subtree of the original meaning representations 604 of the model 602 as part of the generalization process.

Within the inner "for loop" indicated by block 706, the generalization process 700 includes the model augmentation subsystem 606 determining (decision block 708) whether the current activated generalizing rule (e.g., one of the subject/object rules 646 or passive/active rules 648) is applicable to the current intent subtree based on the model applicability criteria 642 of the model augmentation template 640, as discussed above with respect to FIG. 24. When the model augmentation subsystem 606 determines, based on the model applicability criteria 642, that the current rule does not apply, then it may proceed to the next rule in the "for loop" of block 706, as indicated by the block 710. When the model augmentation subsystem 606 determines, based on the model applicability criteria 642, that the current rule is applicable to the current intent subtree, the model augmentation subsystem 606 generates (block 712) one or more generalized meaning representations 612 from the current intent subtree based on the current generalization rule.

For the embodiment illustrated in FIG. 26, the generalization process 700 continues with the model augmentation subsystem 606 determining (decision block 714) whether a user should review and provide input to validate the generalized meaning representations 612 generated in block 712. For example, the model augmentation subsystem 606 may check the current generalization rule within the model augmentation template 640 to determine whether user validation and input should be sought. When the model augmentation subsystem 606 determines that user input should be requested, it queues (block 716) the generalized meaning representations 612 generated in block 712 for later user validation. When the model augmentation subsystem 606 eventually receives a valid response from the user (decision block 718), or when the model augmentation subsystem 606 determines in decision block 714 that user input is not involved with the current rule, then the model augmentation subsystem 606 responds by updating (block 720) the model 602 to include the generalized meaning representations 612 generated in block 712. In response to the model augmentation subsystem 606 receiving an invalid response from the user responding in decision block 718, or in response to the model augmentation subsystem 606 updating the model in block 720, the model augmentation subsystem 606 proceeds (block 710) to the next rule in the "for loop" of block 706.

Once the NLU framework 104 has processed each of the active rules of the generalization rule-set 610, the model augmentation subsystem 606 then proceeds to the next intent subtree of the "for loop" of block 704, and then repeats the "for loop" of block 706, which again conditionally applies each of the active model generalization rules-sets 610 against the next intent subtree based on the corresponding model applicability criteria 642. Accordingly, the illustrate generalization process 700 continues until all intent subtrees identified in block 702 have been processed in this manner to expand the model 602 into the generalized model 614 (e.g., a generalized utterance meaning model or a generalized understanding model). As mentioned, in certain embodiments, the generalized model 614 undergoes a subsequent refining step as a part of the augmentation process 600. However, in certain embodiments, the generalized model 614 produced by the generalization process 700 may not undergo a refining step, and the generalized model 614 serves as an augmented model 680 (e.g., an augmented utterance meaning model or an augmented understanding model) for the subsequent meaning search operation. In certain embodiments, the generalization process 700 is executed separately for both the utterance meaning model 160 and the understanding model 157 to expand both models prior to the meaning search operation.

Figure 27:
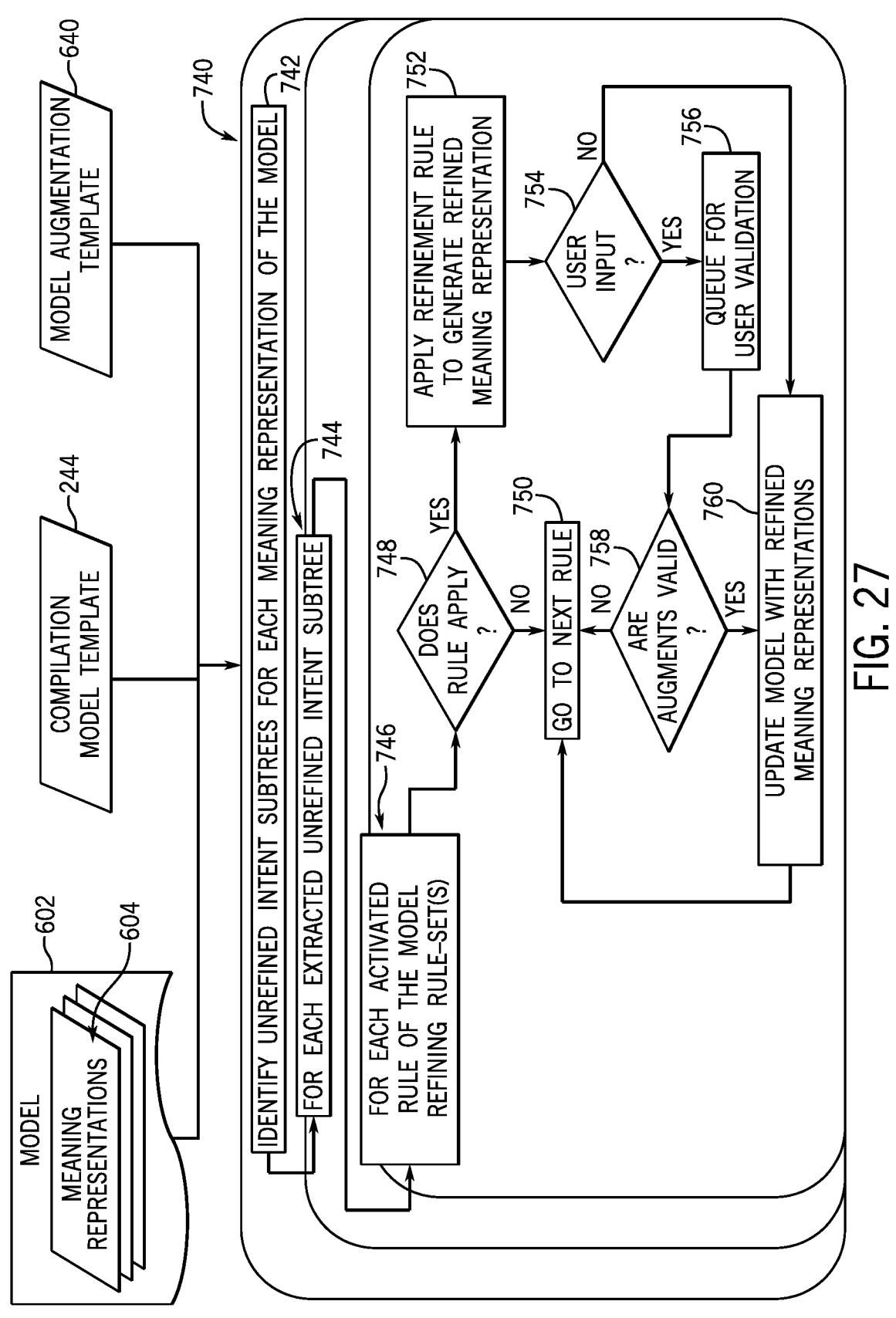
FIG. 27 is a flow diagram illustrating an embodiment of a process whereby the model augmentation subsystem performs rule-based refinement of the meaning representations of the one or more models, in accordance with aspects of the present technique.

FIG. 27 is a flow diagram illustrating an embodiment of a refinement process 740 whereby the model augmentation subsystem 606 performs rule-based refinement of the one or more meaning representations 604 of the model 602. As mentioned, in certain embodiments, the meaning representations 604 and the model 602 may be original meaning representations of an original (e.g., non-generalized, non-expanded) model 602 (e.g., the utterance meaning model 160 or the understanding model 157). In other embodiments, the model 602 may be the generalized model 614 (e.g., a generalized utterance meaning model or generalized understanding model) that is the product of the generalization process 700 of FIG. 26. The example refinement process 740 may be executed by the model augmentation subsystem 606 or anther suitable subsystem of the NLU framework 104, and may involve the cooperation of other components (e.g., the vocabulary subsystem 170, the structure subsystem 172, and the prosody subsystem 174) of the NLU framework 104. For the illustrated embodiment, the refinement process 740 receives the model 602 as an input, as well as the compilation model template 244 and the model augmentation template 640 discussed above.

The embodiment of the refinement process 740 illustrated in FIG. 27 begins with the model augmentation subsystem 606 identifying (block 742) unrefined intent subtrees for each of the meaning representations 604 of the model 602, wherein each unrefined intent subtree represents distinct (e.g., atomic) intents of meaning representations that have not been processed by the refining rule-sets 618. For example, in certain embodiments, the prosody subsystem 174 may use one or more stored rules to segment the meaning representations 604 into these intent subtrees. Once all of the unrefined intent subtrees have been identified, the refinement process 740 includes an outer "for loop" (indicated by block 744) in which each of the unrefined intent subtrees are individually processed. Within the outer "for loop" of block 744, there is an inner "for loop" (indicated by block 746) in which each of the activated rules of the refining rule-sets 618 of the model augmentation template 640 is selectively applied based on the model applicability criteria 642. In other words, the "for loops" associated with blocks 744 and 746 ensure that each activated rule of the refining rule-sets 618 can be conditionally or selectively applied to each intent subtree of the meaning representations 604 of the model 602 as part of the refinement process.

Within the inner "for loop" indicated by block 746, the refinement process 740 includes the model augmentation subsystem 606 determining (decision block 748) whether the current activated refining rule is applicable to the current intent subtree based on the model applicability criteria 642 of the model augmentation template 640, as discussed above with respect to FIG. 24. When the current rule does not apply, then the model augmentation subsystem 606 may proceed to the next refining rule in the "for loop" of block 746, as indicated by block 750. When the model augmentation subsystem 606 determines that the current refining rule is applicable to the current intent subtree, the model augmentation subsystem 606 applies (block 752) the current refinement rule to generate a refined meaning representation 620.

For the embodiment illustrated in FIG. 27, the refinement process 740 continues with the model augmentation subsystem 606 determining (decision block 754) whether a user should review and provide input to validate the refined meaning representation 620 generated in block 752. For example, the model augmentation subsystem 606 may check the current refinement rule within the model augmentation template 640 to determine whether user validation and input should be sought. When the model augmentation subsystem 606 determines that user input should be requested, it queues (block 756) the refined meaning representation generated in block 752 for later user validation. When the model augmentation subsystem 606 eventually receives a valid response from the user (decision block 758), or when the model augmentation subsystem 606 determines in decision block 754 that user input is not involved for the current refinement rule, then the model augmentation subsystem 606 responds by updating (block 760) the model 602 using the refined meaning representation 620 generated in block 752. In response to the model augmentation subsystem 606 receiving an invalid response from the user in decision block 718, or in response to the model augmentation subsystem 606 updating the model 602 in block 720, the model augmentation subsystem 606 proceeds (block 710) to the next rule the next rule in the inner "for loop" of block 706. As noted, the refined meaning representation 620 may include one or more substituted structural portions (e.g., different nodes, subtrees, or relative organization of nodes) and/or one or more substituted semantic portions (e.g., a vector, such as a word vector or subtree vector) relative to the meaning representations of the model 602 prior to the refinement process 740.

For the illustrated embodiment, once the model augmentation subsystem 606 has processed each of the active rules of the refining rule-set 618, it then proceeds to the next intent subtree of the outer "for loop" of block 744, and then repeats the "for loop" of block 746, which conditionally applies each of the active model refinement rules-sets 618 against the next intent subtree based on the corresponding model applicability criteria 642. The refinement process 740 continues until all intent subtrees identified in block 742 have been processed in this manner. As mentioned, in certain embodiments, after the refinement process 740, the resulting refined model 622 may serve as an augmented model 680 (e.g., an augmented utterance meaning model or an augmented understanding model) for the subsequent meaning search operation.

Technical effects of this section of this disclosure include providing an agent automation framework that is capable of extracting meaning from user utterances, such as requests received by a virtual agent (e.g., a chat agent), and suitably responding to these user utterances. The disclosed NLU framework includes a model augmentation subsystem capable of performing rule-based augmentation of an utterance meaning model and/or an understanding model, whereby the model is augmented by expanding and/or refining of the model based on a model augmentation template. For example, the disclosed NLU framework is capable of expanding a number of meaning representations in the model based on stored generalizing rules, wherein the additional meaning representations are re-expressions of the original meaning representations of the model. The disclosed NLU framework is also capable of refining the meaning representations of these models, for example, to remove substantially similar meaning representations based on stored refining rules, and to modify meaning representations to replace word surface or phrasal forms. As such, the disclosed technique enables the generation of an augmented understanding model and/or augmented utterance meaning model having generalized and/or refined meaning representations. By expanding and/or refining the understanding model and/or the utterance model, the disclosed augmentation techniques enable the NLU framework and the agent automation system to be more robust to variations in discourse styles and to nuances in word surface form and usage, and can also improve the operation of the NLU framework and agent automation system by reducing resource usage when deriving meaning from natural language utterances.

Cross-Lingual NLU Model

Figure 28:
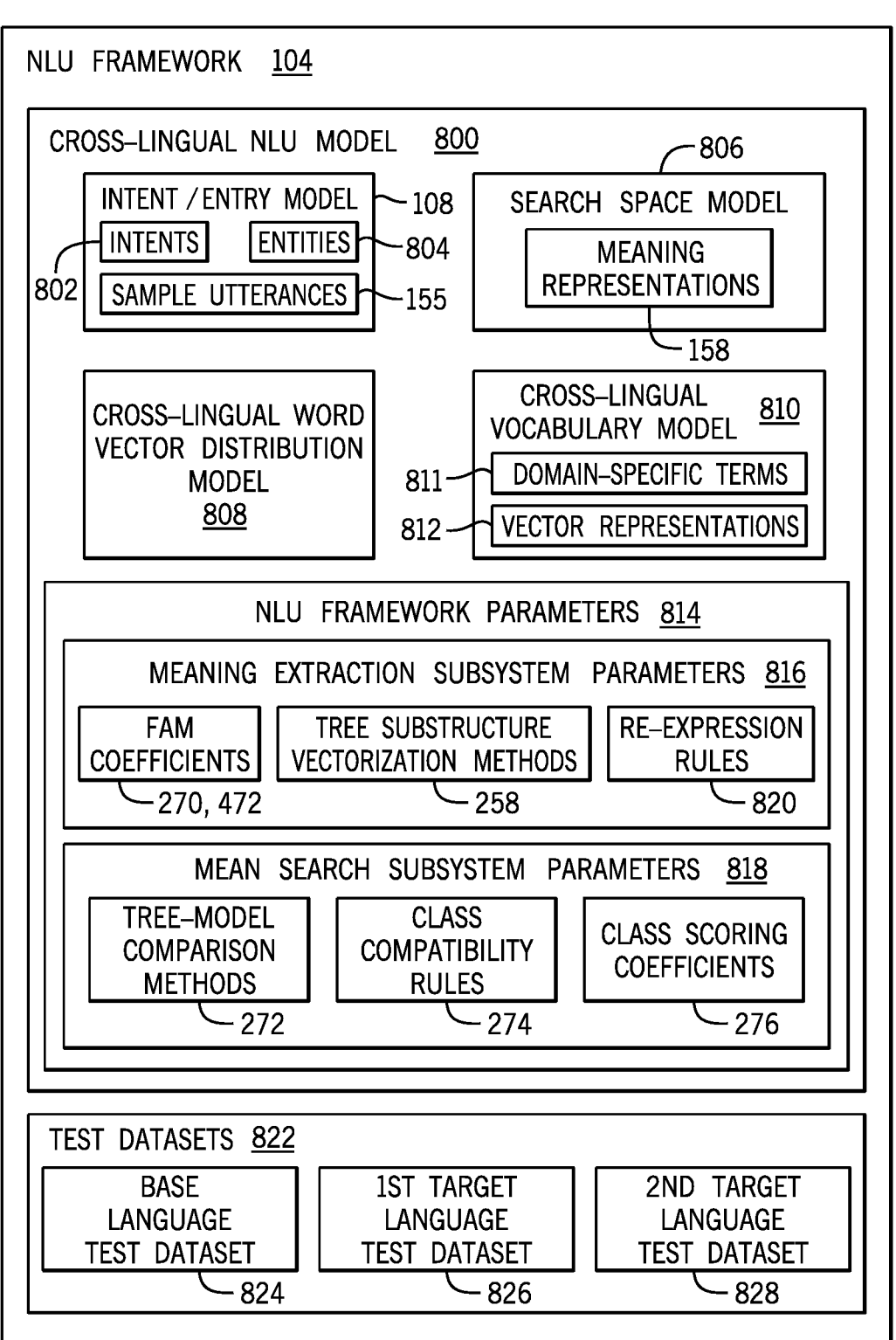
FIG. 28 is a diagram of a cross-lingual NLU model capable of inferencing received natural language utterances in a base language or in one or more target languages, in accordance with aspects of the present technique.

FIG. 28 is a diagram of an embodiment of a cross-lingual NLU model 800 capable of inferencing received natural language utterances in a base language and in one or more target languages. As noted above, the cross-lingual NLU model 800 is an example of an understanding model that includes a number of other models and parameters that define the compile-time and inference-time operation of the NLU framework 104. In some embodiments, the NLU framework 104 may include a single cross-lingual NLU model 800 that is used to inference utterances in any number of supported languages. However, in other embodiments, the NLU framework 104 may have multiple cross-lingual NLU models, including a respective cross-lingual NLU model 800 for each family of related languages. For example, in certain embodiments, the NLU framework 104 may include a first cross-lingual NLU model 800 that supports a family of romance languages (e.g., Italian as the base language, and French, Spanish, and Portuguese as target languages), and a second cross-lingual NLU model 800 that supports a family of Slavic languages (e.g., Russian as the base language, and Polish, Czech, and Slovak as target languages). In certain embodiments, when an utterance is received for inference, the NLU framework 104 may first analyze information regarding the utterance (e.g., the contents of the utterance, the source of the utterance, a character set of the utterance) to determine which of the multiple cross-lingual NLU models should be used to inference the utterance, while in other embodiments, the utterance may be inferenced (e.g., in parallel) by all of the multiple cross-lingual NLU models, and the cross-lingual NLU model that extracts artifacts with the highest relative confidence provides an indication of the language or family of languages associated with the utterance.

For the embodiment illustrated in FIG. 28, the cross-lingual NLU model 800 includes an intent/entity model 108, as discussed above. The intent/entity model 108 generally defines a number of intents 802 and includes sample utterances 155 that are representative of, and associated with, each of the intents 802. Certain entities 804 of the intent/entity model 108 may be represented as parameters of certain intents 802 within the sample utterances 155, while other entities 804 may be global entities having corresponding sample utterances 155. As discussed below, once the cross-lingual NLU model 800 has been trained and tuned for at least a base language and one or more target languages, the sample utterances 155 include sample utterances in the base language and in the one or more target languages. Additionally, the cross-lingual NLU model 800 includes a search space model 806 (also referred to herein as simply a "search space") having a collection of compiled meaning representations 158 of the sample utterances 155 of the intent/entity model 108, as discussed above with respect to FIG. 6.

For the embodiment illustrated in FIG. 28, the cross-lingual NLU model 800 includes a cross-lingual word vector distribution model 808, which the vocabulary subsystem 170 uses to determine vector representations (e.g., embeddings) for tokens (e.g., words or phrases) of utterances when constructing the meaning representations 158 of the search space 806 and the meaning representations 162 of the utterance meaning model 160, as discussed above with respect to FIG. 6. It may be appreciated that the cross-lingual word vector distribution model 808 has been trained from a large quantity of source material in each language that the NLU framework 104 can support (i.e., the base language and the one or more target languages). For example, in certain embodiments, the cross-lingual word vector distribution model 808 may be GOOGLE's Universal Sentence Encoder (GUSE), which is a large language model that is currently trained using samples from 16 languages. In certain embodiments, the cross-lingual word vector distribution model 808 may be Language-agnostic bidirectional encoder representations from transformers (BERT) sentence embedding (LaBSE), which is another large language model that is currently trained using samples from 36 different languages, or another suitable cross-lingual large language model. Indeed, it should be appreciated that, other than the cross-lingual word vector distribution model being trained using all potential languages to be supported by the NLU framework 104, the techniques disclosed herein are substantially agnostic to the cross-lingual word vector distribution model 808 being used. As such, when a new cross-lingual word vector distribution model is released, it can be added to the cross-lingual NLU model to replace the previous cross-lingual word vector distribution model. Once the updated cross-lingual NLU model 800 is trained and tuned, as discussed below, the NLU framework 104 can immediately take advantage of the improved vector representations provided by the newer cross-lingual word vector distribution model 808.

For the embodiment illustrated in FIG. 28, the cross-lingual NLU model 800 includes a cross-lingual vocabulary model 810 that defines domain-specific terminology 811 (e.g., words, phrases, acronyms, abbreviations) and corresponding suitable vector representations 812 for each of these terms. As such, the vocabulary subsystem 170 of the NLU framework 104 may utilize the cross-lingual agent-specific vocabulary model 810 (also referred to herein as simply a "cross-lingual vocabulary model") to determine suitable vector representations for domain-specific terminology (e.g., words, phrases, acronyms, abbreviations) during compile-time and inference-time operation. In contrast, for non-domain-specific terminology (e.g., domain-agnostic terminology), the vocabulary subsystem 170 may determine suitable vector representations from the cross-lingual word vector distribution model 808 during compile-time and inference-time operation. Additionally, while mono-lingual NLU models may include an agent-specific vocabulary model 412, as discussed above with respect to FIG. 18, it may be appreciated that the cross-lingual vocabulary model 810 of the illustrated cross-lingual NLU model 800 is configured to provide suitable vector representations 812 for domain-specific terminology in the base language and/or in the one or more target languages. This is advantageous as it limits development and maintenance efforts, since a single entry in the cross-lingual vocabulary model 810 can address situations in which a domain-specific term (e.g., an acronym) is the same in both the base and target languages, while also allowing for multiple, different language-specific entries to address situations in which certain domain-specific terms in the base and target languages have different semantic meanings, and therefore different vector representations.

For the embodiment illustrated in FIG. 28, the cross-lingual NLU model 800 includes a stored a set of NLU framework parameters 814 that define the compile-time and inference-time behavior of the NLU framework 104 during operation. It may be appreciated that the illustrated NLU framework parameters 814 are merely illustrated as examples, and that in other embodiments, the NLU framework parameters 814 may include any setting, rule, value, or element that is used by the NLU framework 104 to define an aspect of compile-time or inference-time operation. The NLU framework parameters 814 generally include meaning extraction subsystem parameters 816 that define the compile-time behavior of the NLU framework 104 when generating the meaning representations 158 of the search space 806, and when generating the meaning representations 162 of the utterance meaning model 160, as discussed above with respect to FIGS. 6-11. The NLU framework parameters 814 also include meaning search subsystem parameters 818 that define the inference-time behavior of the NLU framework 104 when searching the meaning representations 158 of the search space 806 to locate matches for the meaning representations 162 of the utterance meaning model 160, as discussed above with respect to FIGS. 6, 12 and 13.

For the embodiment illustrated in FIG. 28, the meaning extraction subsystem parameters 816 include FAM coefficients 270, 472 that are used by the structure subsystem 172 to tune how much relative focus or attention (e.g., signal magnification) should be granted to each portion of a subtree of an annotated utterance tree when generating a subtree vector, as discussed above with respect to FIGS. 10, 11, and 20. The meaning extraction subsystem parameters 816 also include tree substructure vectorization methods 258 that are used by the structure subsystem 172 when determining subtrees and subtree vectors for a portion of an annotated utterance tree, as discussed above with respect to FIG. 9. The meaning extraction subsystem parameters 816 further include re-expression rules 820 (e.g., generalizing rule-sets, refining rule-sets) that are used by the model augmentation subsystem 606 when constructing the meaning representations 158 of the search space 806 or the meaning representations 162 of the utterance meaning model 160, as discussed above with respect to FIGS. 23-25.

For the embodiment illustrated in FIG. 28, the meaning search subsystem parameters 818 include tree-model comparison methods 272 that the meaning search subsystem 152 uses when comparing meaning representations 162 of the utterance meaning model 160 to the meaning representations 158 of the search space 806 of the cross-lingual NLU model 800 during a meaning search operation, as discussed above with respect to FIGS. 12 and 13. The meaning search subsystem parameters 818 also include class compatibility rules 274 that the meaning search subsystem 152 uses to compare portions of the meaning representations 162 of the utterance meaning model 160 to portions of the meaning representations 158 of the search space 806 of the cross-lingual NLU model 800, as discussed above. The meaning search subsystem parameters 818 further include class scoring coefficients 276 that the meaning search subsystem 152 uses to weight similarity scores when comparing portions of the meaning representations 162 of the utterance meaning model 160 to portions of the meaning representations 158 of the search space 806 of the cross-lingual NLU model 800, as discussed above.

Additionally, for the embodiment illustrated in FIG. 28, the NLU framework 104 includes a collection of test datasets 822 that are used by the NLU framework 104 to evaluate the prediction performance of the NLU framework 104 in each language supported by the cross-lingual NLU model 800. Each test dataset includes a respective set of test utterances that are each labeled to indicate the intent, and potentially one or more entities, of each test utterance. As such, each labeled test utterance may be provided as input to the NLU framework 104 to extract predicted intents and/or entities of the test utterance, and the predicted intents and/or entities are compared to the labeled intents and/or entities to evaluate the prediction performance of the NLU framework 104. For the illustrated embodiment, the collection of test datasets 822 include a base language test dataset 824, as well as a respective test dataset for each of the one or more target languages supported by the cross-lingual NLU model 800 (e.g., a first target language test dataset 826, a second target language test dataset 828, and so forth).

FIG. 29 is a flow diagram illustrating an embodiment of a process 840 whereby the NLU framework 104 trains and tunes the cross-lingual NLU model 800 to enable support for inferencing utterances in a base language and one or more target languages. The process 840 is discussed with reference to elements illustrated in FIG. 28. For the illustrated embodiment, the process 840 begins with the NLU framework 104 training and tuning (block 842) the cross-lingual NLU model 800 until the NLU framework 104 is able to inference the test utterances of the base language test dataset 824 with at least a first predefined level of performance (e.g., in terms of accuracy, latency time, precision, and/or recall)

using the cross-lingual NLU model 800. The actions of block 842 are discussed in greater detail with respect to FIG. 30.

For the embodiment illustrated in FIG. 29, the process 840 continues with the NLU framework 104 determining (block 844) the target language test dataset 826 based on the base language test dataset 824. In certain embodiments, the base language test dataset 824 may be human-authored, and each target language test dataset 826, 828 may be at least partially machine-translated from the base language test dataset 824. For example, in certain embodiments, the base language test dataset 824 may first be machine-translated into a target language, and then may be reviewed, revised, and/or augmented by a human expert in the target language (e.g., a developer or designer) to yield the target language dataset 826.

For the embodiment illustrated in FIG. 29, the process 840 continues with the NLU framework 104 selecting (block 846) target language test utterances from the target language test dataset 826 to be added to the intent/entity model 108 as new sample utterances 155 in the target language. Once these sample utterances have been added to the intent/entity model 108, the process 840 continues with the NLU framework 104 training and tuning (block 848) the cross-lingual NLU model 800 until the NLU framework 104 is able to inference the test utterances of the target language test dataset 826 with at least a second predefined level of performance (e.g., in terms of accuracy, latency time, precision, and/or recall) using the cross-lingual NLU model 800. The actions of blocks 846 and 848 are discussed in greater detail with respect to FIG. 31.

For the embodiment illustrated in FIG. 29, the process 840 continues with the NLU framework 104 optionally receiving (block 850) (e.g., from a developer or maintainer of the cross-lingual NLU model 800) one or more target language-specific intents, along with corresponding target language sample utterances, to be added to the intent/entity model 108. This optional step enables particular intents to be defined within the intent/entity model 108 only for a particular target language, which enables the cross-lingual NLU model 800 to address intents in the target language that lack a corresponding intent in the base language. Once the target language-specific intents and corresponding target language sample utterances have been added to the intent/entity model 108, the NLU framework 104 once again trains and tunes the cross-lingual NLU model 800 until the NLU framework 104 is able to correctly extract the language-specific intents from the corresponding target language sample utterances.

For the embodiment illustrated in FIG. 29, the process 840 continues with the NLU framework 104 determining whether (decision block 852) support for a second target language is desired. In response to determining that support for the second target language is desired, the NLU framework 104 may respond by repeating blocks 844, 864, 848, and 850 with respect to the second target language. Once these actions have been completed for each of the one or more target languages, the output is the cross-lingual NLU model 800 configured to inference utterances in the base language and in the one or more target languages.

Figure 30:
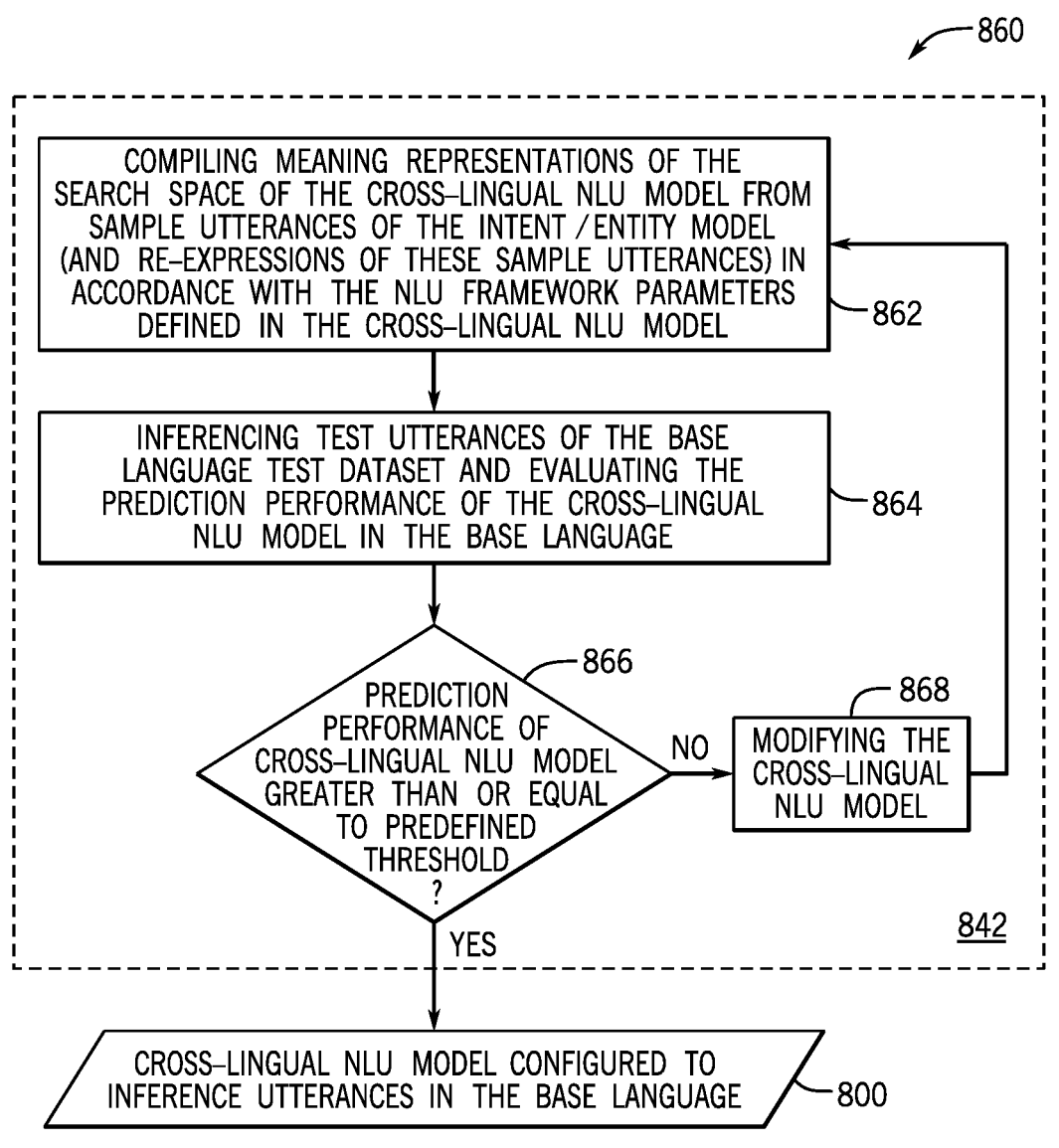
FIG. 30 is a flow diagram of an embodiment of a process whereby the NLU framework trains and tunes the cross-lingual NLU model to inference utterances in the base language, in accordance with aspects of the present technique.

FIG. 30 is a flow diagram illustrating an embodiment of a process 860 whereby the NLU framework 104 trains and tunes the cross-lingual NLU model 800 to inference utterances in the base language. The process 860 corresponds to block 842 of the process 840 of FIG. 29. The process 860 is discussed with reference to elements illustrated in FIG. 28.

For the embodiment illustrated in FIG. 30, the process 860 begins with the NLU framework 104 compiling (block 862) the meaning representations 158 of the search space 806 of the cross-lingual NLU model 800 from the sample utterances 155 (e.g., base language sample utterances) of the intent/entity model 108, as well as re-expressions of these sample utterances 155, in accordance with the of the NLU framework parameters defined in the cross-lingual NLU model 800. The compilation of the search space 806 of the cross-lingual NLU model 800, as well as the re-expression of the sample utterances, is discussed above, with respect to FIGS. 9-11 and 23-27.

Once the meaning representations 158 of the search space 806 have been compiled, for the illustrated embodiment, the process 860 continues with the NLU framework 104 inferencing (block 864) test utterances of the base language test dataset 824 and evaluating the prediction performance of the cross-lingual NLU model 800 in the base language (e.g., in terms of accuracy, latency time, precision, and/or recall). It may be appreciated that, as discussed above, during compilation and inference, the NLU framework 104 may represent domain-specific terms 811 that appear in utterances with the corresponding vector representations 812 indicated by the cross-lingual vocabulary model 810, and may represent other domain-agnostic terms with vector representations provided by the cross-lingual word vector distribution model 808. The NLU framework 104 then determines (decision block 866) whether the prediction performance of the cross-lingual NLU model 800 in the base language is greater than or equal to a pre-defined threshold value that defines a minimal acceptable level of prediction performance of the cross-lingual NLU model 800 in the base language (e.g., 85% accuracy). In certain embodiments, the pre-defined threshold value may be one of the NLU framework parameters 814 stored by the cross-lingual NLU model 800.

When the NLU framework 104 determines that the prediction performance of the cross-lingual NLU model 800 does not meet or exceed the pre-defined threshold value for the base language, the NLU framework 104 may respond by modifying (block 868) the cross-lingual NLU model 800 before repeating the actions of blocks 862 and 864 in an iterative training and tuning process. For example, in certain embodiments, the modification of the cross-lingual NLU model 800 may include modifying one or more of the NLU framework parameters 814 of the cross-lingual NLU model 800 discussed above. In certain embodiments, the modification of the cross-lingual NLU model 800 may additionally or alternatively include adding one or more new domain-specific terms 811, and corresponding vector representations 812 of these terms, to the cross-lingual vocabulary model 810. Once the NLU framework determines that the prediction performance of the cross-lingual NLU model 800 in the base language meets or exceeds the pre-defined threshold value for the base language, the result is the cross-lingual NLU model 800 that is configured to inference utterances in the base language.

Figure 31:
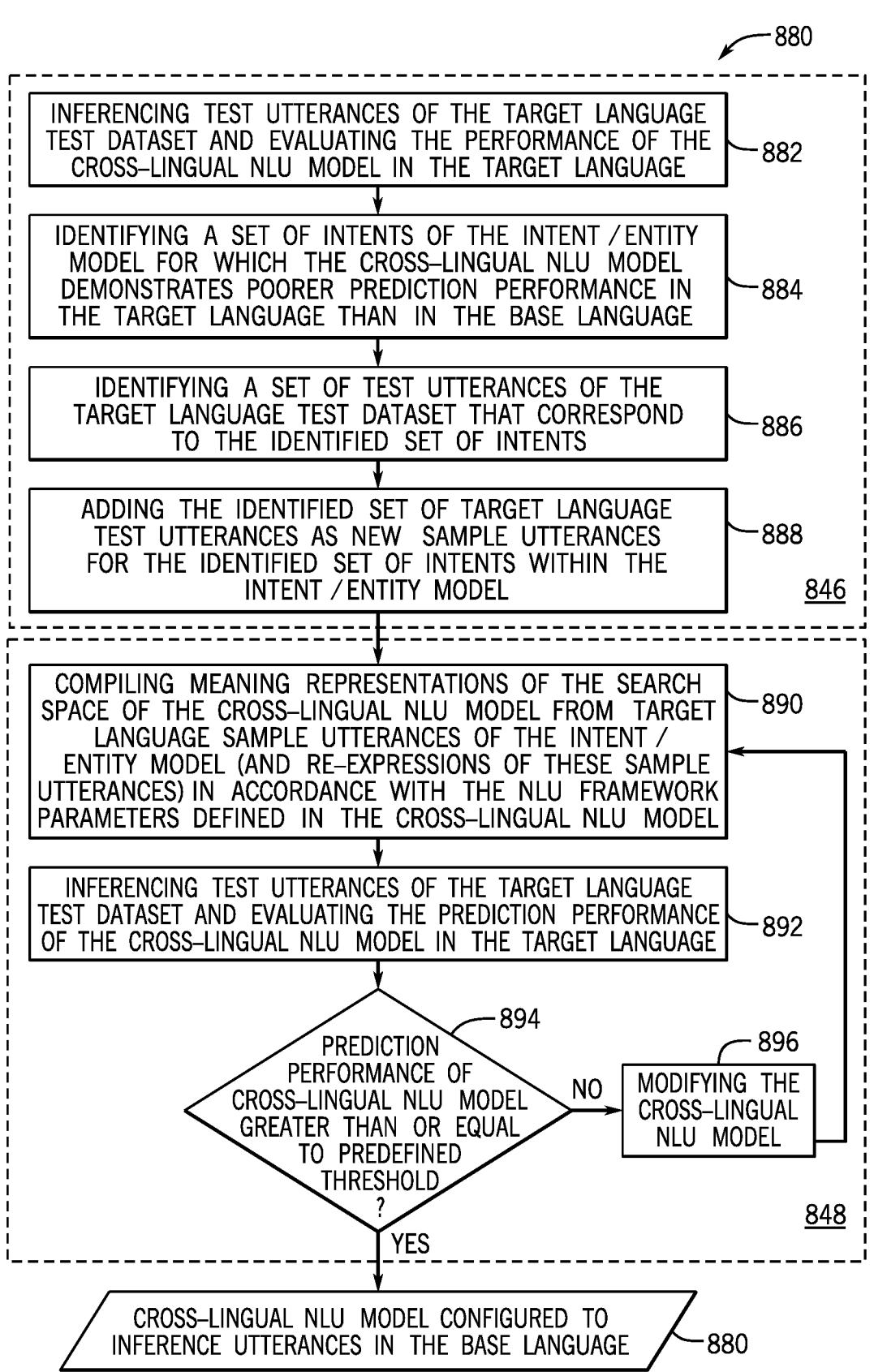
FIG. 31 is a flow diagram of an embodiment of a process whereby the NLU framework selects target language test utterances from a target language test dataset to be added to an intent/entity model of the cross-lingual NLU model, and then trains and tunes the cross-lingual NLU model to inference utterances in the target language, in accordance with aspects of the present technique.

FIG. 31 is a flow diagram illustrating an embodiment of a process 880 whereby the NLU framework 104 selects target language test utterances from the target language test dataset 826 to be added to the intent/entity model 108, and then trains and tunes the cross-lingual NLU model 800 to inference utterances in the target language. The process 880 corresponds to blocks 846 and 848 of the process 840 of FIG. 29. The process 880 is discussed with reference to elements illustrated in FIGS. 28-30.

For the embodiment illustrated in FIG. 31, the process 880 begins with the NLU framework 104 inferencing (block 882) test utterances of the target language test dataset 826 and evaluating the performance of the cross-lingual NLU model (e.g., in terms of accuracy, latency time, precision, and/or recall). It may be appreciated that, since the cross-lingual NLU model 800 relies on the cross-lingual word vector distribution model 808 to generate vector representations for domain-agnostic terms, the cross-lingual NLU model 800 is able to properly extract certain intents and entities from the target language without any explicit training or tuning in the target language. As such, block 882 involves assessing the initial performance of the cross-lingual NLU model 800 in the target language to identify weaknesses in the cross-lingual NLU model 800 with respect to particular test utterances and intents.

For the embodiment illustrated in FIG. 31, the process 880 continues with the NLU framework 104 identifying (block 884) a set of intents of the intent/entity model 108 for which the cross-lingual NLU model demonstrates poorer prediction performance in the target language than in the base language. For example, even before training and tuning in the target language, the cross-lingual NLU model 800 may demonstrate acceptable prediction performance for certain intents, but may fail to extract the labeled intent from other test utterances. The NLU framework 104 subsequently identifies (block 886) a set of test utterances of the target language test dataset 826 that correspond to the identified set of intents. The process 880 continues with the NLU framework 104 adding (block 888) the identified set of target-language test utterances as new sample utterances for the identified set of intents within the intent/entity model 108. As such, after performing the actions of block 888, the intent/entity model 108 of the cross-lingual NLU model 800 includes intents having sample utterances in the base language and having corresponding sample utterances in the target language.

For the embodiment illustrated in FIG. 31, the process 880 continues with the NLU framework 104 compiling (block 890) meaning representations 158 of the search space 806 of the cross-lingual NLU model 800 from the new target language sample utterances 155 of the intent/entity model 108, as well as re-expressions of these sample utterances 155, in accordance with the NLU framework parameters 814 defined in the cross-lingual NLU model 800. It may be appreciated that, during this compilation, the sample utterances 155 of the intent/entity model 108 in the base language that were previously compiled into meaning representations 158 need not be recompiled. Rather, the compilation is focused on the new target language sample utterances 155 added in block 888, with the goal being to improve performance of the cross-lingual NLU model 800 specifically for the target language without substantially decreasing the performance of the model in the base language (or other previously trained and tuned target languages).

For the embodiment illustrated in FIG. 31, the process 880 continues with the NLU framework 104 inferencing (block 892) the test utterances of the target language test dataset 826 and evaluating the prediction performance of the cross-lingual NLU model 800 in the target language (e.g., in terms of latency time, precision, and/or recall). As discussed above, during compilation and inference, the NLU framework 104 may represent domain-specific terms 811 that appear in utterances with the corresponding vector representations 812 indicated by the cross-lingual vocabulary model 810, and may represent other domain-agnostic terms with vector representations provided by the cross-lingual word vector distribution model 808. After inferencing is complete, the NLU framework 104 determines (decision block 894) whether the prediction performance of the cross-lingual NLU model 800 in the target language is greater than or equal to a pre-defined threshold value that defines a minimal acceptable level of prediction performance of the cross-lingual NLU model 800 in the target language (e.g., 75% accuracy). In certain embodiments, the pre-defined threshold value may be one of the NLU framework parameters 814 stored by the cross-lingual NLU model 800.

When the NLU framework 104 determines that the prediction performance of the cross-lingual NLU model 800 in the target language does not meet or exceed the pre-defined threshold value, the NLU framework 104 may respond by modifying (block 896) the cross-lingual NLU model 800 before repeating blocks 890 and 892 in an iterative manner. For example, in certain embodiments, the modification of the cross-lingual NLU model 800 may include modifying one or more of the NLU framework parameters 814 of the cross-lingual NLU model 800 discussed above. In certain embodiments, the modification of the cross-lingual NLU model 800 may additionally or alternatively include adding one or more new target language domain-specific terms 811, and corresponding vector representations 812 of these terms, to the cross-lingual vocabulary model 810. Once the NLU framework 104 determines that the prediction performance of the cross-lingual NLU model 800 in the target language meets or exceeds the pre-defined threshold value for the target language, the result is the cross-lingual NLU model 800 that is configured to inference utterances in the base language and the target language.

In certain embodiments, in block 896, the NLU framework 104 may only modify NLU framework parameters 814 that are specifically used by the NLU framework 104 during compile-time or inference-time operation of the NLU framework 104 in the target language, but are not used in the base language (or other previously trained and tuned target languages). For example, the NLU framework 104 may determine that certain class compatibility rules 274 and class scoring coefficients 276 are only triggered when inferencing test utterances in the target language, and as such, modifying these NLU framework parameters 814 is unlikely to substantially alter the prediction performance of the cross-lingual NLU model 800 in the base language (or other previously trained and tuned target languages). In certain cases, the NLU framework 104 may additionally or alternatively modify the cross-lingual vocabulary model 810 to include new target language domain-specific terms 811 and corresponding vector representations 812 of these terms to the cross-lingual vocabulary model 810, which improves prediction performance in the target language without impacting prediction performance in the base language (or other previously trained and tuned target languages). As such, the iterative training and tuning of the cross-lingual NLU model 800 represented in FIG. 31 proceeds in a focused manner that improves the predication performance of the cross-lingual NLU model 800 in the target language without detrimentally impacting the prediction performance in the base language (or other previously trained and tuned target languages). In certain embodiments, after the NLU framework 104 determines that the prediction performance of the cross-lingual NLU model 800 in the target language meets or exceeds the pre-defined threshold value for the target language, the NLU framework 104 may again inference the test utterances of the base language test dataset 824 (and/or test utterance of previously trained and tuned target languages) and evaluate prediction performance to confirm that the prediction performance in the base language (or other previously trained and tuned target languages) is not diminished by the modifications to the NLU framework parameters 814 performed in block 896.

The technical effects of this section of the disclosure include a NLU framework having a cross-lingual NLU model that can be trained and tuned on a base language and one or more target languages, and immediately be used to inference utterances in any of the supported languages. The present approach involves first training and tuning the cross-lingual NLU model to inference utterances in the base language using a base language test dataset. Subsequently, the base language test dataset is translated into a target language test dataset, and the prediction performance of the cross-lingual NLU model in the target language is evaluated using the target language test dataset. Test utterances of the target language test dataset that the NLU framework failed to correctly inference are selected and added as new sample utterances to the NLU model. Subsequently, an incremental fine-tuning is performed on the cross-lingual NLU model in the target language that focuses on a selected small set of data in the target language for which the model performance is to be improved, which enables improvements in prediction performance in the target language without a substantial loss of prediction performance in the base language or other target languages. The process can be repeated to add support for as many target languages as desired. As such, the present technique enables minimal, targeted fine-tuning of the cross-lingual NLU model in each language to be supported without negatively impacting prediction performance in other languages. Accordingly, the present technique reduces the resource costs in developing and maintaining a mNLU framework, and improves the scalability of the mNLU framework to support different languages.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A natural language understanding (NLU) framework, comprising:
   at least one memory configured to store a cross-lingual NLU model and a base language test dataset, wherein the cross-lingual NLU model includes an intent-entity model and a cross-lingual word vector distribution model, wherein the intent-entity model defines intents and includes sample utterances for each intent; and
   at least one processor configured to execute stored instructions to cause the NLU framework to perform actions comprising:
      performing an initial iterative training and tuning of the cross-lingual NLU model until the NLU framework is configured to infer the base language test dataset with at least a first predefined level of prediction performance;

determining a target language test dataset from the base language test dataset;

selecting a set of target language test utterances from the target language test dataset and adding the selected set of target language test utterances to the intent-entity model as new target language sample utterances; and performing additional iterative training and tuning of the cross-lingual NLU model until the NLU framework is configured to infer the target language test dataset with at least a second predefined level of prediction performance.

2. The NLU framework of claim 1, wherein, to determine the target language test dataset from the base language test dataset, the at least one processor is configured to execute stored instructions to cause the NLU framework to perform actions comprising:

performing a machine translation of base language test utterances of the base language test dataset to yield target language test utterances of the target language test dataset; and modifying one or more of the target language test utterances of the target language test dataset based on input received from a developer to yield the target language test dataset.

3. The NLU framework of claim 1, wherein, to perform the initial iterative training and tuning of the cross-lingual NLU model, the at least one processor is configured to execute stored instructions to cause the NLU framework to perform actions comprising:

(A) compiling meaning representations of a search space of the cross-lingual NLU model based on the sample utterances of the intent-entity model using the cross-lingual word vector distribution model, in accordance with a set of NLU framework parameters of the cross-lingual NLU model;

(B) inferencing base language test utterances of the base language test dataset using the search space and the cross-lingual word vector distribution model of the cross-lingual NLU model, in accordance with the set of NLU framework parameters of the cross-lingual NLU model;

(C) evaluating a base language prediction performance of the cross-lingual NLU model; and then (D) in response to determining that the base language prediction performance of the cross-lingual NLU model is less than the first predefined level of prediction performance, modifying the cross-lingual NLU model and returning to step A.

4. The NLU framework of claim 3, wherein, to select the set of target language test utterances from the target language test dataset and add the selected set of target language test utterances to the intent-entity model, the at least one processor is configured to execute stored instructions to cause the NLU framework to perform actions comprising:

inferencing target language test utterances of the target language test dataset using the search space and the cross-lingual word vector distribution model of the cross-lingual NLU model, in accordance with the set of NLU framework parameters of the cross-lingual NLU model;

identifying a set of intents of the intent-entity model for which the cross-lingual NLU model demonstrates poorer prediction performance in the target language than in the base language;

selecting the set of target language test utterances that correspond to the identified set of intents in the target language test dataset; and adding the selected set of target language test utterances as the new target language sample utterances in the intent-entity model.

5. The NLU framework of claim 4, wherein, to perform the additional iterative training and tuning of the cross-lingual NLU model, the at least one processor is configured to execute stored instructions to cause the NLU framework to perform actions comprising:

(E) compiling additional meaning representations of the search space of the cross-lingual NLU model based on the new target language sample utterances of the intent-entity model using the cross-lingual word vector distribution model, in accordance with the set of NLU framework parameters of the cross-lingual NLU model;

(F) inferencing the target language test utterances of the target language test dataset using the search space and the cross-lingual word vector distribution model of the cross-lingual NLU model, in accordance with the set of NLU framework parameters of the cross-lingual NLU model;

(G) evaluating a target language prediction performance of the cross-lingual NLU model; and then (H) in response to determining that the target language prediction performance of the cross-lingual NLU model is less than the second predefined level of prediction performance, modifying the cross-lingual NLU model and returning to step E.

6. The NLU framework of claim 5, wherein, to modify the cross-lingual NLU model, the at least one processor is configured to execute stored instructions to cause the NLU framework to perform actions comprising:

modifying at least one of the set of NLU framework parameters of the cross-lingual NLU model.

7. The NLU framework of claim 6, wherein the set of NLU framework parameters comprise a set of focus-attention-magnification (FAM) coefficients, a set of re-expression rules, a set of class compatibility rules, or a set of class scoring coefficients, or any combination thereof.

8. The NLU framework of claim 5, wherein, to modify the cross-lingual NLU model, the at least one processor is configured to execute stored instructions to cause the NLU framework to perform actions comprising:

adding one or more domain-specific terms and corresponding vector representations to a cross-lingual vocabulary model of the cross-lingual NLU model, wherein, during inferencing, the NLU framework is configured to determine the corresponding vector representations for the one or more domain-specific terms in test utterances using the cross-lingual vocabulary model.

9. The NLU framework of claim 1, wherein the base language test dataset includes base language test utterances, each labeled to indicate a respective intent, one or more respective entities, or a combination thereof, of each of the base language test utterances.

10. The NLU framework of claim 1, wherein the cross-lingual word vector distribution model comprises GOOGLE's Universal Sentence Encoder (GUSE) or Language-agnostic bidirectional encoder representations from transformers (BERT) sentence embedding (LaBSE).

11. A method of operating a natural language understanding (NLU) framework, comprising:

performing an initial iterative training and tuning of a cross-lingual NLU model until the NLU framework is configured to infer a base language test dataset with at least a first predefined level of prediction performance, wherein the cross-lingual NLU model includes an intent-entity model, a cross-lingual word vector distribution model, and a set of NLU framework parameters, and wherein the intent-entity model defines intents and includes sample utterances for each intent;

determining a target language test dataset from the base language test dataset;

selecting a set of target language test utterances from the target language test dataset and adding the selected set of target language test utterances to the intent-entity model as new target language sample utterances; and performing additional iterative training and tuning of the cross-lingual NLU model until the NLU framework is configured to infer the target language test dataset with at least a second predefined level of prediction performance.

12. The method of claim 11, wherein performing the initial iterative training and tuning of the cross-lingual NLU model comprises:

(A) compiling meaning representations of a search space of the cross-lingual NLU model based on the sample utterances of the intent-entity model using the cross-lingual word vector distribution model, in accordance with a set of NLU framework parameters of the cross-lingual NLU model;

(B) inferencing base language test utterances of the base language test dataset using the search space and the cross-lingual word vector distribution model of the cross-lingual NLU model, in accordance with the set of NLU framework parameters of the cross-lingual NLU model;

(C) evaluating a base language prediction performance of the cross-lingual NLU model; and then (D) in response to determining that the base language prediction performance of the cross-lingual NLU model is less than the first predefined level of prediction performance, modifying the cross-lingual NLU model and returning to step A.

13. The method of claim 12, wherein selecting the set of target language test utterances from the target language test dataset and adding the selected set of target language test utterances to the intent-entity model comprises:

inferencing target language test utterances of the target language test dataset using the search space and the cross-lingual word vector distribution model of the cross-lingual NLU model, in accordance with the set of NLU framework parameters of the cross-lingual NLU model;

identifying a set of intents of the intent-entity model for which the cross-lingual NLU model demonstrates poorer prediction performance in the target language than in the base language;

selecting the set of target language test utterances that correspond to the identified set of intents in the target language test dataset; and adding the selected set of target language test utterances as the new target language sample utterances in the intent-entity model.

14. The method of claim 13, wherein performing the additional iterative training and tuning of the cross-lingual NLU model comprises:

(E) compiling additional meaning representations of the search space of the cross-lingual NLU model based on the new target language sample utterances of the intent-entity model using the cross-lingual word vector distribution model, in accordance with the set of NLU framework parameters of the cross-lingual NLU model;

(F) inferencing the target language test utterances of the target language test dataset using the search space and the cross-lingual word vector distribution model of the cross-lingual NLU model, in accordance with the set of NLU framework parameters of the cross-lingual NLU model;

(G) evaluating a target language prediction performance of the cross-lingual NLU model; and then (H) in response to determining that the target language prediction performance of the cross-lingual NLU model is less than the second predefined level of prediction performance, modifying the cross-lingual NLU model and returning to step E.

15. The method of claim 14, wherein modifying the cross-lingual NLU model comprises:

modifying at least one of the set of NLU framework parameters of the cross-lingual NLU model; or adding one or more domain-specific terms and corresponding vector representations to a cross-lingual vocabulary model of the cross-lingual NLU model, wherein, during inferencing, the NLU framework is configured to determine the corresponding vector representations for the one or more domain-specific terms in test utterances using the cross-lingual vocabulary model; or any combination thereof.

16. A non-transitory computer-readable medium storing instructions of a natural language understanding (NLU) framework executable by a computer processor, the instructions comprising instructions to:

perform an initial iterative training and tuning of a cross-lingual NLU model until the NLU framework is configured to infer a base language test dataset with at least a first predefined level of prediction performance, wherein the cross-lingual NLU model includes an intent-entity model, a cross-lingual word vector distribution model, and a set of NLU framework parameters, and wherein the intent-entity model defines intents and includes sample utterances for each intent;

determine a target language test dataset from the base language test dataset;

select a set of target language test utterances from the target language test dataset and adding the selected set of target language test utterances to the intent-entity model as new target language sample utterances; and perform additional iterative training and tuning of the cross-lingual NLU model until the NLU framework is configured to infer the target language test dataset with at least a second predefined level of prediction performance.

17. The non-transitory computer-readable medium of claim 16, wherein the instructions to perform the initial iterative training and tuning of the cross-lingual NLU model comprise instructions to:

(A) compile meaning representations of a search space of the cross-lingual NLU model based on the sample utterances of the intent-entity model using the cross-lingual word vector distribution model, in accordance with a set of NLU framework parameters of the cross-lingual NLU model;

(B) infer base language test utterances of the base language test dataset using the search space and the cross-lingual word vector distribution model of the cross-lingual NLU model, in accordance with the set of NLU framework parameters of the cross-lingual NLU model;

(C) evaluate a base language prediction performance of the cross-lingual NLU model; and then (D) in response to determining that the base language prediction performance of the cross-lingual NLU model is less than the first predefined level of prediction performance, modify the cross-lingual NLU model and return to step A.

18. The non-transitory computer-readable medium of claim 17, wherein the instructions to select the set of target language test utterances from the target language test dataset and add the selected set of target language test utterances to the intent-entity model comprise instructions to:

infer target language test utterances of the target language test dataset using the search space and the cross-lingual word vector distribution model of the cross-lingual NLU model, in accordance with the set of NLU framework parameters of the cross-lingual NLU model;

identify a set of intents of the intent-entity model for which the cross-lingual NLU model demonstrates poorer prediction performance in the target language than in the base language;

select the set of target language test utterances that correspond to the identified set of intents in the target language test dataset; and add the selected set of target language test utterances as the new target language sample utterances in the intent-entity model.

19. The non-transitory computer-readable medium of claim 18, wherein the instructions to perform the additional iterative training and tuning of the cross-lingual NLU model comprise instructions to:

(E) compile additional meaning representations of the search space of the cross-lingual NLU model based on the new target language sample utterances of the intent-entity model using the cross-lingual word vector distribution model, in accordance with the set of NLU framework parameters of the cross-lingual NLU model;

(F) infer the target language test utterances of the target language test dataset using the search space and the cross-lingual word vector distribution model of the cross-lingual NLU model, in accordance with the set of NLU framework parameters of the cross-lingual NLU model;

(G) evaluate a target language prediction performance of the cross-lingual NLU model; and then (H) in response to determining that the target language prediction performance of the cross-lingual NLU model is less than the second predefined level of prediction performance, modify the cross-lingual NLU model and return to step E.

20. The non-transitory computer-readable medium of claim 19, wherein the instructions to modify the cross-lingual NLU model comprise instructions to:

modify one or more of the set of NLU framework parameters of the cross-lingual NLU model; or add one or more domain-specific terms and corresponding vector representations to a cross-lingual vocabulary model of the cross-lingual NLU model, wherein, during inference, the NLU framework is configured to determine the corresponding vector representations for the one or more domain-specific terms in test utterances using the cross-lingual vocabulary model; or any combination thereof.

* * * * *